US008635347B2

(12) United States Patent
Sanders

(10) Patent No.: US 8,635,347 B2
(45) Date of Patent: Jan. 21, 2014

(54) APPARATUS AND METHOD FOR SYNCHRONIZED NETWORKS

(76) Inventor: Ray W. Sanders, Los Angeles, CA (US)

( * ) Notice: Subject to any disclaimer, the term of this patent is extended or adjusted under 35 U.S.C. 154(b) by 0 days.

(21) Appl. No.: 13/013,717

(22) Filed: Jan. 25, 2011

(65) Prior Publication Data

US 2012/0030360 A1  Feb. 2, 2012

Related U.S. Application Data

(60) Provisional application No. 61/298,487, filed on Jan. 26, 2010.

(51) Int. Cl.
*G06F 15/16* (2006.01)

(52) U.S. Cl.
USPC .......................................... 709/228; 709/236

(58) Field of Classification Search
USPC ................................. 709/228, 236
See application file for complete search history.

(56) References Cited

U.S. PATENT DOCUMENTS

| | | | |
|---|---|---|---|
| 2,541,932 A | 2/1951 | Melhose | |
| 2,986,723 A | 5/1961 | Darwin et al. | |
| 3,162,857 A | 12/1964 | Sanders | |
| 3,168,722 A | 2/1965 | Sanders | |
| 3,218,557 A | 11/1965 | Sanders | |
| 3,383,598 A | 5/1968 | Sanders | |
| 3,480,865 A | 11/1969 | Sanders | |
| 3,486,118 A | 12/1969 | Sanders et al. | |
| 3,665,405 A | 5/1972 | Sanders et al. | |
| 3,744,051 A | 7/1973 | Sanders et al. | |
| 3,978,449 A | 8/1976 | Sanders et al. | |
| 5,406,550 A * | 4/1995 | McTiffin | 370/335 |
| 5,502,723 A | 3/1996 | Sanders | |
| 6,041,050 A | 3/2000 | Sanders | |
| 6,636,512 B1 * | 10/2003 | Lorrain et al. | 370/392 |
| 6,754,221 B1 * | 6/2004 | Whitcher et al. | 370/401 |
| 6,920,113 B1 * | 7/2005 | Kovvali et al. | 370/255 |
| 7,420,988 B1 * | 9/2008 | Grossman | 370/466 |
| 2002/0126685 A1 * | 9/2002 | Leatherbury et al. | 370/432 |
| 2004/0214582 A1 * | 10/2004 | Lan et al. | 455/452.2 |
| 2005/0207436 A1 | 9/2005 | Varma | |
| 2005/0220148 A1 | 10/2005 | Delregno et al. | |
| 2006/0056443 A1 * | 3/2006 | Tao et al. | 370/462 |
| 2007/0067487 A1 | 3/2007 | Freebairn et al. | |

OTHER PUBLICATIONS

Cisco01; "Guide to ATM Technology"; 2000; Cisco Systems Inc; Text No. 78-6275-03; pp. 1-266.*
International Search Report and Written Opinion dated Sep. 27, 2011, in related International application No. PCT/US2011/022542, 10 pp.
Sanders, R.W. "Communication Efficiency Comparison of Several Communication Systems," *Proceedings of the IRE*, vol. 48, No. 4, pp. 575-588, Apr. 1960.

(Continued)

*Primary Examiner* — Jeffrey Nickerson
(74) *Attorney, Agent, or Firm* — Knobbe, Martens Olson & Bear LLP

(57) ABSTRACT

An apparatus and method for network routing is provided. Synchronized networks are disclosed which enable fast connection set up and release in a tiered hierarchy of circuit switched nodes. Nodes in the network aggregate and disaggregate data according to a transform algorithm allowing for dynamic frame and frame segment sizing. Connections within the network are organized by paired connections performing aggregation and disaggregation according to control vectors.

8 Claims, 24 Drawing Sheets

Key Details of an Aggregation / Disaggregation Switch Pair

(56) References Cited

OTHER PUBLICATIONS

Sanders, Ray W. and Vinton G. Cerf. "Compatibility or chaos in communications." Datamation, Mar. 1976, pp. 50-55.
Sanders, Ray W. and deSmet, Joe. "*A Network Combining Packet Switching and Circuit Switching in a Common System*" ACM Computer Communication Review, 1976.
Sanders, Ray W. "System Requirements Assuring That Point-to-Multipoint Broadband Wireless Access Networks Are Agnostic to User and Network Protocols", IEEE 802.16mc-99/01, Jun. 1999.
Sanders, Ray W. "Proposal for a MAC Layer Approach Agnostic to Higher Level Protocols", IEEE 802.16mp-99/11, Nov. 1999.
Sanders, Ray W. "A Proposed Approach to Defining an Interoperable MAC/PHY Layer Scheduler for 802.16", IEEE 802.16mp-99/11, Nov. 1999.
Sanders, Ray W. "Proposed Amendments to MAC/PHY Layers to Include a Bandwidth-On-Demand MAC Sublayer" IEEE 802.16.1mp-00/05, Jan. 2000, (2 parts).
Sanders, Ray W. "Proposed Amendments to Include a Bandwidth-On-Demand MAC/PHY Sublayer Option", IEEE 802.16.1pc-00/06, Jan. 2000.
Sanders, Ray W. "Bandwidth-on-demand layer 1.5 protocols for enhanced broadband wireless access system performance", Wireless Communications and Networking Conference, 2000.
Sanders, R. W. "The Digilock Orthogonal Modulation System," Advances in Communication Systems, edited by A. V. Balakrishnan, vol. 1, 1965.
International Preliminary Report and Written Opinion; International application No. PCT/US2011/022542, mailed Aug. 9, 2012.
Dr. Sanchita Mal-Sarkar, PowerPoint Presentation titled "Asynchronous Transfer Mode (ATM)" dated Jul. 30, 2003 in 18 pages, Cleveland State University, Ohio.
Bormann, et al., RFC 3095 Robust Header Compression (ROHC), Jul. 2001, in 168 pages, The Internet Society.

\* cited by examiner

A Bright Line Separation of User Data from
Data Transport and NetworkControl

Hierarchical Core Network Tiers Using SAIN Technology

**Cell Slot Multiplexer
Prior Art**

**Cell Slot Selector
Prior Art**

Connection Domain Resulting in Equally Spaced Time Domain Cellets

Results for Non-Power-of-Two Length Frame Examples

Results for Non-Power-of-Two Number of Cellets per Frame

Basic Two-Tier SAIN Network Structure
Supporting E-Node-to-E-Node Paths

A Metropolitan Network Example with 20 T-Nodes & 40 Duplex Trunks

Switch Stack Selector

Basic Switch Elements Used In SAIN Networks

Apparatus for Changing Switch Clock Rates

Changing Switch Clock Flow Rates Flow Chart

Apparatus for Changing Connection Comparator: Bandwidth Register Stage

Apparatus for Changing Bandwidth Ranges of Connection Domain Connections

Basic Aggregation / Disaggregation Switch Pairs

Key Details of an Aggregation / Disaggregation Switch Pair

Flow Chart Defining Processes to Set Up a New Connection

Various Configurations of E-Nodes and Their T-Node Parents

Connection Domain: Source End Aggregation Methods

Connection Domain: Destination End Dissagregation Methods

Source E-Node Aggregation Parts of Path Switches

Destination E-Node Disaggregation Parts of Path Switches

Diagram with 1 Path-Level Switch Pair, 2 Level-2 F..., And 3+ Level-3 Pairs that Connect each Source E-Node Child of T-Node (T06) to each Destination E-Node Child Of T-Node (T11).

Source E-Nodes Connecting to Parent T-Node T06

Destiatnion E-Nodes Connecting from Parent T-Node T11

Source E-Node Aggregation Switches to Aggregate User Connections into Paths Each of which Connects to a Different Destination E-Node Destination E-Node Disaggregation Switches to Disaggregate User Connections from Each Path Connected to a Different Source E-Node Crossconnect Switches that Result in Each E-Node Child of One Parent T-Node (T06) Connecting to All E-Node Children of a Second T-Node (T11).

Source T-Node 06 using a Crossconnect Switch to reorient each of the 25 Level 2 aggregations of 499 paths from One-to-Many to Many-to-One Destination T-Node 11 using Cross Connections to form a Many-to-One Mapping from 20 T-Nodes to the 25 E-Node children of T-Node 11

| Bandwidth and Latency for a Level 3 Switch | | | | | Nbr Clock Periods |
|---|---|---|---|---|---|
| L3 Clock Rate | 1.562500 Ghz | Clock Period | 0.640 | nsec | |
| L3 Cellet Size | 64 bits | L3 Frame Segments | 1 | | |
| L3 Frame Rate | 312.500 Mbps | L3 Subframe Period | 3.200 | nsec | 5 |
| L3 Frame Period | 3.200 nsec | L3 Min Aggregate Bandwidth | 20.000 | Gbps | 5 |
| L3 QDR | 20.000 Gbps | L3 MaxAggregate Bandwidth | 100.000 | Gbps | 5 |
| Bandwidth and Latency for a Level 2 Switch | | | | | |
| L2 Clock Rate | 1.562500 Ghz | Clock Period | 0.640 | nsec | |
| L2 Cellet Size | 16 bits | L2 Frame Segments | 50 | | |
| L2 Frame Rate | 6.250 Mbps | L2 Subframe Period | 3.200 | nsec | 5 |
| L2 Frame Period | 160.000 nsec | L2 Min Aggregate Bandwidth | 5.000 | Gbps | 250 |
| L2 QDR | 100.000 Mbps | L2 MaxAggregate Bandwidth | 25.000 | Gbps | 5 |
| Bandwidth and Latency for a Path Level Switch | | | | | |
| Path Clock Rate | 1.562500 Ghz | Clock Period | 0.640 | nsec | |
| Cellet Size | 1 bit | Frame Segments | 50 | | |
| Frame Rate | 125 Kfps | Subframe Period | 160.000 | nsec | 250 |
| Frame Period | 8 μsec | Min Aggregate Bandwidth | 6.250 | Mbps | 12500 |
| QDR | 125 Kbps | MaxAggregate Bandwidth | 1.563 | Gbps | 250 |

751 — A First Example of SAIN Aggregation Tiers

Fig. 26a

| Bandwidth and Latency for a Level 3 Switch | | | | | Nbr Clock Periods |
|---|---|---|---|---|---|
| L3 Clock Rate | 1.280000 Ghz | Clock Period | 0.781 | nsec | |
| L3 Cellet Size | 128 bits | L3 Frame Segments | 1 | | |
| L3 Frame Rate | 256.000 Mbps | L3 Subframe Period | 3.906 | nsec | 5 |
| L3 Frame Period | 3.906 nsec | L3 Min Aggregate Bandwidth | 32.768 | Gbps | 5 |
| L3 QDR | 32.768 Gbps | L3 MaxAggregate Bandwidth | 163.840 | Gbps | 5 |
| Bandwidth and Latency for a Level 2 Switch | | | | | |
| L2 Clock Rate | 1.280000 Ghz | Clock Period | 0.781 | nsec | |
| L2 Cellet Size | 16 bits | L2 Frame Segments | 32 | | |
| L2 Frame Rate | 8.000 Mbps | L2 Subframe Period | 3.906 | nsec | 5 |
| L2 Frame Period | 125.000 nsec | L2 Min Aggregate Bandwidth | 4.096 | Gbps | 160 |
| L2 QDR | 128.000 Mbps | L2 MaxAggregate Bandwidth | 20.480 | Gbps | 5 |
| Bandwidth and Latency for a Path Level Switch | | | | | |
| Path Clock Rate | 1.280000 Ghz | Clock Period | 0.781 | nsec | |
| Cellet Size | 1 bit | Frame Segments | 64 | | |
| Frame Rate | 125 Kfps | Subframe Period | 125.000 | nsec | 160 |
| Frame Period | 8 μsec | Min Aggregate Bandwidth | 8.000 | Mbps | 10240 |
| QDR | 125 Kbps | MaxAggregate Bandwidth | 1.280 | Gbps | 160 |

752 — A Second Example of SAIN Aggregation Tiers

Fig. 26b

| Bandwidth and Latency for a Level 3 Switch | | | | | |
|---|---|---|---|---|---|
| L3 Clock Rate | 4.194304 Ghz | Clock Period | 0.238 nsec | | Nbr Clock Periods |
| L3 Cellet Size | 8 bits | L3 Frame Segments | 1 | | |
| L3 Frame Rate | 1.048576 Gbps | L3 Subframe Period | 0.954 | nsec | 4 |
| L3 Frame Period | 0.954 nsec | L3 Min Aggregate Bandwidth | 8.388608 | Gbps | 4 |
| L3 QDR | 8.388608 Gbps | L3 MaxAggregate Bandwidth | 33.554432 | Gbps | 4 |
| Bandwidth and Latency for a Level 2 Switch | | | | | |
| L2 Clock Rate | 4.194304 Ghz | Clock Period | 0.238 nsec | | |
| L2 Cellet Size | 1 bits | L2 Frame Segments | 128 | | |
| L2 Frame Rate | 8.192 Mbps | L2 Subframe Period | 0.954 | nsec | 4 |
| L2 Frame Period | 122.070 nsec | L2 Min Aggregate Bandwidth | 1.048576 | Gbps | 512 |
| L2 QDR | 8.192 Mbps | L2 MaxAggregate Bandwidth | 4.194304 | Gbps | 4 |
| Bandwidth and Latency for a Path Level Switch | | | | | |
| Path Clock Rate | 1.048576 Ghz | Clock Period | 0.954 nsec | | |
| Cellet Size | 1 bit | Frame Segments | 128 | | |
| Frame Rate | 64 Kfps | Subframe Period | 122.070 | nsec | 128 |
| Frame Period | 15.625 μsec | Min Aggregate Bandwidth | 8.192 | Mbps | 16384 |
| QDR | 64 Kbps | MaxAggregate Bandwidth | 1.048576 | Gbps | 128 |

753 — A Third Example of SAIN Aggregation Tiers

Fig. 26c

| Bandwidth and Latency for a Level 3 Switch | | | | | |
|---|---|---|---|---|---|
| L3 Clock Rate | 4.194304 Ghz | Clock Period | 0.238 nsec | | Nbr Clock Periods |
| L3 Cellet Size | 32 bits | L3 Frame Segments | 1 | | |
| L3 Frame Rate | 1.048576 Gbps | L3 Subframe Period | 0.954 | nsec | 4 |
| L3 Frame Period | 0.954 nsec | L3 Min Aggregate Bandwidth | 33.554432 | Gbps | 4 |
| L3 QDR | 33.554432 Gbps | L3 MaxAggregate Bandwidth | 134.21773 | Gbps | 4 |
| Bandwidth and Latency for a Level 2 Switch | | | | | |
| L2 Clock Rate | 4.194304 Ghz | Clock Period | 0.238 nsec | | |
| L2 Cellet Size | 1 bits | L2 Frame Segments | 128 | | |
| L2 Frame Rate | 8.192 Mbps | L2 Subframe Period | 0.954 | nsec | 4 |
| L2 Frame Period | 122.070 nsec | L2 Min Aggregate Bandwidth | 1.048576 | Gbps | 512 |
| L2 QDR | 8.192 Mbps | L2 MaxAggregate Bandwidth | 4.194304 | Gbps | 4 |
| Bandwidth and Latency for a Path Level Switch | | | | | |
| Path Clock Rate | 1.048576 Ghz | Clock Period | 0.954 nsec | | |
| Cellet Size | 1 bit | Frame Segments | 128 | | |
| Frame Rate | 64 Kfps | Subframe Period | 122.070 | nsec | 128 |
| Frame Period | 15.625 μsec | Min Aggregate Bandwidth | 8.192 | Mbps | 16384 |
| QDR | 64 Kbps | MaxAggregate Bandwidth | 1.048576 | Gbps | 128 |

754 — A Fourth Example of SAIN Aggregation Tiers

APPARATUS AND METHOD FOR SYNCHRONIZED NETWORKS

PRIORITY CLAIM

This patent application claims the benefit of the filing date of the U.S. Provisional Patent Application Ser. No. 61/298,487, filed Jan. 26, 2010 and entitled APPARATUS AND METHOD FOR SYNCHRONIZED NETWORKS, the entire contents of which are hereby expressly incorporated by reference.

BACKGROUND

1. Field

This disclosure relates generally to networking and communication control.

1. Related Art

The high-level architecture for large-scale data networks has reached a consensus that is not likely to change for the predictable future. The architecture has evolved from forwarding messages and files from one computer to another to a full-blown structure that can carry all types of data traffic globally from any source to any destination. Now that the architecture is agreed upon and implemented in more than one embodiment (e.g., ATM and MPLS), there is a need to find new methods and apparatus to transfer bits reliably with low latency at data rates much greater than currently exist. This application discloses a plurality of methods and apparatus that meets these goals while focusing on simplicity, low cost, and low power consumption.

Starting in the early 1970s, there were two main approaches to applying digital technology to overcome the limitations of analog telephony and telegraphy. One was to build a digital telephone network focused on higher quality digitized voice; the other was to build a digital data network based on store and forward packet switching with emphasis on reliability at the expense of quality. Packet switching has prevailed because of its flexibility and the huge investment made to improve quality while maintaining flexibility compared to the voice network. The digitized voice effort is approaching obsolescence while the packet switching approach has some serious limitations based on architectural and implementation decisions made long ago.

Four basic methodologies of networks need fundamental review to redefine future networks' capabilities compared to the current networking environment. These are:
1. Data encapsulation methods
2. Data switching methods
3. Packet buffering methods
4. Traffic routing methods The first aspect, data encapsulation, describes methods of fragmenting data into elements transferable from one point to another in a shared container. Sources can be computers, telephones, cameras, microphones, sensors, or other devices as long as they are in digital form.

Data encapsulation is very restrictive in digital voice networks. These digital voice networks are based on "octets" in a digital time division multiplex hierarchy. As implemented, these networks have limited capability to handle data traffic as proven by the telephone company voice-centric networks that exist. Data-centric networks evolved separated from the voice network. These data-centric networks typically encapsulate data into packets. Packet multiplexing adds information to each source data fragment that identifies source and destination locations plus other information. The added information may include service class, data format details, error detection and correction, and other purposes such as network control. In other words, encapsulation involves adding "headers," "options," "error control," and other parameters. Data encapsulation extends to protocol "layers" as a part of packet protocols' standardization methods. Each layer has a name (e.g., Link, Network, Transport, etc.). This can require additional headers and other information. Including protocol layers within a network generally results in longer packets. As a result, these layers often use substantial overhead bandwidth beyond that necessary to transport data.

Data encapsulation using these headers is a necessity in packet-based networks; but the method creates several difficulties. One is the bandwidth required by the required packet overhead. Another is the delay required to fill a packet buffer with bits from relatively low data rate sources such as digitized voice. The process of encapsulating voice requires tens of milliseconds to overcome the even greater header bandwidth that would be required to send shorter voice packets. In addition, packet buffers within routers are needed to smooth traffic can result in delay variation and jitter. Still another difficulty is that even a single bit error in a packet header can cause faulty delivery and/or discard of packets. The consequence is interruption of service and data loss that causes delay in addition to requiring substantial processing within routers to re-forward discarded packets. The line of reasoning that led to the way networking works today leads now to the question, "Encapsulating data into packets is a great idea, but isn't there an approach that forwards data imprisoned within packets in short bursts as small as one bit without relying on reading each packet's header, label or tag at each switch node?" Reading tags is much faster than reading a packet header, but improvements can be made. This application discloses methods of overcoming these restrictions by using a simple circuit switch with short time-division frames.

A second aspect, switching methods, is quite simple in the voice network, but its encapsulation methods limit use of the network for data. In the data network, using asynchronous switching methods to forward packets from one destination to another was a breakthrough for assuring message delivery with statistical time division multiplexing (as long as substantial overprovisioning of bandwidth is present). The methods assure delivery from a source to a destination in a network with faulty transmission facilities or under hazardous operational conditions. They also assure more efficient use of available bandwidth than exists with static time division multiplexing. However, the circumstances that were common forty years ago are no longer very common today. Comparing statistical multiplexing with static time division multiplexing is a popular way to "prove" the benefits of packet over circuit switching. This overlooks the prospect that time division multiplexing can be extremely dynamic if properly designed. These designs are shown in the present application.

Asynchronous switching resolved the limitations of synchronized networks as engineered for voice service. Unfortunately, the result has now become the ossified judgment of conventional industry wisdom that circuit switching is unusable for current and future networks. This perception resulted from the inflexibility of the technology that was state of the art for the telephone industry and not the real possibilities for circuit switching disclosed in this application.

In the past, time division multiplexing was limited in several ways. One was a perceived restriction to integer division of a high data rate link into a plurality of smaller data rate links. Another was that a connection set up as a circuit remained connected for the duration of a telephone call; no mechanism existed to restrict a circuit epoch to milliseconds, microseconds, or nanoseconds necessary for handling bursty data. Third, no methods existed to rapidly change the bandwidth allocated to a connection, a mandatory requirement to achieve efficient use of available bandwidth for multimedia and video applications.

Placing data into "packets" emerged as a part of the solution to overcome the limitations of "one-off" systems such as the telephone network. Data packets will continue to be a great invention for the predictable future. The Internet Protocol has indeed become the lingua franca for all user communications. In this context, using the slogan "IP everywhere" to refer to the network edge is a great idea. Whether it should apply to network internals for the future is highly questionable. The objective of this application is to provide the next generation with an internal network for the IP-centric Internet and other networks that overcomes the shortcomings of current practice.

There is no law of nature demanding that the random (i.e., stochastic) nature of user data arrivals require stochastic network solutions. The complexity of overcoming the stochastic properties of asynchronous packet networks with extensive overlays is sufficient evidence of the need for another solution. This leads to asking the question, "Why use even more network complexity with such ideas as 'circuit emulation' when the real thing can be simple and effective?" Networking can now use the remarkable potential of today's technology at low cost, especially in network timing, storage, and computer processing. Modern technology can surmount the shortcomings of asynchronous networking that begins with the question: "With so much highly evolved technology, can't we build synchronized node networks that overcome much of the today's complexity while improving scalability and performance at lower cost?" This disclosure provides methods to reduce network complexity and improve switching performance.

The third aspect of current networking is the placement of packet buffers within today's networks. When the Internet was first invented (as the ARPANET within the U.S. Department of Defense), the smallest computers in service were minicomputers. Microcomputers did not exist in commercial use with substantial processing power. Commercial input/output devices were terminals that had no significant processor or storage capability. The best possible methods at the time for dealing with "bursty" data was to accept all data on arrival within the minicomputers when there was not enough communication bandwidth to send it as it arrives. The initial answer, like message switching store and forward processors, was to store data within internal First-In-First-Out (FIFO) buffers. If the buffers were too small to hold all the incoming traffic, discarding packets selectively became a method of choice for solving congestion problems. Cost was the primary driving parameter to this result. Computer data storage was very expensive. As computer data storage has become very inexpensive, packet buffers have also grown.

Internal network buffers exacerbate the stochastic nature of current networks and greatly increase network complexity, jitter, delay, packet loss rates, and cost. The side effects include requiring traffic shaping and policing a customer's use of bandwidth. Internal network buffers are often the culprits of poor service. When traffic intensity is high, they suffer from congestion when there is more traffic than a router or outgoing links can handle. Discarding packets as a remedy requires data sources to resend the lost packets. This only intensifies the traffic when traffic intensity was the cause of the congestion in the first place. Today, large computer storage units—semiconductor as well as hard drives—are cheap. They can exist at ingress ports without discarding packets. Even so, the original approaches to congestion still prevail in current network architectures. Certainly, it is hard to argue that inside-the-network buffers enhance Quality of Service or performance; they merely result in stochastic "best efforts" service with unpredictable performance. These buffering problems have recently been termed "buffer bloat" and identified as causes for network delay and causes for some high latency. Question: "Are we still using the same methods because 'that's the way we've always done it', or are there real operational and cost reasons that require placing buffers inside the data transport portion of networks?" The deficiencies and delays of current networks can be improved by the methods provided in this disclosure, which avoids the necessity of discarding packets by only accepting at ingress packets which can be guaranteed delivery through the network.

The fourth aspect of both packet- and circuit-switched networks is their focus on dynamic routing of connections. Packet-switched networks focus on interconnecting "autonomous systems" through border gateways in a predominantly flat network. Circuit-switched (voice) networks focus on large (Class 4 and Class 5) switches in what was originally a five-tier hierarchy that narrowed down over time to just two tiers. Network architectures have demanded the use of dynamic routing of connections. There has been no simple alternative to overcome the so-called n-squared problem of connecting hundreds of million (and now rising toward hundreds of billions) of connectable entities with one another. [If n is the number of connectible entities, there must be n−1 connections available to allow each entity to connect to every other entity. The required number of connections is n×(n−1) that is, for large values of n, close to "n-squared," a well-known source of network routing problems.] This raises the question, "Isn't there a possibility of making n-squared our friend by massively distributing network control to provide multiple contemporary routes per path?"

General background for this disclosure includes U.S. Pat. Nos. 5,502,723 and 6,041,050 relating to Synchronized Adaptive Infrastructure (SAIN) networks issued to the application's inventor. This application incorporates these patents in their entirety by reference. The patents describe apparatus and multiplexing methods with unique capabilities that establish communications channels within a transmission link quickly. Unlike other known capabilities, the approach enables fast connection setup and release plus quickly changing the bandwidth of connections as well.

There is a need in the art for techniques to switch and send data in an underlayer structure that focuses on overcoming the current art limitations listed above in the four aspects along with other aspects of networking.

SUMMARY

In one embodiment, a method of network routing from a network entry node is provided. The method includes receiving network communications from a plurality of external devices, each network communication directed to a destination node. The method also includes aggregating the network communications into a plurality of paths, each path comprising a portion of the networking communications associated with a single destination node and composed of a plurality of path frames, the path frames synchronized with the single destination node and including a plurality of path cellets composed of path data. The method also includes further aggregating the plurality of paths into a plurality of superpaths, each superpath comprising the portion of the plurality of paths associated with a single intermediate node and composed of a plurality of superpath frames, the superpath frames synchronized with the intermediate node and including a plurality of superpath cellets composed of superpath data. The method includes transporting the plurality of superpaths to a transport node. In this method, the path cellets and superpath cellets may be dynamically sized. In an embodiment, the path cellets and superpath cellets have different sizes. In an embodiment, the path cellets and superpath cellets can be sized at one bit, either alone or simultaneously. In an embodiment, the plurality of superpaths are transported to the intermediate nodes via a plurality of transmission routes. In an embodiment, the cellets are dynamically sized by transmitting control vectors indicative of the cellet size and a frame on which the cellet size will be dynamically sized.

In one embodiment, a method of network data routing at an entry node is provided, including receiving networking communications from an external device, the networking communications designating an exit node. The method also includes establishing a paired connection with the exit node by passing control vectors to the exit node, the connection including a bandwidth. The method also includes maintaining the paired connection with the exit node, the maintenance including adjusting the bandwidth according to the received networking communications. The method also includes aggregating the networking communication from the external device into an aggregated data stream, the aggregated data stream comprising implicitly addressed frames, the implicitly addressed frames synchronized to the exit node. In the method, the control vectors passed to the exit node include data indicative of disaggregating the implicitly addressed frames, such that disaggregation of the aggregated data stream is performed by the paired connection at the exit node. In an embodiment, the paired connection can have a bandwidth of zero. In an embodiment, the networking communications comprise packets, each packet including an addressing header, and wherein the aggregating step comprises stripping the addressing header from the networking communications; and wherein the control vectors include information to reconstitute the addressing header at the exit node. In an embodiment, the aggregated data stream is one of a plurality of aggregated data streams, each aggregated data stream associated with an exit node and the method further comprises the steps of aggregating the plurality of data streams into an intermediate data stream, the intermediate data stream associated with an intermediate data node, wherein the intermediate data node is a parent node of the exit nodes associated with the plurality of data streams, and establishing and maintaining a paired connection with the intermediate data node, the paired connection with the intermediate data node including information indicative of disaggregating the intermediate data stream.

In an embodiment, a network transit node includes a plurality of links each corresponding to a network entry node of a plurality of network entry nodes, each of the plurality of links transferring a source data stream to the network transit node, the source data stream comprising an aggregation of a plurality of origin superpaths, each origin superpath associated with a destination transit node of a plurality of destination transit nodes, and each origin superpath comprising an aggregation of paths from the network entry node to a plurality of destination exit nodes. The network transit node also includes a plurality of source data stream disaggregation switches, each disaggregation switch receiving a source data stream from a link of the plurality of links to network entry nodes, and each source data stream disaggregation switch configured to disaggregate the plurality of origin superpaths from each source data stream. The network transit node also includes a plurality of crossconnect switches, each crossconnect switch corresponding to a unique destination transit node of the plurality of destination transit nodes, each crossconnect switch configured to receive the origin superpaths associated with the destination transit node corresponding to the crossconnect switch, disaggregate the origin superpaths to recover the paths from the network entry nodes to the destination exit nodes, and aggregate the paths from the network entry nodes to the destination exit nodes to form destination superpaths, each destination superpath comprising paths from a plurality of entry nodes to a single destination node associated with the unique destination transit node. The network transit node also includes a plurality of transfer node aggregation switches, each transfer node aggregation switch configured to aggregate a plurality of destination superpaths associated with a destination transit node to form a transit data stream. The network transit node also includes a plurality of outbound links configured to transfer each transit data stream to the plurality of destination transit nodes. In an embodiment, each of the plurality of links receives control vectors from the plurality of entry nodes, the control vectors including data indicative of disaggregation information. In an embodiment, the control vectors further include information indicative of bandwidth adjustment requests from the entry nodes. In an embodiment, the network transit node provides synchronization information to the plurality of network entry nodes to synchronize the transit node with the plurality of network entry nodes. In an embodiment, at least one of the plurality of the transit data streams is transmitted by more that one of the plurality of outbound links. In an embodiment, the aggregation and disaggregation is performed by a synchronized, implicitly-addressed transform algorithm.

BRIEF DESCRIPTION OF THE DRAWINGS

FIGS. 26a, 26b, 26c, and 26d show examples of aggregation tiers.

FIGS. 27a, 27b, 27c, and 27d shows various frames and subframe Connection Domains with accompanying Time Domains according to embodiments.

DETAILED DESCRIPTION OF THE EMBODIMENTS

Details, with reference to the figures, disclose several illustrative preferred embodiments for implementing the system and method of this application. A person of ordinary skill in the art to which the device and method described herein pertain will understand or appreciate the features of certain embodiments. Such a "person of ordinary skill in the art" is a "skilled artisan" for conciseness and readability.

A skilled artisan, in light of this disclosure, will appreciate that certain components described herein can advantageously be implemented using computer software, hardware, firmware, or any combination of software, hardware, and firmware. Though network nodes will typically implement control elements in hardware or firmware, any control logic that can be implemented using hardware is implementable using various combinations of hardware, software, or firmware not described herein. For example, firmware or software on a general-purpose computer can completely implement such control.

A skilled artisan, in light of this disclosure, could divide or combine the modules described herein. For example, in light of this disclosure, a skilled artisan will appreciate that a single component can provide the functionality of a number of components in a network. Conversely, any one component is divisible into multiple components.

The foregoing and other variations to the embodiments described herein are achievable by a skilled artisan without departing from the invention. With the understanding therefore, that the described embodiments are illustrative and that the invention is not limited to the described embodiments, certain embodiments are described below with reference to the drawings.

Top Level Overview of a Synchronized Adaptive INfrastructure (SAIN)

Figure 1:
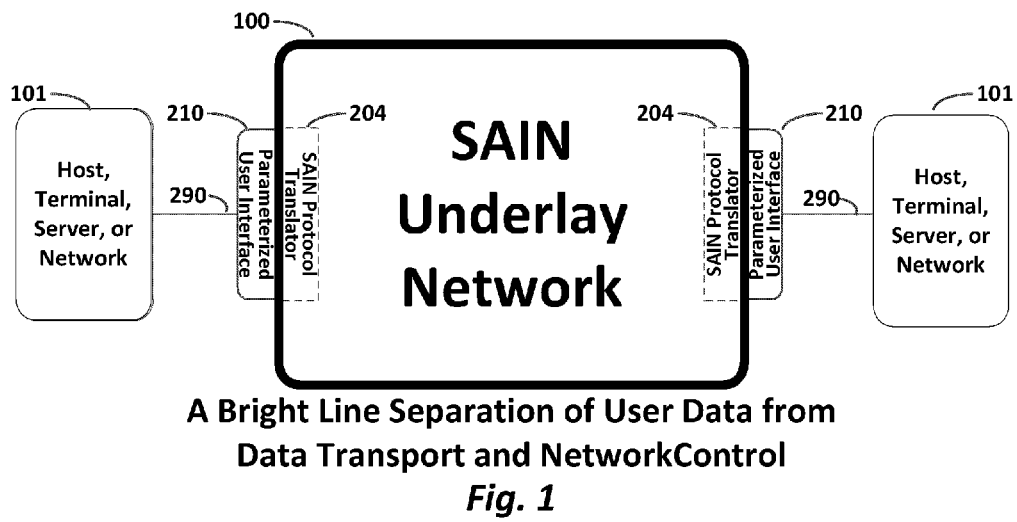
FIG. 1 shows an underlay network according to an embodiment.

Synchronized Adaptive INfrastructure (SAIN) is a digital networking technology that enables setting up and taking down circuit connections in less than a millisecond. This technology is the subject of the present application. The technology enables a bright line separation of user data from routed data transport as shown in FIG. 1. It makes use of synchronized switching nodes that can reduce required Quality of Service metrics used in current practice to a single parameter—latency.

The forwarding delay at SAIN transit nodes can be a few nanoseconds with no greater jitter or delay variation. The SAIN approach can also greatly reduce system power consumption due to the technology using data fragments as short as one bit with time division switches tied to semi-static memory maps. No data headers exist for routing within the network and there are no jitter-producing packet buffers. All packet buffers exist only at ingress and egress nodes that connect to user terminal equipment.

Figure 2:
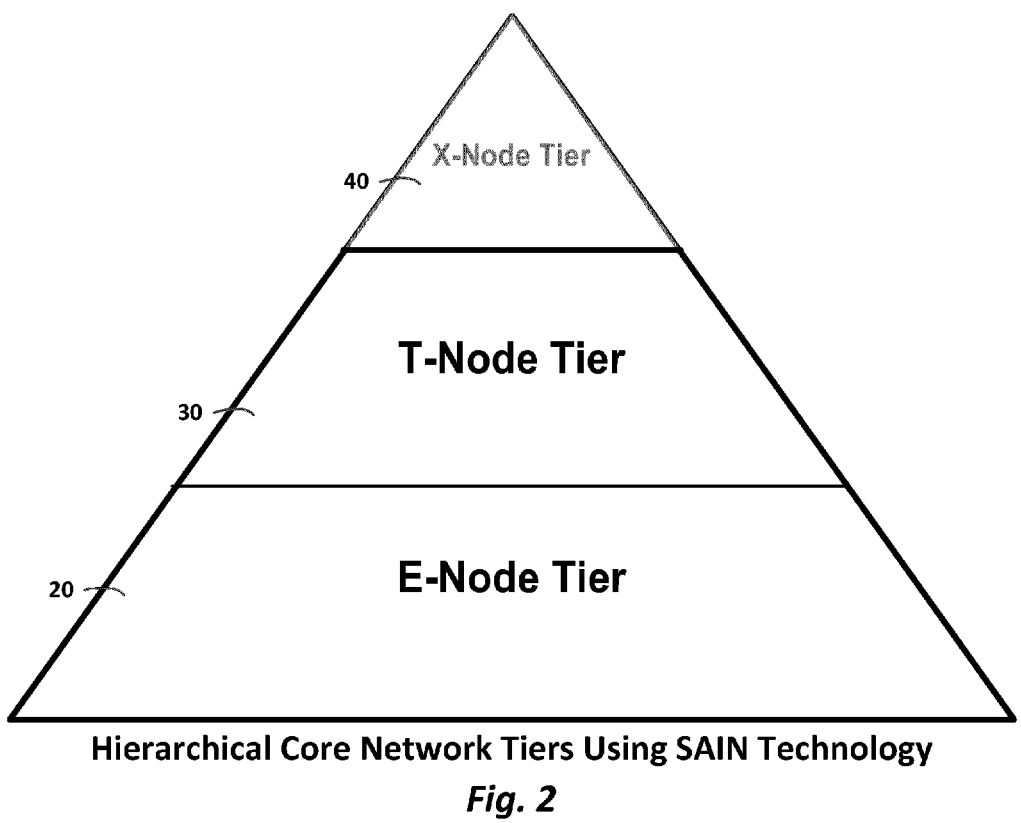
FIG. 2 shows a diagram of hierarchical core network tiers according to an embodiment.

Although the technology disclosed herein is usable in a number of network architectures and structures, this application focuses on a two-tier structure shown in bottom the two tiers of FIG. 2, viz.: an Entry/Exit Node Tier, i.e. an E-Node Tier 20, and a Transit Node Tier, i.e., a T-Node Tier 30. A third tier at the top of FIG. 2 shows an eXchange Node Tier, i.e. an X-Node Tier 40 that can provide interconnectivity with other two-tier SAIN networks.

An E-Node is the interface level node of a SAIN network to user devices. A group of E-nodes can be connected to a Transit Node ("T-Node") which performs hierarchical routing to a destination T-node. An E-Node contains Parameterized User Interfaces (PUIs) to the user world and conversion to the SAIN transport world disclosed in this application. Each E-Node switch can set up and manage connections within a path to every other E-Node in a network. It accomplishes this by sending data to and receiving aggregated data from a parent T-Node that can act both as a source T-Node and a destination T-Node. Each source T-Node forwards connection aggregations from each of its child Source E-Nodes segregated into superpaths destined to each T-Node for forwarding on to the children of the T-Node.

A parent source T-Node reaggregates its child source E-Nodes from a one-source-E-Node to all-destination-E-Nodes appearance into one-destination-E-Node from all-source-E-Nodes appearance. It forwards its reaggregations to each T-Node as appropriate in the network. As shown in more detail below, the process contains the following steps:

1. A source E-Node aggregates incoming traffic into paths destined to all other (destination) E-Nodes.
2. The source E-Node aggregates its paths into superpaths destined to destination T-nodes, the superpaths being aggregations of the paths for each destination T-node's child E-nodes.
3. The source E-Node aggregates the superpaths into a higher-level superpath that is capable of forwarding all traffic generated by the source E-Node to its parent source T-Node.
4. The source T-Node rearranges the one-to-many E-Node source structure into a many-to-one destination structure.
5. The source T-Node sends the destination structure to each destination T-Node.

6. The destination T-Node disaggregated the structure and sends all source E-Node traffic to each destination E-Node.
7. The destination E-Node disaggregates the traffic from source E-Nodes into paths for delivery of traffic to users. The process is the disaggregate inverse of the each source E-Node aggregation methods.

Each destination T-Node forwards each source aggregation to the child E-Node destination. The result is a network that uses pre-established routes to remove the need for dynamic hop-by-hop routing. A SAIN network need not replace existing networks, but can overcome limitations that now exist by interconnecting with existing networks. In addition, it provides superior service at low cost and low power requirements in greenfield and upgrade applications, particularly those involved with optical fiber transmission.

The Role of Prior Art

Figure 3A:
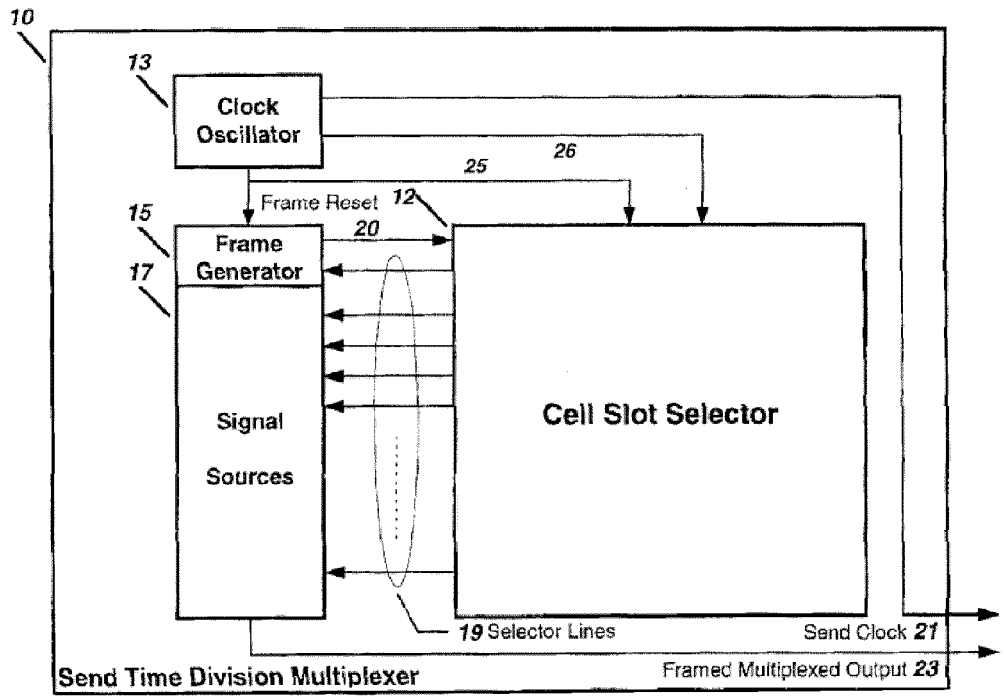
FIG. 3a and FIG. 3b shows prior art diagrams of a cell slot multiplexer.
Figure 3B:
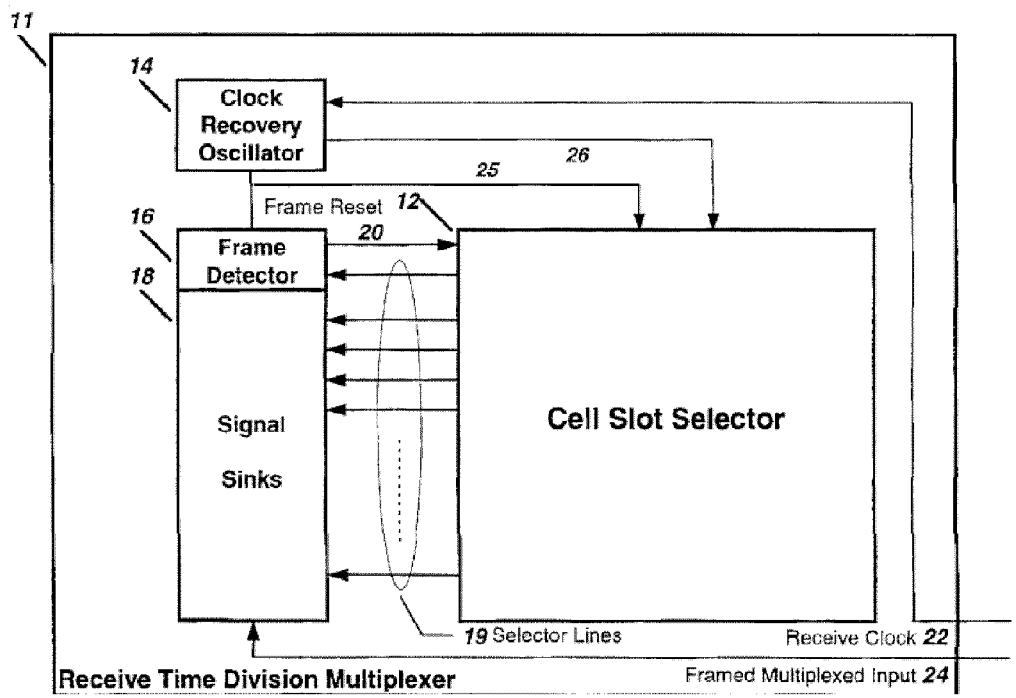
Figure 3C:
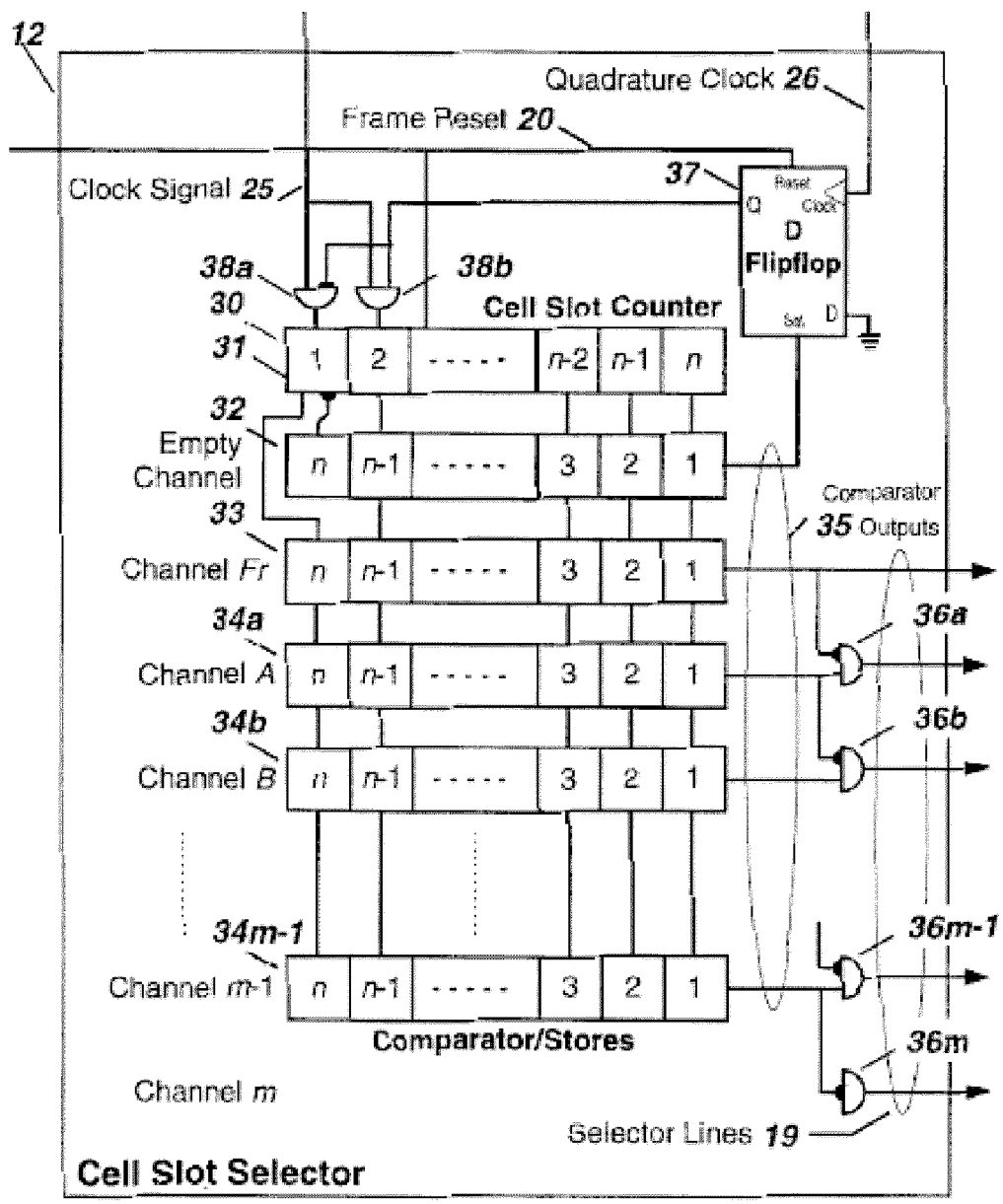
FIG. 3c shows prior art diagram of a cell slot selector.

FIG. 3a, FIG. 3b, and FIG. 3c shows prior art from U.S. Pat. Nos. 5,502,723 and 6,041,050, issued to the inventor. The multiplexer/demultiplexer technology shown in the patents enables making a connection quickly and, once the connection exists, enables changing its bandwidth or releasing it quickly as well. This application can make use of other technology not covered by the referenced patents as long as it has the same or similar functionality. The name "Switch Stack Selector" in this application replaces the name "Cell Slot Selector" of the prior art figures shown. Numerals shown in these figures are unused in this application's specification.

Overall SAIN Structure

FIG. 1 shows the top-level components of a SAIN network. The main feature of the network is the SAIN Underlay Network 100 that is the principal topic of the application. It is that part of the network inside the bright line separation of user data from the transport thereof. Outside the bright line is a user Host, Terminal, Server, or Network 101 attached to a User Interface Coconnection 290 at both ingress and egress network terminations.

A part of a termination at each end of an Underlay Network 100 network includes an inline Parameterized User Interface 210 that connects to a Protocol Translator 214. A Protocol Translator 214 translates any user protocol, including specifically Ethernet, into a serial bit stream where an incoming packet header can be replaced by a Connection Identifier, which is a compressed header that can be as small as one or two bytes.

Inside the Underlay Network 100, there are data units called a cellets. A cellet can be a data fragment whose length is any number of bits, depending on its environment. It is a data element of fixed size for a given data link, but can vary from link to link. A cellet can be as small as one bit or as large a needed to forward high bandwidth aggregations.

Packet-based addressing is termed explicit addressing. Explicit addressing appears in packet-based encapsulation of data. A packet header includes a source and destination address, the formal nature of which depends on a specific protocol, such as the Ethernet and the Internet (IP) Protocol.

Cellets can exist within periodic time division multiplexed frames. Such frames can vary in duration from nanoseconds to seconds depending on the type of data forwarded within a network. A frame is a collection of cellets, the number of which defines the frame size. For a given connection, the position of its cellets determines is its identification.

This method of identifying one connection from another is termed implicit addressing. Implicit addressing enables addressing of a data element, such as a cellet, by its position within a time or space division frame. For example, the third cellet in a time division frame might belong to connection from point A to point B while a fourth cellet could belong to a connection from Point C to point D.

Implicit addressing can reduce the amount of bandwidth required for explicit addressing methods using packet headers and is especially suited to variable speed time division switching applications. This method is very robust compared to using packet headers to identify a connection to which the packet data belongs. Implicit addressing is the basic addressing method used within the world's legacy telephone network.

A major point of differentiation between the telephone network and a SAIN network is the ability of the SAIN network to use cellets of different lengths in different parts of the network. The SAIN multiplexing algorithm can provide transport methods for any type of data protocol that exists outside the SAIN Underlay Network 100.

A second major point of differentiation is that explicit addressing depends upon getting a packet sent to its proper destination without error. With implicit addressing, the likelihood of an error in setting up a connection is extremely small. More importantly, once it is set up, there are no further addressing messages required for the duration of a data epoch, which can vary from sub-microseconds to years. Any data errors that may occur are independent of setting up a connection itself. This is the reason that the telephone network is so reliable with high quality service. The same reliability can occur in a SAIN network. Once a connection is set up, reading of packet headers occurs only at the network edge in order to send a packet to an assigned FIFO buffer connected to a location in a SAIN switch for the duration of a packet flow. If a customer desires private line service, the connection, once set up, can exist for any amount of time as long as the customer pays his bill. There need be no special engineering.

The major shortcoming of the telephony approach results from the methods used to setup a connection; time was ridiculously long for data applications. In a SAIN network, the connection time including setup time can be one millisecond or less without wasting bandwidth In many circumstances, a connection can switch from a virtual state or a sleep state to a real state in microseconds or less using a one-way message that can often be one byte or less in length encapsulated in Control Vectors. A virtual state requires no bandwidth, and a sleep state uses a very small amount of keep-alive bandwidth. Virtual and sleep states are further described below. A Control Vector can be an implicitly addressed message made up of cellets, each of which is a message applied to some aspect of a communication process.

Two parameters determine the cellet and frame size required in a SAIN network. These are:
1. trunk or link data rate (bits per second); and
2. the minimum amount of bandwidth required to transport a user connection.

For purposes of this application, a trunk is a physical object such as an optical fiber, wired, or wireless connection that carries data traffic across a network. A link is a logical object that is a connection embedded within a trunk. Both a link and a trunk generally carry a plurality of connections such as implicitly or explicitly defined time/space division objects.

For example, a one-gigahertz (Ghz) link data rate link can support a connection whose data rate is less than one gigabit per second (Gbps) with a one-bit cellet. The number of cellets in a frame size depends on the minimum amount of bandwidth required. A frame period is the product of the number of cellets per frame and the link data rate. The minimum amount of bandwidth required, called the Quantum Data Rate (QDR) equals the cellet size divided by the period of a frame. The frame period is the number of cellet per frame divided by the link data rate. For example, If a frame period is one microsecond and the cellet size is one bit, the QDR is 1,000,000 bits per second. For link data rates greater than 1 Gbps, a cellet can be larger. For example, an 8-bit cellet can encapsulate an aggregation of one-bit cellets where the data rate of the aggregation is 8 Gbps or less. For a one-microsecond frame, the QDR would be 8,000,000 bits per second.

The embodiments of this application divide traffic made up of either aggregations of user connection data or aggregations of such aggregations into frames of cellets. They use methods of setting up a connection and its bandwidth by: 1) defining the number of cellets per frame for each connection or aggregations thereof, and 2) providing a clocking mechanism that places each data cellet into an assigned physical time and/or space location within the frame. The term "connection" is a generic term used for an aggregation of connections as well as for a connection at the user level.

Methods disclosed in this application use Synchronized Adaptive Infrastructure technology; they are "SAIN" methods. SAIN methods disclosed herein are useful for implementing digital communication networks for any purpose. One goal is to build networks that interconnect with and use components of existing networks. A second goal is to lay a foundation for a new generation of networking to meet current and future challenges. The embodiments focus on methods that that can benefit future networking in general while significantly enhancing current networks.

To make the methods and apparatus easy to explain and understand, the examples used in the drawings and discussion are for Metropolitan Networks in general and Metropolitan Ethernet Networks in particular. Doing so does not limit the use of the technology in other contexts in any way. This application usually described apparatus in hardware terms. As is known to those skilled in the art, components described in hardware can also be implemented in software, and software versions can produce the same results.

The following are some of the basic aspects of the technology and words used to define its methods either in the aggregate or individually:

1. Two-point connection controls can eliminate the need for hop-by-hop connection routing. This establishment of connections and dynamic control of their bandwidths can take place only at source and destination points inside the bright line SAIN Underlay Network 100. This network control is separated from user data protocols.
2. The network's control plane is physically and logically unreachable from a user port, thereby enhancing network security.
3. Connections can be set up on a simplex basis; a duplex connection consists of two simplex connections.
4. SAIN networking can exist in a hierarchical network topology of two or more tiers thereby enabling massive distribution of network control.
5. Synchronizing network nodes to a common clock can eliminate most of the complexity and stochastic nature of asynchronously clocked alternatives.
6. The basis for switching can use a physical circuit-based multiplexing mechanism described in referenced patents, of the inventor. This overcomes limitations placed on circuit switching of the past and allows much greater scalability to both low and high bandwidths with low deterministic latency.
7. Using semi-static routing with a large choice of route alternatives in place of dynamic hop-by-hop routing further simplifies networking. The approach results in deterministic operational parameters, including dynamic connection bandwidth.
8. Because of the synchronized nodes, latency can become the only metric required for deterministic Quality of Service (QoS) in a SAIN network. Inside a SAIN network, packet buffer congestion need not exist so that packet-loss-rate as a QoS parameter is not meaningful.
9. This fundamental structure along with deployment parameters makes jitter and delay variation small enough to be negligible.
10. Except in catastrophic circumstances, the control mechanism of the network guarantees delivery of all data accepted into the network.
11. Traffic shaping and user policing are requirements in stochastic networks. Overall, stochastic networking of the 1970s was a suitable choice for the message- and file-transfer-based traffic market of the time. Today's voice, video, and multimedia markets are predominantly traffic flows, i.e., they are circuit-based. Morphing a stochastic network into a circuit-based network with protocol overlays has been no small task in today's network. Placing a circuit-based underlayer beneath what already exists is much simpler. It is much less expensive in capital and operational costs using much less source electrical power.

The current Internet requires a relatively small number of ever-larger 'one size fits all' edge routers. The SAIN network structure morphs into a huge number of massively distributed mini-edge-routers. Each mini-router focuses on local users' languages, social and commercial needs, and inclusive interconnectivity within a Metro Network and the outside world. All user data in native user protocols exists only at the ingress and egress edges of a SAIN Underlay Network 100. Internally, the network exists between the Host, Terminal, Server, or Network 101 ingress and egress connections using the OSI Layer 2 and above protocols and the physical transport Layer 1 of the OSI Model. In other words, it exists in its own SAIN Underlayer 1.5. This definition does not preclude using protocols that emulate Physical Layer 1 on which the SAIN Underlayer can exist.

A Host, Terminal, Server, or Network 101, using any manner of digital access protocols, connects to the SAIN network through a User Interface Coconnection 290 much like legacy networks. A major goal of SAIN networking is to provide users with a network that supports their current needs without requiring modification of current user applications. An additional goal is to enable service providers to overcome current network deficiencies of scalability, performance, and cost while using predominantly existing network deployments.

The top-level principle of a SAIN Underlay Network 100 emphasizes one of its main benefits compared to existing networks. The SAIN network converts user data into bit streams that conform to a simple forwarding protocol used throughout an underlayer 1.5.

The main purpose of the forwarding protocol is to transfer user data bits transparently from source to destination endpoints in a robust and deterministic manner. The methods use synchronized clocks among switching nodes of the network in a manner that eliminates most of the complexity and service quality problems caused by the stochastic nature of current networks. The clocking mechanism can focus on synchronizing node clocks with one another. This can include synchronizing all nodes to Coordinated Universal Time (UTC) based on existing network synchronizing techniques.

SAIN nodes with synchronized clocks use deterministic methods to overcome "bursty" data at network entry ports before accepting data for delivery. Packet buffers placed before data entry into the SAIN Underlay Network 100 assures delivery without packet loss. Packet buffers are not relied on inside the SAIN Underlayer 1.5. Placing buffers within routers in legacy networks is a major cause of Quality of Service complexity and poor performance. SAIN methods reduce the burstiness of data presented to legacy core and access networks.

A Parameterized User Interface 210 is a flexible data interface that can be 1) generic for commodity data types and 2) application-specific for special data types. The PUI 210 can be replaceable and upgradable to meet changing user or network provider needs.

The SAIN network can use elements of current networks. For example, a Parameterized User Interface 210 extracts information from user input data in sufficient detail to determine the intended egress destination(s) within the network. It can also determine the service class to which the traffic belongs. Unlike conventionally routed networks, the network prioritizes traffic by applying more bandwidth or less bandwidth for each traffic type. It can adjust bandwidth to meet tight latency specifications both for bursty traffic and for traffic flows with time-varying data rates. Without substantial overprovisioning, the SAIN approach prevents network congestion and dropped packets that force retransmission of data where bandwidth is already scarce.

This first level of aggregation eliminates a substantial amount of router complexity and processing power required of packet-based approaches. An important interface will focus on Metropolitan Area Network. (MAN) Ethernet standards such as those defined by the IEEE, ITU, ANSI, and organizations like the Metro Ethernet Forum (MEF). This focus does not suggest limiting the universe of types of networks for which embodiments herein are applied.

The interface to the SAIN network includes the word "Parameterized" for an important reason. Since the SAIN network uses an internal data transfer protocol that is universally applicable to all network access protocols, there can be many variations of Parameterized User Interface (PUI) 210 to accommodate the outside world. Each connected Ingress PUI 211/Egress PUI 212 pair supports mutually compatible protocols for specific user applications. Beyond that, there are no limiting technical restrictions. The parameterized nature of the interfaces allows new user access protocols to be added to Ingress PUIs 211 and Egress PUIs 212 by software downloads from users, their organizations (in Virtual Private Networks, for example), or from network service providers as upgrades.

One additional advantage of the Parameterized User Interface 210 approach is the distributed nature of dealing with a wide variety of traffic types. A large number of highly distributed small processors replace the complex "all things to all people" large edge node routers. Distributing processing power within a large network of relatively simple elements can be an effective way to generate enormous processing power at relatively low cost.

The Ingress PUI 211 uses Protocol Translator 214 functions to encapsulate user data protocols at a source end-point into the SAIN network transfer protocol. At a destination end-point, the Protocol Translator 214 changes the SAIN internal network protocol back into a user-friendly form. An E-Node contains a plurality of user connections through ingress and Egress PUIs 212 defined above.

The disclosures of this application are in the context of the hierarchical structure shown in FIG. 2. The figure divides a SAIN network into tiers, each of which performs specific well-defined functions. A network's nodes could exist in a flat architectural structure, but that would likely lose routing simplicity and other benefits. The lower two of the three top levels of SAIN network tiers shown in FIG. 2 provide a sound basis for building large networks starting with Metropolitan Networks. That is, networks that exchange data both among a set of users connected to the network, and with independent outside sources and existing core networks. SAIN networks can expand to larger integrated structures by using the top eXchange Node, i.e., X-Node Tier 40 shown in FIG. 2 in combination with the two lower tiers.

The Basics of the SAIN Transform Algorithm

Figure 4:
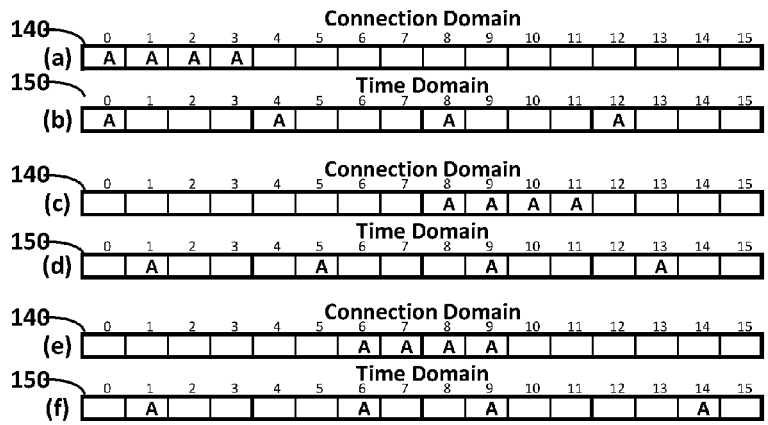
FIG. 4 shows a Connection Domain resulting in equally spaced Time Domain cellets according to an embodiment.
Figure 5:
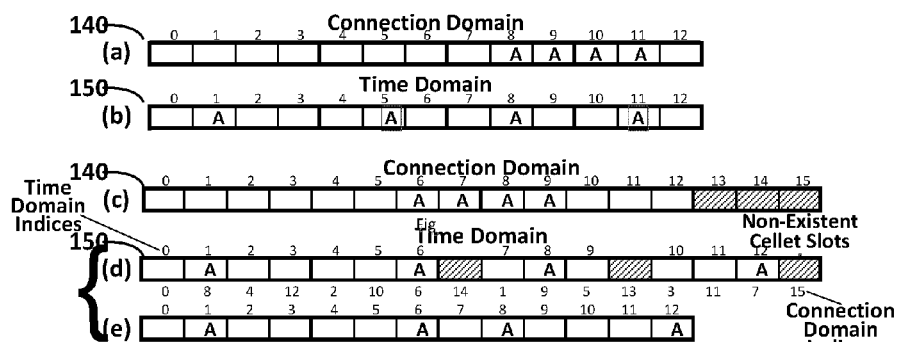
FIG. 5 shows Time Domain results for non-power-of-two length frame examples.
Figure 6:
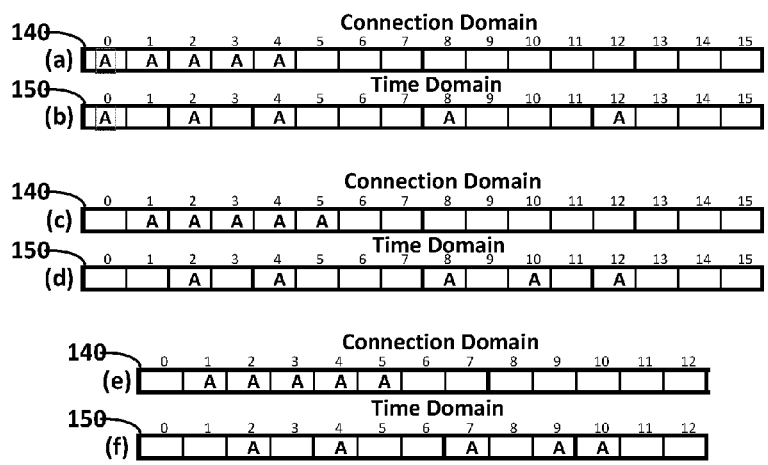
FIG. 6 shows Time-Domain results for a non-power-of-two number of cellets per frame according to an embodiment.

FIGS. 4, 5, and 6 summarizes the fundamental aspects of the SAIN Transform technology. The referenced patents include more details on some of the multiplexing aspects of this application.

For purposes of this application, a frame of data is a periodic, ordered, time/space collection of cellets where each cellet consists of a defined number of data bits. Within a given frame, cellets have the same number of bits. Each cellet is bound to a specific connection (or aggregation thereof as a new connection). In other words, each cellet is a fragment from a short or long serial stream of data. To transmit a plurality of data streams within a single frame, cellets from the plurality of connections are intermixed within the frame. The SAIN transform algorithm places cellets from a given connection nearly uniformly spaced throughout a Time/Space Division. Each cellet represents a quantum of bandwidth equal to the number of bits in a cellet divided by the period of the frame. In other words, a cellet represents a Quantum Data Rate (QDR) equal to the number of bits in a cellet multiplied by a periodic Frame Rate.

For purposes of brevity, the use of "time/space" becomes "time." In other words, phrases like "Time/Space Division Multiplexing" become "Time Division Multiplexing." Unless specifically pointed out to the contrary within this application, the word "time" related in some way to multiplexing implies both "time" and "space" as the basis therefor.

The SAIN Transform Algorithm includes defining a frame of cellets in two domains, a Connection Domain 150 and a Time Domain 160 shown in the figures. The Connection Domain 150 shown in FIG. 4(*a*) defines a single connection as a contiguous range of cellets—for example, the four "A's" placed together in the figure. The connection bandwidth is four times the QDR.

The second domain is the Time Domain 160 shown in FIG. 4(*b*), which has the same number of cellets as the Connection Domain 150 frame. The location of each cellet in the second domain is determined as follows:

1. assign a binary number, starting at zero, to each successive cellet position of the Connection Domain 150; and
2. read each binary number backwards to determine corresponding position of each cellet in the Time Domain 160.

FIG. 4(*b*) shows the four cellets of FIG. 4(*a*) spread throughout the Time Domain 160 frame. There is a one-to-one correspondence between each cellet in a Connection Domain 150 and a matching cellet in a Time Domain 160. [Note: The domains exist only to define 1) the data rate of a connection (the Connection Domain) and 2) the location of a connection's cellets within a time/space frame (the Time Domain). Data encapsulated in cellets exist only in a physical frame where the SAIN Transform's Time Domain points to a connection's location of cellets within the frame.]

For example, starting with the Connection Domain 150, the first cellet on the left is 0 (i.e. 0000 in binary notation). Clearly, the matching cellet in the Time Domain 160 is also 0000 (i.e. 0 in decimal notation). The next cellet to the right in the Connection Domain 150 is 0001 with matching cellet in the Time Domain 160 1000 (i.e., 8 in decimal notation). Cellets 0010 and 0011 follow in the Connection Domain 150 with matching cellets 0100 and 2100, (i.e. 4, and 12) in the Time Domain 160. The inverse is also true; each cellet in the physical Time Domain 160 point to a cellet in the Connection Domain 150. Physical cellets exist only in the Time Domain 160. The cellets in the Connection Domain 150 point to the physical location of cellets in the Time Domain 160.

Taken together, the two Domains define a Time Domain memory map for a multiplexer system. Each position in the Time Domain 160 frame denotes a physical time (or space) cellet corresponding to a cellet in the Connection Domain 150 that denotes the connection to which each cellet belongs.

A benefit of building frames using the algorithm is that the cellet positions are nearly uniformly spaced throughout a Time Division Frame thereby reducing switch latency for any given connection.

Power-Of-Two Frame and Segment Lengths

A Time Domain 160 is divisible into segments by dividing the frame length by an integer. Where F is the frame length (i.e., number of cellets) and n is an integer, each segment contains exactly INT $\lfloor F/n \rfloor$ cellets if n is an integer divisor of F or will be a combination of INT $\lfloor F/n \rfloor$ and INT $\lfloor F/n \rfloor +1$ cellet segments if n is not an integer divisor. Dividing a Time Division Frame into segments exploits the distributed cellet positioning throughout Time Domain 160 frames within SAIN switches.

Obtaining Time Division Frames with Equally Spaced Cellets

Time Division switches work on the following basis: a frame or a small subframe segment of data from one or more sources is stored before being reordered (or manipulated in other ways) for transmission on an outgoing link. Segmenting a frame is a method of reducing switch latency. There are many ways to divide a frame into segments, but dividing it by a power of two is an important one. FIG. 4 shows a rudimentary case for a Power of Two (PoT) length frame. The figure shows both a PoT-length frame and a PoT-length connection. In addition, for FIG. 4(*a*) and FIG. 4(*c*) the connection starts on a "PoT boundary" within the frame. In other words, the first cellet in the Connection Domain 150 starts on a boundary that either is "0" or is a PoT integer divisor of number of cellets in a frame. In FIGS. 4(*b*) and 4(*d*), the difference is the position of the cellets within the Connection Domain 150 and the Time Domain 160 frames. In both cases, the cellets in the Time Domains 160 are equally spaced.

The equally spaced property is not limited to PoT divisors. Any integer is usable as long as it is a submultiple divisor of the frame length. For example, a frame with 20 cellets divides into five segments with four cellets each. A single cellet placed in each segment defines a connection with bandwidth equal to five times quantum data rate of the frame.

Non-Equally Spaced Power-Of-Two Length Connections

FIGS. 4(*e*) and 4(*f*) show the result of the left-most cellet in a Connection Domain 150 not starting with "0" or a PoT submultiple boundary of the frame length in the Connection Domain 150. In FIG. 4(*f*), the cellets are no long equally spaced. However, the cellets still exist within the frame's PoT segments each of which is the frame length divided by 4. As shown in FIG. 4*e* any position of the four-cellet contiguous range in the Connection Domain 150 results in one and only one cellet belonging to the connection per PoT segment. Furthermore, each left-most position for the four-cell range results in a different pattern of positions of the cellet. This fact, applied generally, has important consequences in using SAIN Transform methodology within and between switches. The section entitled Embodiments for Connecting Tandem Nodes at paragraph [232] disclose these consequences.

Dividing a Non-Power-Of-Two Length Frame by a Power-Of-Two

Dividing a frame by a power of two produces a power-of-two segmented frame, i.e., a frame of PoT segments. PoT segmentation does not depend on the total frame length being a power of two; it is useful for frames of any length. FIG. 5(*a*) shows a four-cellet connection starting at cellet positions "8" in a 13-cellet frame. [Note that the number 13 is a prime number, i.e., its only integer divisors are 1 and 13. Therefore, not all segments will have the same number of cellets.] In the FIG. 5(*b*) Time Domain 160, there are four cellet slots in the first PoT segment and three in each of the others.

In the FIG. 5(*c*) Connection Domain 150, the 4-cellet connection "A" begins at cellet position "6", which is not divisible by 4, the number of PoT segments in the frame. In addition, FIG. 5(*c*) shows the entire 16-cellet virtual frame for both the Connection Domain 150 of FIG. 5(*c*) and the Time Domain 160 of FIG. 5(*d*). The shaded cellets are those that identify the virtual cellets that are not included in the real frame. In other words, they are zero-length cellet positions. The result in the FIG. 5(*d*) Time Domain 160 is four cellets each of which is still contained in a divide-by-4 PoT segment. FIG. 5(*e*) is the real frame result where the virtual cellets are set to zero length. Due to their different starting time in FIG. 5(*a*) and FIG. 5(*c*), the cellets in FIG. 5(*e*) are not as nearly equal spaced as are the cellets in 5(b). Note that in both FIG. 5(*a*) and FIG. 5(*d*), cellets in positions "8" and "9" contain two of the four "A's" and they appear in position "1" and positions "8" in both FIG. 5(*b*) and FIG. 5(*e*). In essence, the cellets in positions "9" and "10" in FIG. 5(*a*) have been moved to cellet positions "6" and "7". Even so, the fact remains that four cellet remain in four contiguous positions in a Connection Domain results in each cellet having a PoT-segment of its own. This is another important aspect of the algorithm used in SAIN switches arguing for the use of PoT division of SAIN frames.

FIG. 5(*d*) is for explanatory purposes using the captions included therein. In addition to its real frame length, 13 cellets, it also has a virtual frame length. For all cases where the real frame length is not a power-of-two in length, the virtual frame length is the smallest power-of-two greater than the real frame length. For the non-power-of-two frame length general case, deriving the Time Domain 160 rests on dividing the Connection Domain 150 virtual frame length into two equal segments. The length of the first segment equals that of the real Time Domain 160 frame. The remainder in the PoT virtual frame length makes up the second segment. The system treats each cellet in the Time Domain 160 corresponding to the second segment of the Connection Domain 150 as non-existent. FIG. 5(*e*) (plus the three-cellet positions on the right in the virtual Connection Domain 150 in FIG. 5(*c*)) exemplifies this characteristic of the algorithm. The corresponding indices in the Connection and Time Domains 160 of FIGS. 5(*c*) and 5(*d*) are below and above the Time Domain 160 version shown in FIG. 5(*e*).

Dealing with Non-Power-Of-Two Connections

FIG. 6 shows a case where connection length is neither a power-of-two nor is an integer multiple of a power-of-two. The figure shows a five-cellet connection in various frame configurations. FIGS. 6(*a*) and 6(*b*) shows a 16-cellet frame with the five-cellet connection starting at cellet position "0" in the Connection Domain 150 frame. In FIG. 6(*b*) of the Time Domain 160, there is a single cellet in three of the PoT-segments and two cellets in one. The five-cellet connection shown in FIG. 6(c) begins at cellet position "1" instead of "0" as in FIG. 6(a). The third PoT-segment now contains two cellets as shown in FIG. 6(d) instead of the first PoT-segment shown in FIG. 6(b).

FIGS. 6(e) and 6(f) show that changing the frame length does not affect the outcome in terms of determining the PoT-segment that contains two cellet positions. The examples in FIGS. 4, 5, and 6 are useful for the understanding of the Embodiments of this application.

Overview of Routing E-Node to E-Node Paths in a SAIN Network

An embodiment of a SAIN network can use a plurality of E-Nodes in one network tier connected to a plurality of T-Nodes in a next higher network tier. Each E-Node can act as both a source and a destination node to every other E-Node in the network. Each source-E-Node to destination-E-Node connection is a path. Aggregations of paths within an E-Node embed each path from the E-Node to every other E-Node. The aggregations connect to a parent T-Node for processing and forwarding to each T-Node in the network. Each destination E-Node disaggregates the aggregations of paths whose sources are from every other in the two-tier network.

For purposes of explanation and embodiments, this application assumes that each E-Node connects to a single T-Node in the next higher tier. Expanding to multiple connections can take place in two ways. One is to enable an E-Node to attach to one or more parent. The other is to divide a parent T-Node into a plurality of sub-T-Nodes disbursed for survivability and for security reasons.

Figure 7:
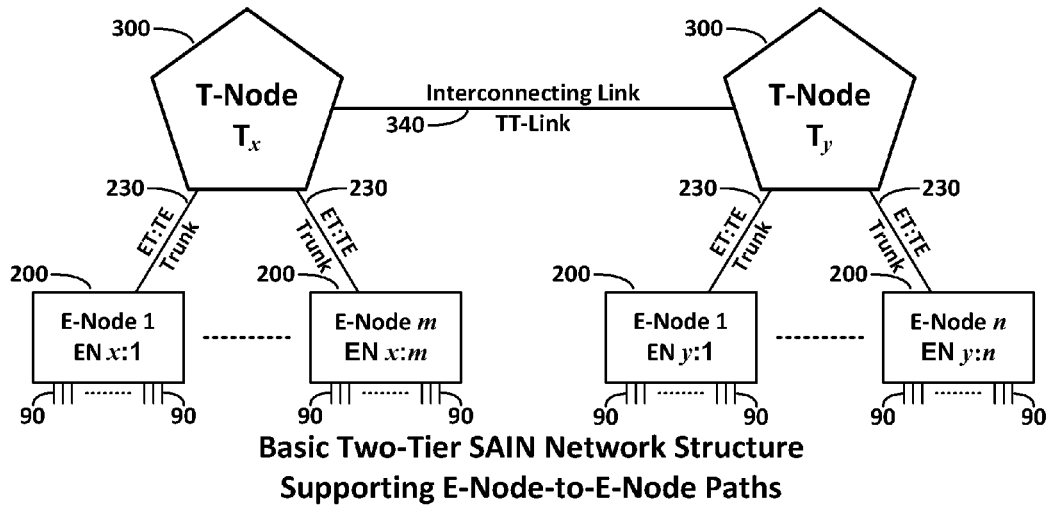
FIG. 7 shows a two-tier network structure supporting E-Node-to-E-Node paths according to an embodiment.

In FIG. 7 each E-Node 200 connects to a parent T-Node 300. Data can flow both from an E-Node 200 to a parent T-Node 300 and from a parent T-Node 300 to an E-Node 200 child. Each E-Node 200 connects to every other E-Node 200 in the network through a next higher tier network of T-Nodes 300. Each T-Node 300 connects to every other T-Node 300 in the network, either by a direct physical connection, or by connections through transit nodes. The transit nodes can be other T-Nodes 300. In each of these paired-node connections, data can flow in each of two directions. Each source E-Node pairs to a plurality of destination E-Nodes. Each source T-Node (to which source E-Nodes are attached) pair to a plurality of destination T-Nodes. In point-to-point connections, a source E-Node connection connects to a single destination E-Node. In multipoint connections, a source E-Node can connect to a plurality of other E-Nodes. Among T-Nodes, point-to-point and multipoint connections operate in a similar manner.

Network embodiments could include nodes other than E-Nodes 200 and T-Nodes 300 and could include directly connected E-Nodes 200.

Figure 8:
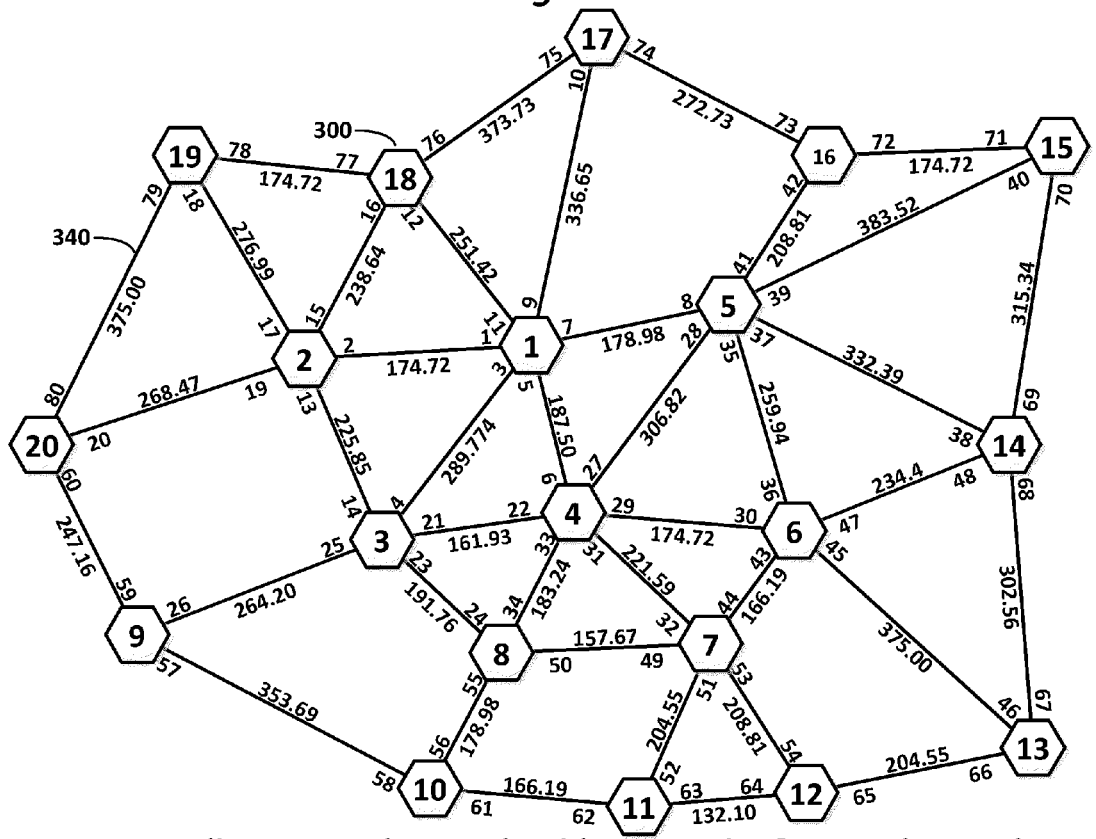
FIG. 8 shows a Metropolitan Network example with 20 T-Nodes and 40 duplex trunks.

One embodiment of T-Node 300 interconnections is a mesh network as shown in FIG. 8 as a model network for describing functionality and embodiments of a SAIN network. Duplex TT-Links 340 connects the T-Nodes to one another. A mesh network is one of a number of possible configurations known to an artisan skilled in network design. Regardless of the configuration or its size, the methods and apparatus of this application are applicable and can scale to very large size networks. Networks tend to be clusters of hubs as detailed in "Linked, the New Science of Networks" by Albert-László Barabási, Perseus Publishing, 2002. Economics can determine when it is cost effective to build multiple Metro Networks and interconnect them.

FIG. 8 is the basis for a model network used to explain the disclosures of the application. There are the 20 T-Nodes shown in the figure. In addition, it is assumed that each T-Node is the parent of 25 E-Node children so that the network contains 500 E-Nodes, each of which can communicate with each other.

In a SAIN network, a path is a simplex connection from one E-Node 200 to another E-Node 200. A duplex user connection comprises two paths, one in each direction of travel.

The role of T-Nodes 300 in a SAIN network is to provide superpaths that are aggregations of E-Node 200-to-E-Node 200 paths. Their interconnections are also set up on a simplex basis. These superpaths can be controlled using duplex Control Vectors that contain messages in cellet form embedded within implicitly addressed frames. Other control methods for superpaths are possible.

The role of a path is to aggregate user connections at a source E-Node 200 and to deliver the aggregation, not individual connections, to a destination E-Node 200. Each of an interconnected pair of E-Nodes 200 can act as both a source and a destination node as described below.

A source E-Node 200 is the control node for each path. In other words, the source E-Node 200 uses a pre-determined route for a path that has enough bandwidth to support arriving user traffic end-to-end from source to a destination E-Node 200. As user traffic intensity varies, an E-Node 200 allocates more or less bandwidth to the path and concomitantly, can include adjustment of available bandwidth to support multiple classes of traffic when network bandwidth becomes scarce. Embodiments below detail apparatus and methods involved to accomplish these tasks.

The major requirement of networking is to be able to interconnect all nodes accepting user data to all nodes able to deliver user data. Making use of a three-tier hierarchy shown in FIG. 2 is an important way to reduce network complexity while concomitantly increasing scalability and performance. Conceptually, E-Node Tier 20 is primarily a data aggregation tier and T-Node Tier 30 is a routing tier. [X-Node Tier 40 is a forwarding tier between X-Node Metro Network domains of T-Nodes 300 and E-Nodes 200.]

In a Metro Network, an E-Node 200 aggregates all incoming user data into a plurality of paths. Each path is an aggregation of all data entering the E-Node 200 for delivery at another E-Node 200. The E-Node 200 aggregates its paths into the number of superpaths equal to the number of T-Nodes 300 in the network. It then aggregates these superpaths into a higher-level superpath that contains all user data deliverable to all other E-Nodes 200. The source E-Node 200 forwards this superpath to its parent T-Node 300. The parent T-Node 300 then routes each of the intermediate superpaths to the appropriate destination T-Node 300. In the model network the result is that 25 source E-Nodes 200 connect to 25 destination E-Nodes 200 attached to each of 20 T-Nodes 300 with one exception. [A source E-Node 200 need not connect the source E-Node 200 itself for data. It may set up a small amount of bandwidth in a test loop-back arrangement to verify the integrity of its two-way connection to its parent T-Node 300.]

In a configuration of multiply connected T-Nodes 300, a plurality of possible routes exist each of which can delineate a superpath aggregation of paths. A table of such routes can contain important parameters that enable the network to select, dynamically, routes that optimize network performance. For example, each pre-determined route is loop-free with known end-to-end latency. The table can also include the bandwidth available for each route, updated periodically by the system.

Reference Numeral Methodology

In what follows, generic forwarding elements (i.e., those that send or receive data) are assigned drawing reference numerals that either: 1) end in a "0", or 2) are a single- or a two-digit numeral. A subtype of each element keeps its first one or two digits and adds a "1" if the subject matter involves source-end functionality. A subtype adds a "2" for destination-end functionality. For example, an E-Node 200 denotes a generic E-Node that sends and receives data. A Source E-Node 201 denotes the sending end functionality of the E-Node 200 and a Destination E-Node 202 denotes its receiving end functionality. The reason for this is to differentiate between sending and receiving functions of the network thereby simplifying the following disclosures.

The following disclosure first describes embodiments of individual subsystems of a network, followed by disclosure of embodiments of the system as a whole.

Embodiment of a SAIN Switch Stack Selector

Figure 9A:
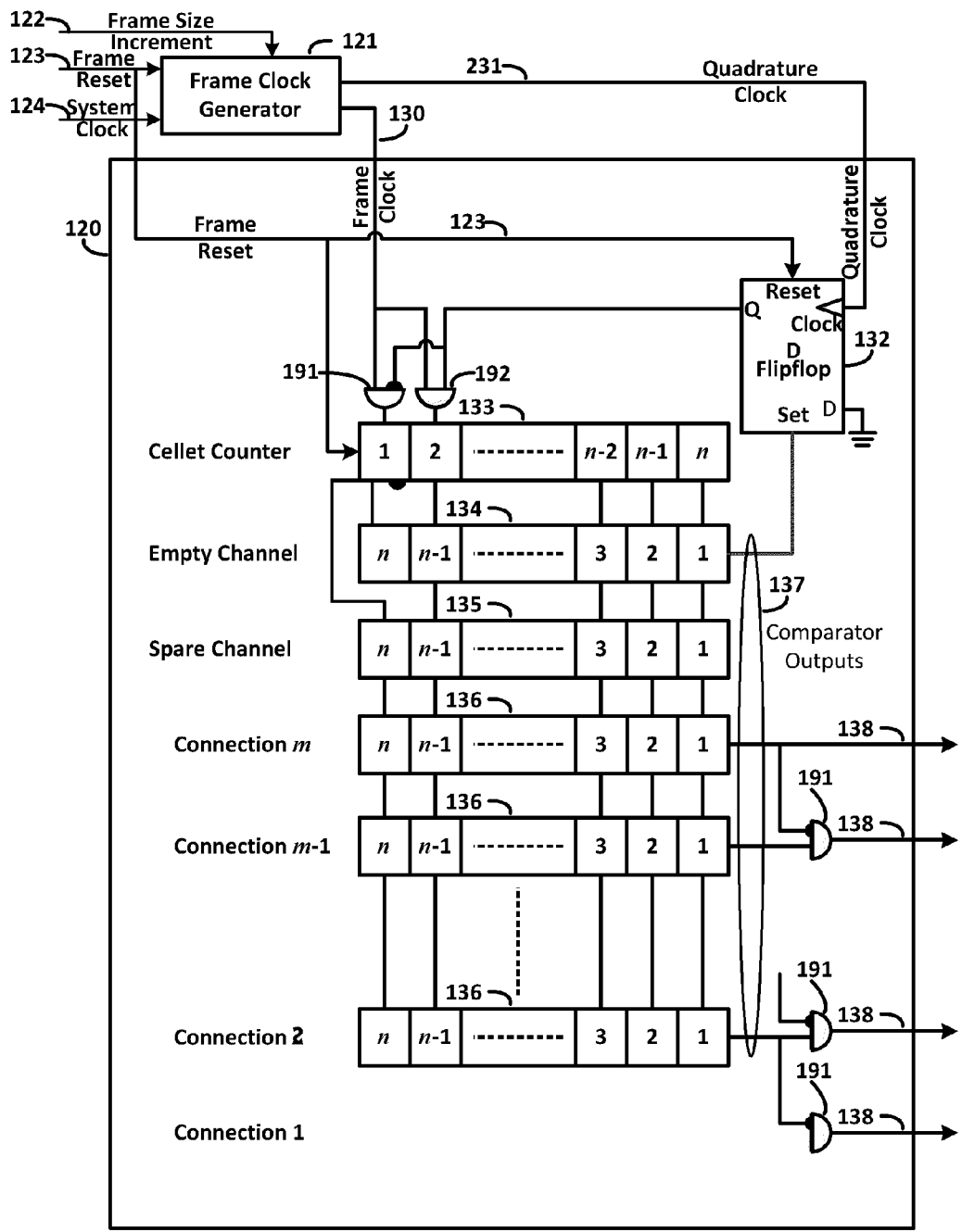
FIG. 9a and FIG. 9b shows a diagram of a Switch Stack Selector with a Frame Clock Generator according to an embodiment.

FIG. 9*a* shows a rendition of FIG. 3*a* Switch Stack Selector 120 in the prior art patents referenced in paragraph [16]. In addition, the figure contains a Frame Clock Generator 121 not included in the prior art disclosure. It enables rapid dynamic switching methods and apparatus in a SAIN switched network disclosed herein. FIG. 9*a* contains some updated reference numerals from the prior art figures that are compatible with other figures in this application.

One embodiment of SAIN switches includes a Switch Stack Selector 120 shown in FIG. 9*a*. A summary of the operation of a Switch Stack Selector 120 is as follows:

The Switch Stack Selector 120 implements the SAIN transform described herein above starting with The Basics of the SAIN Transform Algorithm at paragraph [91]. The referenced patents describe in detail the methods applicable to the apparatus shown in FIG. 9*a*. The apparatus contains a Cellet Counter 133 that takes on a new state for each position in a SAIN frame. The Counter 133 begins a frame in an all-zeros state. It has a range of zero to the smallest integer power-of-two N−1 where N is the virtual frame length (viz. Dividing a Non-Power-of-Two Length Frame by a Power-of-Two at paragraph [104]ff.) for a given frame of length F. In other words, $$N=2^n, \text{where} \tag{1}$$

$$n=1+\text{INT}(\log_2(F-1)).$$

The Frame Clock Generator 121 emits F Frame Clock 130 pulses during a frame, including a Frame Reset 123 pulse that sets the System Clock 124 and Frame Clock 130 to zero. Each Frame Clock 130 pulse causes the counter to increment by "1." The Cellet Counter 133 counting environment includes N virtual frame states. The environment can include empty cellets in a frame as described at paragraph [105]ff.

Figure 9B:
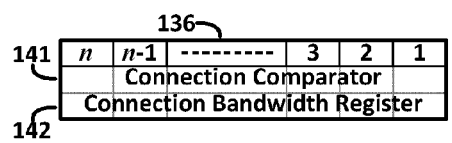

Shown below the Cellet Counter 133 in FIG. 9*a* is a plurality of Connection Comparator/Connection Bandwidth Registers (CS/CBRs) labeled CC/CBR Empty Connection 134, CC/CBR Spare Connection 135, and CC/CBR Operational Connections 136. FIG. 9*b* shows a CC/CBR Operational Connection 136 divided into its two parts. These are a Connection Comparator 141 and a Connection Bandwidth Register 142. The Connection Bandwidth Register 142 part defines the starting position of cellets within a range of cellets assigned to a connection in the virtual frame of a Connection Domain 150.

The number of cellets assigned to a connection m equals the number stored the Connection Bandwidth Register 142 at connection m+1 minus the number stored in the Connection Bandwidth Register 142 at connection m. If the two numbers are equal, the m connection has no cellets in the Connection Domain 150. In other words, it represents a virtual connection. [A virtual connection is a connection with zero allocated bandwidth. The virtual connection is a physical connection placeholder that can become data bearing.] This is a unique and important property within a SAIN network. A connection can exist in a virtual state even when a call, path, or superpath has no bandwidth assigned. This is an important benefit of using implicit addressing within a SAIN network.

Note that the least significant bit of the Cellet Counter 133 appears on the left in FIG. 9*a*. A CC/CBR Empty Connection 134, CC/CBR Spare Connection 135, and CC/CBR Operational Connections 136 have their least significant bit in the right-most position in the figure. This arrangement produces the SAIN multiplexing algorithm.

When the number in the Cellet Counter 133 is both
1. greater than or equal to the number in Connection Bandwidth Register 142 at connection m, and
2. less than the number in the Connection Bandwidth Register 142 at connection m+1, the system places its attached Selector Line 138 in FIG. 9*a* into an "on" state. All other Selector Lines 138 are in an "off" state. Each Selector Line 138 determines the Connection Domain 150 position of a current cellet sent or received within a SAIN switch. No "on" state occurs for any Selector Line 138 if the contents of Connection Bandwidth Register 142 at connection m and the Connection Bandwidth Register 142 at m+1 are equal.

The CC/CBR Empty Connection 134 determines if a "1" least significant bit of the Cellet Counter 133 forecasts a virtual cellet as its next state. The real cellets exist at frame positions numbered (0, 1, 2 . . . F−1). There is the same number of Connection Domain positions. The difference is that the virtual frame cellets in the Connection Domain do not exist at positions (F, F+1 . . . N−1). All Cellet Counter 133 values that refer to non-existent virtual connections only if Connection Domain 150 values are greater than the virtual frame length N/2−1. If this were not so, the PoT value of the virtual frame length would be lower. As shown in FIG. 5(*c*), the non-existent, (i.e., zero length) the Connection Domain cellet positions appear in contiguous positions at the end of a frame. In the Time Domain, FIG. 5(*d*) shows their appearance throughout the virtual frame at positions that have a one-to-one position with the zero-length Connection Domain positions.

In addition, an embodiment of a switch based on power-of-two-length segments (i.e., PoT segments) can use a property of the SAIN transform algorithm to designate all PoT segment boundaries. A frame of any length F less than a power of two, can contain a maximum number of PoT segments equal to the largest power of two less than F. In other words, the maximum number of PoT segments possible is N/2, the virtual fame length of the frame divided by two. When applying the transform algorithm to a Connection Domain of a frame, the PoT segment boundaries start at the N/2 cellets in the Time Domain that correspond to the first N/2 cellets in the Connection Domain. If the frame length itself is a power of two long, the real frame length and the virtual frame length are the same, i.e., N=F. In this case, N replaces N/2 above.

The set one cellet per of PoT segment defines the maximum base data rate that is the maximum PoT data rate supported by the frame. Any submultiple of the maximum base data rate is usable to advantage in a SAIN network. Any integer multiple of the base data rate (including the maximum base data rate itself) is also possible. For example, if the frame length is 6 cellets, the virtual frame length, N, is 8. N/2 is 4 and there two zero-length cellet positions in the frame. In the Time Domain, one zero-length position occurs in the each of two PoT segments. The maximum base data rate is two cellets per frame period and the maximum data rate of a connection is 6 cellets per frame period, i.e., 3 cellets per PoT segment.

CC/CBR Empty Connection 134 contains the Connection Domain 150 number corresponding to the first non-existent cellet in the Connection Domain 150 frame. The CC/CBR Empty Connection 134 enables determining whether incrementing the current Cellet Counter 133 value by "1" will result in a Connection Domain 150 non-existent cellet position. This occurs by inverting the least significant bit in the Cellet Counter 133 connected to the most significant bit of the CC/CBR Empty Connection 134.

This is equivalent to incrementing the Cellet Counter 133 by "1" when its current value ends in a "0", a value that represents a Connection Domain address in the first half of Connection Domain 150 virtual frame. The value stored in the frame is F if the frame is less than the virtual frame length. The CC/CBR Empty Connection 134 is empty if F=N, i.e., if the actual frame length is a power-of-two in length.

Embodiment of a Frame Clock Generator

A SAIN network places a high-speed system clock at each network node. The plurality of node clocks can synchronize directly or indirectly with a common clock source. Clocks in the E-Nodes 200 can synchronize to their parent T-Nodes 300 and each T-Node 300 can connect directly or indirectly to a common clock source using standard clocking technology such as IEEE Standard 1588 or other methods including U.S. Pat. No. 2,986,723.

Figure 10A:
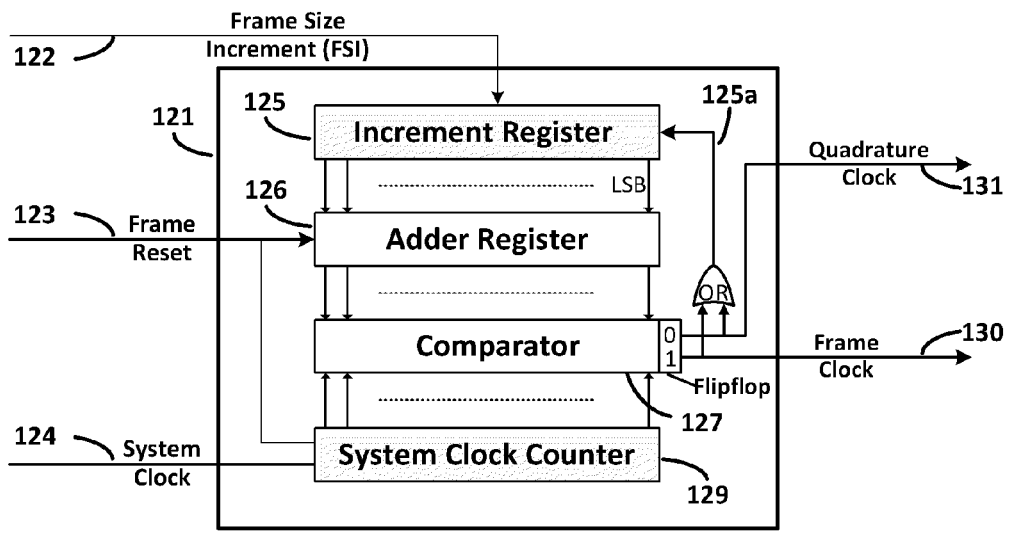
FIG. 10a shows an apparatus for changing switch clock rates and frame sizes according to an embodiment.

FIG. 10a shows a block diagram of a Frame Clock Generator 121. Its purpose is to produce a plurality of Frame Clock 130 pulses equal to the number of cellets per frame for a Switch Stack Selector 120 frame with a Frame Size of F cellet positions. Each pulse corresponds to an advance of one position within the Time Domain 160 frame of the Switch Stack Selector 120.

The Clock Generator 121 uses three input signals. One is a Frame Reset 123 signal generated by the system to denote the start of a frame. Another is the high-speed System Clock 124 signal. A third signal is a Frame Size Increment (FSI) 122 that enables deriving a Frame Clock 130 signal from the high speed System Clock 124 such that:

$$FSI = f_s p_F / F \quad (2)$$

where $f_s$=the high-speed System Clock Rate in megahertz and $p_F$=the Frame Period in microseconds to produce both Frame Clock 130 and Quadrature Clock 131 pulses.

Figure 10B:
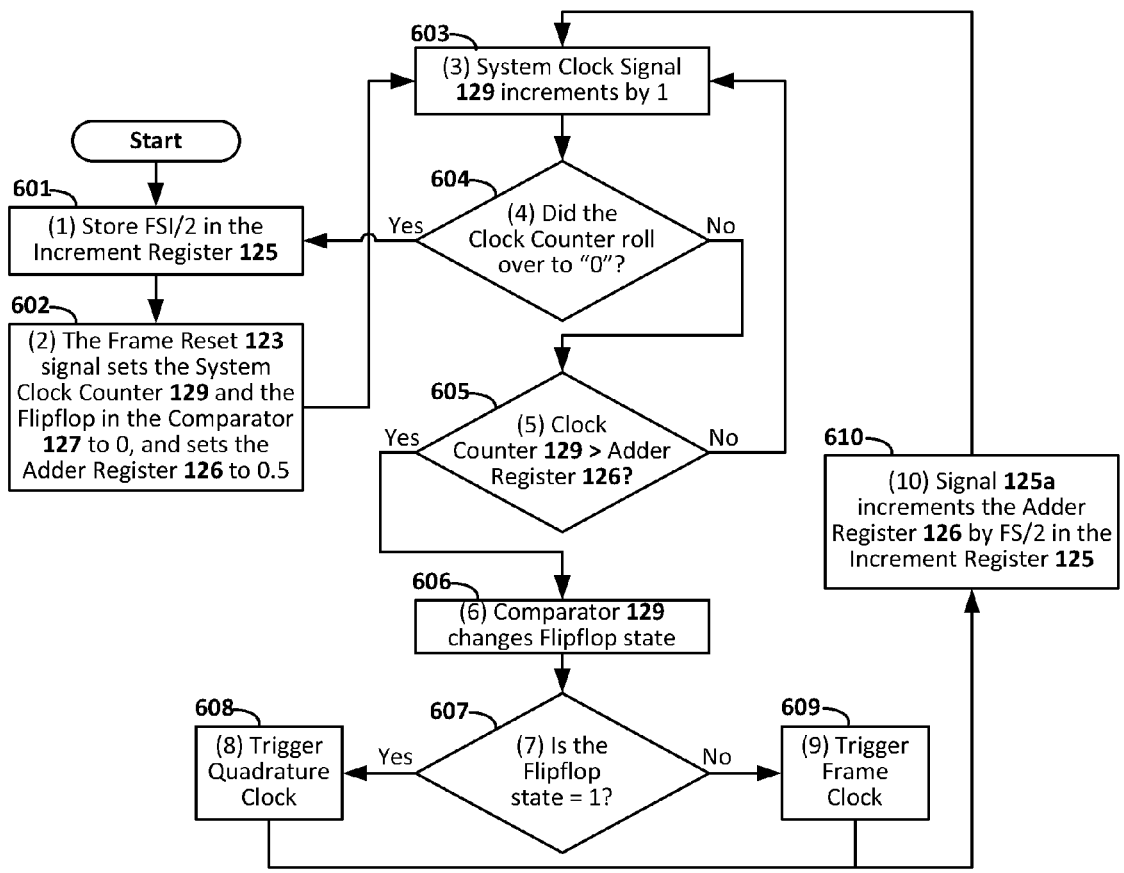
FIG. 10b shows a flow chart for changing switch clock flow rate according to an embodiment.

A network controller with a microprocessor stores the entities shown in FIG. 10a; FIG. 10b shows the sequence of operations that takes place in each frame cycle. Initially, when the system starts or restarts with a new number of cellets in a frame, the system initiates Start and performs Operation (1) 601 of FIG. 10b. The controller uses Eq. (2) to compute the FSI for the current Frame Size, high-speed System Clock Rate, and the desired Frame Period. The next step is to divide the FSI by two and store the result in the Increment Register 125. The reason for this is that the CC/CBR Empty Connection 134 mechanism requires two interspersed clocking signals for proper operations (as described in paragraph [132]ff). A simple method of providing the required signals is to generate both a Frame Clock 130 and a Quadrature Clock 131.

Operation (2) 602 begins when a Frame Reset 123 occurs in the network. This signal keeps a set of clocks, and thereby synchronizes frame start times within a SAIN network node. The operation sets the System Clock Counter 129 and the Flipflop within the Comparator 127 to "0." The Flipflop distinguishes whether the value in the Adder Register 126 denotes a Frame Clock 130 or a Quadrature Clock 131 pulse. In the operations as described, a Flipflop value of "0" denotes a Quadrature Clock value that causes rounding of comparison values in the sequel as explained next.

Operation (3) 603 begins incrementing the System Clock Counter 129 by one from the System Clock 124. Operation (4) 604 detects an overflow state of the System Clock Counter 129. The purpose of detecting the overflow is to ensure that the system has remained in synchronization with Frame Reset 123.

Operation (5) 605 determines if the System Clock Counter 129 is greater than the value in the Adder Register 126. If it is not, it reverts to Operation (3) 603. If it is true, the system goes on to Operation (6) 606 where two things occur. [Note: Since a value of 0.5 exists first in the Adder Register 126, the first System Clock 129 pulse counted is larger than the 0.5 stored at frame reset time.] The first is to change the state of the Flipflop attached to the Comparator 127 from "0" to "1", or "1" to "0". At the beginning of a frame, the Flipflop is set to a "0" state. This results in its status changing from "0" to "1". Operation 606 also causes the Adder Register 126 to be incremented by the FSI/2 value stored in the Increment Register 125. The next time System Clock Counter 129 is greater than the Adder Register 126, the Flipflop state is set to "0".

Operations (7) 607 determines the Flipflop's state and sends a pulse on either Frame Clock 130 (Operation (8) 608) or Quadrature Clock 131 (Operation (9) 609). Operation (10) 610 then Increment Register Trigger 125a increments the Adder Register 126 by FSI/2 and triggers Operation (3) 603.

For a numeric illustrative example of the embodiment, set F=3,856 cellets, $p_F$=0.125 msec, and $f_s$=$10^6$ kHz (1 Ghz). The fractional part of the FSI needs to have only enough binary places to assure that the frame count equals F cellets exactly. This number can be calculated by the following formulas:

$$FSI = INT(TotN/F \times 2^{Exp})/2^{Exp} \text{ where} \quad (3)$$

$TotN = p_F \times f_s$ = Total number of high-speed clock pulses in a frame, and $Exp = INT(LOG_2(F-1)+2$.

Using these formulas, $$FSI = INT(10^6 \times 0.125/3,856 \times 2^{13})/2^{13} = 32.4169921875.$$

Note that using the FSI/2 as the Frame Size Increment 122 shown in FIG. 10b requires increasing the Exp value by one.

An alternative embodiment replaces the two-state Flipflop with a one-shot Flipflop (not shown) where the backside of the output pulse from the Flipflop produces the Quadrature Clock 131. In this case, Operation 601 is not performed (i.e., the FSI is not divided by 2) as the Increment Register 125 value and the Exp value is not increased by one.

Figure 11:
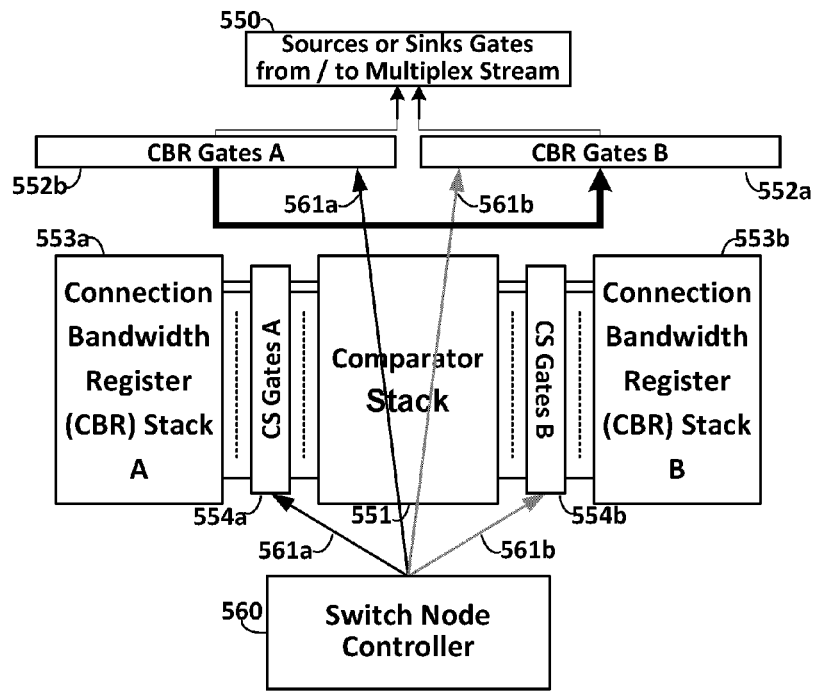
FIG. 11 shows an apparatus for changing a bandwidth register according to an embodiment.

Embodiment of a Connection Comparator/Connection Bandwidth Register (CC/CBR) Stage FIG. 11 shows a method of synchronizing Connection Comparator/Connection Bandwidth Register (CC/CBR) Stage within a Generic Disaggregation Switch 502 with its paired Generic Aggregation Switch 501. (A "Generic Aggregation Switch" or a "Generic Disaggregation Switch" means that the context in which the terms are used can apply to any switch level.) The abbreviation for "Connection Bandwidth Register Stacks" herein is CBR Stacks. For a "Generic Aggregation Switch/Generic Disaggregation Switch Pair" becomes a Generic A/D Switch Pair. All SAIN switches operate as a Generic A/D Switch Pair 503 as switching processes that are separate from data grooming. Such grooming occurs primarily in E-Nodes where Generic Aggregation Switches 501 and Generic Disaggregation Switches 502 normally exist. When traffic bandwidth changes (higher and lower) entering a Generic Aggregation Switch 501, it activates methods to change both its own CBR Stack 553 in synchrony with changing the CBR Stack 553 of its paired Generic Disaggregation Switch 502. The method makes use of two CBR Stacks labeled CBR Stack A 553a and CBR Stack B 553b in each switch. In operation, at each of the switch pairs, one of the CBR Stacks 553 in each switch manages the bandwidths of current traffic while the other stack prepares to become the next active version. The source Generic Aggregation Switch 501 forwards a Control Vector message to its paired Generic Disaggregation Switch 502 designating the frame number that will start applying the new bandwidth allocations.

Upon a switching operation of a Switch Node Controller 560, the two CBR Stacks exchange roles. If CBR Stack A 553a is operational, the Switch Node Controller 560 activates the "A" labeled elements as shown by the dark line in the figure.

If the switch is a Generic Aggregation Switch 501, the traffic cellets from sources at the source end of a connection Sources or Sink Gates 550 pass data cellets to fill cellet positions in an outbound multiplex stream. If the switch is a Generic Disaggregation Switch 502, data cellets from cellet positions in an inbound multiplex stream to a destination sink.

Figure 12:
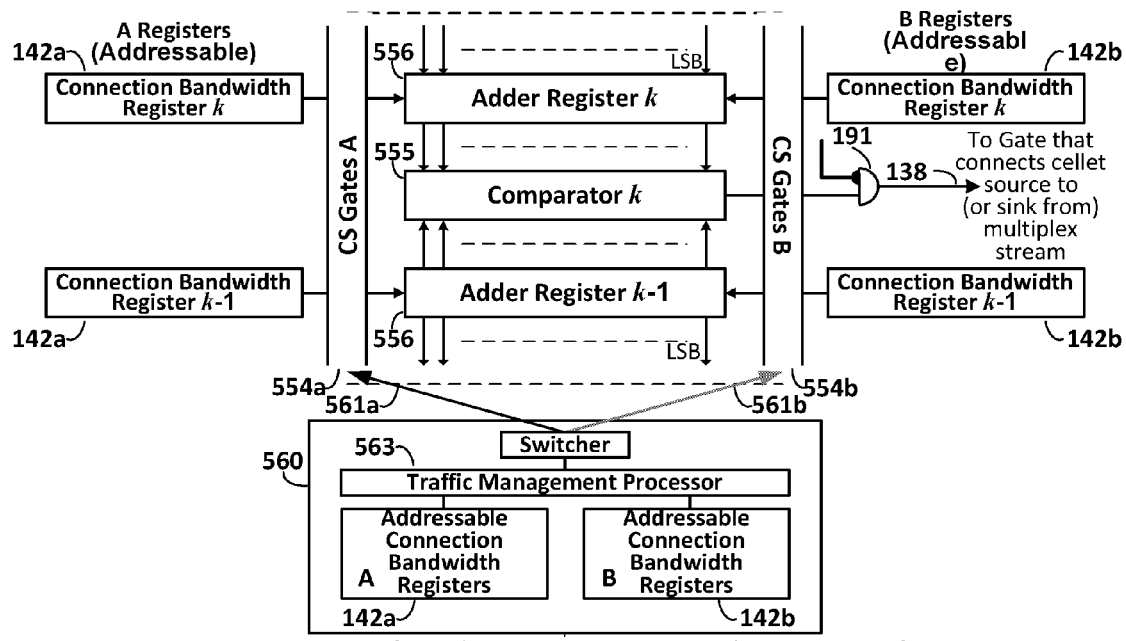
FIG. 12 shows an apparatus for changing Connection Domain bandwidth ranges according to an embodiment.

An embodiment of a Comparator/Connection Bandwidth Register stage is the focus of FIG. 12. It shows the elements of FIG. 11 in a configuration that enables rapid change of bandwidth allocation to connections within a frame. In situations requiring bandwidth allocation or reallocation, SAIN switches can make use of this approach.

As shown in FIG. 12, a Connection Bandwidth Register has five part labels. Two of them are Connection Bandwidth Register 142a and Connection Bandwidth Register 142b; a third is a Traffic Management Processor 563, a fourth is a C Stack Adder Register 556; the fifth is a Comparator Register 555. Connection Bandwidth Register 142a and Connection Bandwidth Register 142b contain the number of cellets, and hence, the bandwidth, assigned to the frame of the Switch Stack Selector 120. Depending on whether CBR Stack A 553a or CBR Stack B 553b is operational within the switch in FIG. 11. The Switch Node Controller 560 determines whether the CBR Stack A 553a or CBR Stack B 553b is active. Switch Node Controller 560 activates Switchover Line A 561a activating "A" labeled elements of FIG. 11 and FIG. 12. By activating Switchover Line B 561b, Switch Node Controller 560 activates All "B" items.

As shown in FIG. 9a, a system Frame Reset 123 signal initiates a frame in a Switch Stack Selector 120. The CBR Stack A 553a and CBR Stack B 553b. Each of the Aggregation/Disaggregation (AD) Switch pair contains Connection Bandwidth Register Stacks that are memory maps. The Generic Aggregation Switch 501 acts as the master of both its memory maps and those in its paired Generic Disaggregation Switch 502. Assume that the memory map of Connection Bandwidth Register Stack A 502a in the Generic Disaggregation Switch 502 matches exactly the memory map in Connection Bandwidth Register Stack A 502a of the Generic Aggregation Switch 501. A list of actions listed below similar thereto can keep the two Connection Bandwidth Register Stacks of the Generic A/D Switch Pair 503 synchronized.

1. In both switches, at the start of the synchronizing process, assure that the non-operational Connection Bandwidth Register Stack in each switch matches the switch's operational Connection Bandwidth Register Stack
2. Either 1) data arrives at a Path Aggregation Switch 511 or 2) a change occurs in path or superpath bandwidth in any type of aggregation switch.
3. Assume that the current aggregation link bandwidth is sufficient to support the change. [If not, other methods disclosed herein can overcome the deficiency.]
4. The Generic Aggregation Switch 501 sets up the new bandwidth in the non-operational Connection Bandwidth Register Stack and causes a Control Vector message to be sent to the Generic Disaggregation Switch 502.
5. Using enumerated frames, send a Control Vector message from Generic Aggregation Switch 501 to Generic Disaggregation Switch 502 denoting frame number when both switches start using the newly updated Connection Bandwidth Register Stack.
6. Periodically assure that the Connection Bandwidth Register Stacks in the Generic A/D Switch Pair 503 remain synchronized.

Embodiments for Changing Bandwidth of Paths and Superpaths

Changing the bandwidth allocated to a frame in a network occurs in conjunction with changing the bandwidths of individual connections within a frame. Changing frame bandwidth in a SAIN Switch Stack Selector 120 is a two-state process that changes the number of cellets within the frame. The first state involves compaction of the plurality of connections within the frame into a contiguous range of Connection Domain 150 cellets starting with address "0": The second state involves adding or taking away cellets from a Connection Domain 150/Time Domain 160 frame. The order in which the steps occur depends on whether the number of cellets per frame is increasing or decreasing.

When increasing the Frame Size, increasing its size precedes increasing bandwidths of connections within the frame.

When decreasing the Frame Size, reducing connection bandwidths within the frame to a level that will fit within a smaller size frame precedes reducing the Frame Size.

FIG. 11 shows implementing a Switch Stack Selector 120 with a single Comparator Stack 551 and dual Connection Bandwidth Register (CBR) Stacks 553a. Within a given Switch Stack Selector 120, one Connection Bandwidth Register, for example, CBR Stack A 553a is operational. The other CBR Stack B 553b is preparing for a change in the Connection Domain 150/Time Domain 160 connection assignments. The CBR Stacks 553 and companion Comparator Stack 551 support the same number of connections, which can be arbitrarily large.

If the Aggregation Switch Node Controller 560 discovers that the amount of bandwidth required within a given frame must be increased, the first step is to compact the current connections to contiguous Connection Domain 150 range. Using methods of the embodiments of this application automatically causes such compacting of connections. The next step is to add a contiguous range to the frame to support the additional bandwidth required. The Aggregation Switch Node Controller 560 does this by adding a CC/CBR Spare Connection 135 to the frame.

The CC/CBR Spare Connection 135 has no link to a data source or sink. It does not require calculating the number of cellets required in the spare bandwidth since the CC/CBR Empty Connection 134 value set in the Switch Stack Selector 120 automatically sets the number of cellets. Although the number of empty channel cellets does not require calculation or storage, the sum of all cellet ranges in the frame, including spare bandwidth, must equal the Frame Size F.

A key part of implementing a SAIN network is connection bandwidth management. An important goal of SAIN networking is assured-delivery of traffic accepted by the network. In other words, change the legacy packet-network paradigm from "accept all traffic as it arrives, and discard that which cannot be delivered" to "accept traffic only if delivery is assured" and "only discard traffic under disaster or certain programmed circumstances."

In legacy networks, the goal is achievable only with substantial overprovisioning. As a result, adding new network capacity necessary to keep up with demand is very expensive. In addition, discarding packets just adds to traffic intensity by requiring retransmission of the forwarding failures of the network.

Fortunately, the SAIN structure enables implementation of a simple subsystem of reporting availability of bandwidth by Quality of Service Class throughout the network before accepting data into the network. The worst that can happen is for the network to inform a user "all connections are busy" for less important traffic classes. Data awaiting forwarding is storable for later transmission without requiring readmission by the user. The result achieves superior performance without the large amount of overprovisioning. In addition, the SAIN structure enables dynamic re-routing of traffic before it enters the forwarding part of the network thus optimizing the use of installed bandwidth.

Embodiments of Methods that Increase Path and Superpath Bandwidth

Allocating bandwidth within a SAIN network is a very dynamic process. It is most dynamic at the path aggregation level since this level is closest to the burstiness of user traffic. Higher-aggregation-level traffic changes as traffic loads shift, but these shifts are less dynamic. An individual traffic burst at the path level represents only a small proportion of total traffic at one of the higher aggregation levels.

Figure 15:
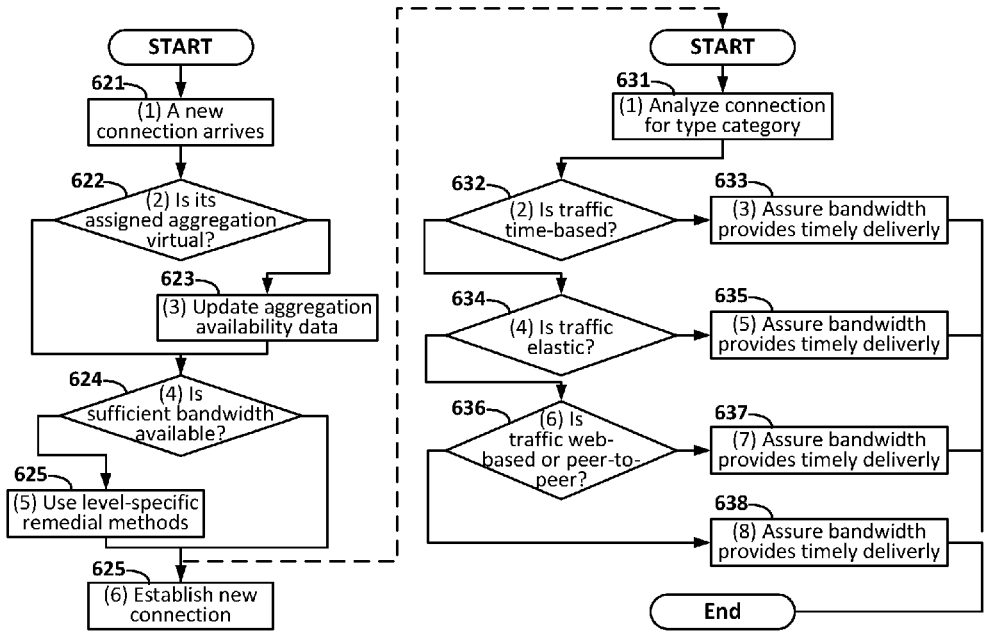
FIG. 15 shows a flow chart defining processes to set up a new connection according to an embodiment.

When a new high-bandwidth streaming connection shows up at a User Source Data Port 291 of a Source E-Node 201, rapid expansion of available bandwidth must occur quickly. The flowchart in FIG. 15 shows the steps taken to accommodate the new connection.

An Outline of SAIN Aggregation/Disaggregation Node Pair Switch Types

Figure 13:
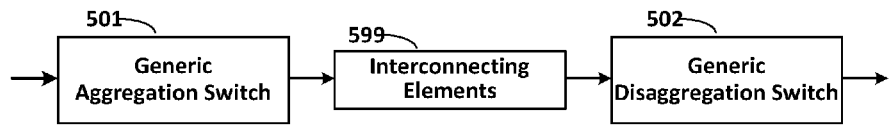
FIG. 13 shows basic aggregation/disaggregation switch pairs according to an embodiment.

In a SAIN network, all switches exist in pairs of one aggregation switch and one (or more) disaggregation switch(es). The result is that all control of connections and their assigned bandwidths require communication only between each node pair. FIG. 13 shows a Generic Aggregation Switch 501, a Generic Disaggregation Switch 502, and Interconnecting Elements 599. The arrows in the diagram represent the direction of travel of data and control information from a Generic Aggregation Switch 501 to a Generic Disaggregation Switch 502. Response information occurs from a Generic Disaggregation Switch 502 to a Generic Aggregation Switch 501. The Interconnecting Elements 599 may contain other paired switches between the Generic Aggregation Switch 501 and the Generic Disaggregation Switch 502 operating at various aggregation levels disclosed in the next sections.

There are four types of aggregation switches and matching disaggregation switches in the SAIN network disclosed in this application. A part of all switches is a Switch Stack Selector 120. The switching subsystem of a SAIN network contains a plurality of entity types independent of their network application. These are 1) an aggregation switch, 2) a disaggregation switch, and 3) duplex Control Vectors between the two switches as an operational pair. Control Vectors are private message-bearing two-way conversations between an aggregation switch and its paired disaggregation switch.

The generic and four subtypes of aggregation switches are:
1. a Generic Aggregation Switch 501;
2. a Path Aggregation Switch 511 (i.e., a Level 1 Aggregation Switch);
3. a Level 2 L2 Aggregation Switch 521;
4. a Level 3 L3 Aggregation Switch 531.

The generic and three subtypes of disaggregation switches are:
1. a Generic Disaggregation Switch 502;
2. a Path Disaggregation Switch 512 (i.e., a Level 1 Disaggregation Switch);
3. a Level 2 L2 Disaggregation Switch 522; and
4. a Level 3 L3 Disaggregation Switch 532.

In addition to these designations, for brevity, an aggregation/disaggregation node pair becomes the following:
1. A Generic A/D Switch Pair 503;
2. a Path Aggregation Switch 511/Path Disaggregation Switch 512 pair becomes a Path A/D Pair 513
3. a Level 2 Aggregation Switch 521/Level 2 Disaggregation Switch 522 pair becomes an L2A/D Pair 523;
4. a Level 3 Aggregation Switch 531/a Level 3 Disaggregation Switch 532 becomes an L3A/D Pair 533

In addition to the switch types listed above, one additional structure exists to accomplish a key SAIN network objective. This is the Crossconnect Switch 540, which can be used to interconnect switches of the same level. In some embodiments, the Crossconnect Switch 540 is used to interconnect Level 2 switches at a source T-node by aggregating traffic from child E-nodes according to destination E-nodes. In other embodiments, a Crossconnect Switch 540 could be used at a destination T-node rather than the source T-node.

Embodiment of a Generic Aggregation/Disaggregation Switch Pair

Unlike the telephone network, a modern communication network must cope with rapidly changing traffic intensity throughout the network. The Public Switched Telephone Network (PSTN) handles just one type of traffic efficiently—voice. A voice call, once established, remains connected for a substantial period, usually of the order of minutes. Modern networks do not work that way. Voice traffic is a critical part of today's traffic in terms of Quality of Service, but it is only a small part, in terms of traffic intensity. Total traffic intensity varies over a wide range in relatively short periods: In addition, using silence detection, where data is passes only when someone is talking, is a part of today's packet-based voice networks. Unfortunately, the packet overhead required is nearly large enough to make silence detection less useful than it can be in a circuit-based network. In a SAIN network, the concept of silence detection can be implemented by a virtual connection. The virtual connection can maintain a connection to a destination node and activate transmission with a few bits using a Control Vector for control instead of full packet headers.

Voice traffic has become a very small part of overall traffic in communication networks. Even so, there are corollaries in transmitting action-oriented video where it is important to change available bandwidth to meet ever-changing demand.

Aggregating bursty traffic using packet buffers internal to a network can smooth traffic gyrations, but only to a degree. Placing packet buffers only at network edges and using 1) virtual connections and 2) dynamic bandwidth management that changes bandwidth assigned to traffic aggregations quickly can provide significant network improvements. Doing this without resorting to a large amount of overprovisioning is one of the major advantages of the SAIN paradigm. This section of the application shows the basic methods and apparatus for doing so.

FIG. 13 shows a fundamental structure throughout a SAIN network. A Generic A/D Switch Pair 503 can apply bandwidth provided by the Interconnecting Elements 599 using methods of this application as long as the Interconnecting Elements 599 can supply enough bandwidth to support the Generic A/D Switch Pair 503 objectives.

Figure 14:
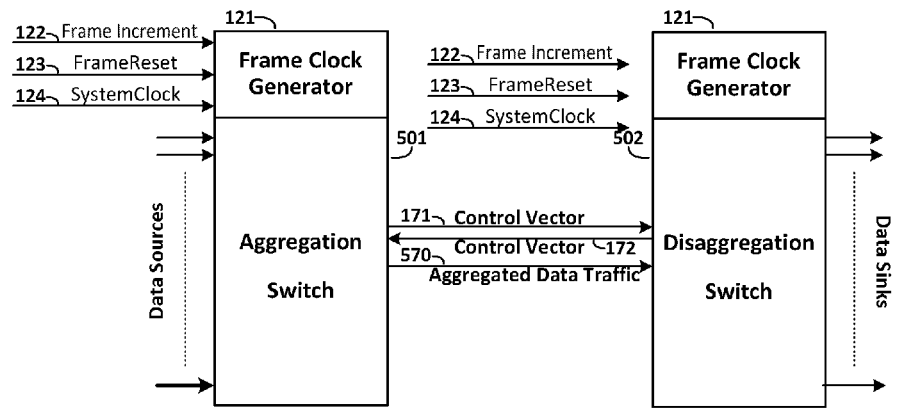
FIG. 14 shows an embodiment of an aggregation/disaggregation switch pair.

As shown in FIG. 14, each Generic Aggregation Switch 501 has a Frame Clock Generator 121 with three inputs connected to it: one for a Frame Size Increment 122, one for a System Clock 124, and one for Frame Reset 123. The Frame Reset 123, available within both the Generic Aggregation Switch 501 and the Generic Disaggregation Switch 502, generates the System Clock 124 and Frame Reset 123 inputs. These two parameters derive from a network system design using industry available timing and frame synchronization techniques. The parameters can remain static for substantial periods in a SAIN network. Their responsibility is to achieve a stable Frame Period, that is, a stable Frame Rate for each level of aggregation. The network can use currently available means to achieve this objective.

There are a number of methods to provide stable clocks in each SAIN switch node. The goal is to assure their mutual synchronization as a self-contained network. The larger approach is to synchronize the nodes to a common global clocking source such as Coordinated Universal Time (UTC) using existing methods. IEEE Standard 1588 has demonstrated ability to achieve synchronization to within a few nanoseconds.

In addition to synchronizing node clocks, it is necessary to have knowledge of where a frame starts for all links leaving and entering a node. A simple method can use a synchronized clock in each T-Node as a reference clock for all E-Node attached thereto. For a source E-Node, each frame generated can arrive at its parent T-Node slightly ahead of the start time of an outgoing T-Node frame.

For aggregated data originating from a plurality of T-Nodes, there are two general methods to provide synchronization to attached E-Nodes. One is to buffer incoming cellet traffic so that frames from all distant T-Nodes are time-aligned to overcome differences in link propagation delay. This method has the shortcomings of adding delay to nearby T-Nodes.

A second method makes use of the timing method outlined above where all E-Nodes frames are time-aligned with their parent T-Node frames. A simple method to achieve this result without injecting detrimental latency into the network is to measure the E-Node to T-Node delay is to assume that the round-trip delay is twice the one-way delay. Each Source E-Node 201 sends its frames far enough in advance to assure that the parent Source T-Node 301 receives them in a time-aligned fashion.

Using the model network as an example, there are 19 distant T-Nodes sending data to each other T-Node. Each T-Node aggregates data received from all of its E-Node sources into Level 2 frames. At a destination Level 2 to Path Level interface, there are 20 frame start times, one from each T-Node. Aligning the frames for each Source L2 Aggregation 721 at Source T-Nodes 301 does not assure that all Destination L2 Disaggregation 722 are time-aligned. There is no assurance that the distance from one T-Node to another is that same.

The start times of a frame have importance only within E-Node pairs. As disclosed later in the application, there is no need for keeping the frame start time intact along a route of transit nodes. The QDR and cellet size needed to handle potential Source E-Node 201 traffic determines the frame period required for a Path A/D Pair 513. This requirement does not exist in the transit links between a Source E-Node 201 and a Destination E-Node 202. Frame periods measured in microseconds often cover the need at the Path A/D Pair 513 level. This requirement does not exist inside a SAIN network beyond the first path level of aggregation. Dividing transit frames into very small segments can result in nanosecond or smaller periods resulting very small delays with no jitter or meaningful delay variation.

The Frame Size Increment 122 is a system parameter that can change frequently. It is a key part of the methods of this application to achieve the adaptive objectives of SAIN. The frequency with which the parameter changes is inversely proportional to the aggregation level of a link. In other words, the Frame Size Increment 122 changes most frequently at the path aggregation level and least frequently at Level 3. The frame size at a given level, measured in total amount of data, must increase if the switch involved requires more bandwidth to handle its traffic load. A mixture of high clock rates and relatively large cellets supports the increase.

Another aspect of SAIN networks is the requirement that the content of Connection Bandwidth Register 142 (see FIG. 9*b*) within each Generic Disaggregation Switch 502 always remains synchronized with its paired Generic Aggregation Switch 501. The Generic Aggregation Switch 501 controls bandwidth allocation of connections contained within its domain. Bandwidth allocation within a Generic Disaggregation Switch 502 is slaved to its Generic Aggregation Switch 501 master.

Bandwidths assigned to connections within each route are a set of positions within Connection Bandwidth Register 142 of a Generic A/D Switch Pair 503. Each position denotes bandwidth of a connection by storing the number of cellets per Connection Domain frame. These positions can remain in place for extended periods for flow-based traffic with nearly constant average bandwidth. Such traffic includes, but not limited to voice, streaming media, certain classes of video, and embedded clips within web sites.

Within a Path A/D Pair 513 pair between two E-Nodes, the Connection Bandwidth Register 142 positions can be in one of three states. They are a real state (i.e., operational state), a sleep state, or a virtual state. A real state carries customer traffic along with necessary management and control plane traffic. A sleep state is a state that can turn into a real state quickly. It would include, for example, sending enough control traffic to and from the sleep-state switch terminations to assure rapid real state restoral. A virtual state of a route has positions within Connection Bandwidth Register 142, but with zero assigned bandwidth. In a sleep state where temporarily no substantial traffic exists, there can be enough control bandwidth to pass information assuring data connection viability.

For proper operation in a real state, each switch pair must have sufficient assigned bandwidth to embed connections presented to it. The aggregation of these connections becomes a connection to a switch pair at a higher aggregation level. When a new connection is set up within a Generic A/D Switch Pair 503 pair at any level, steps apply as shown in FIG. 15*a*. Step (1) 621 of the figure shows the arrival of a new connection. The first question asked at step (2) 622 is whether the state of the aggregation that will carry the connection is in a virtual state. If it is, then step (3) 623 must occur where information that would be available if the aggregation were either in a sleep state or a real state. The data that always exists for an aggregation in either one of these two states includes that answer to step (4) 624. Step (5) 625 is taken if the answer to the question posed in step (4) 624 is no. Step (6) 626 occurs after steps (4) 624 and (5) 625 are complete. A Switch Node Controller 560 software controls the processes disclosed herein.

FIG. 15b is relevant only for Path A/D Pairs 513 discussed below, and not for higher aggregation levels. A SAIN network can support a wide variety of Classes of Service and Qualities of Service in a deterministic manner. For purposes of explanation, the discussion will focus on three Classes of Service (CoS) in which a number of Quality of Service (QoS) types can exist. Many other approaches are possible. Initially the discussion includes three CoS's plus a shareable Excess Information Rate class.

FIG. 15b begins with step (1) 631 analyzing the incoming connection to determine its CoS type. Step (2) 632 determines whether the incoming connection is time-based. In other words, is the connection time-critical? The answer is "yes" for interactive services such as voice calls or video conferencing. It can be even more time critical for certain transaction processing where humans are not directly involved. In fact, in some financial transactions, microseconds or even nanoseconds are important. In human interactivity, competitive online gaming requires short transport delays to meet quality requirements. They are often significantly shorter than allowable round-trip delays for voice conversations that require 300 or substantially less milliseconds including propagation delay. (Round trip of a conversation over a geostationery satellite is almost 500 milliseconds, a time found to be very unsatisfactory. Unfortunately, the delay in some cellular telephone systems approaches that value or more due to unavoidable hop-by-hop packet buffer delay.)

Step (3) 633 traffic is less restrictive. It may still require an average bandwidth over a given period, but there is neither interactivity nor sub-second UTC certainty. In other words, it has elastic properties. For example, it is recorded material that is to be played in real time, but can endure a slightly delayed start time to fill a cache to the point that service interruption will not occur because intermittent bandwidth starvation. Most broadcast traffic and multimedia traffic is in this category.

The following Table 1 contains estimates of possible latency requirements for each class of service. These type of Quality of Service objective and more can be included in Service Level Agreements (SLAs) between service providers and their customers. The table is only an example to show that mere priority among service types is not a very good way to denote service classes. Priority alone cannot represent what a user can specify and observe.

Figure 16A:
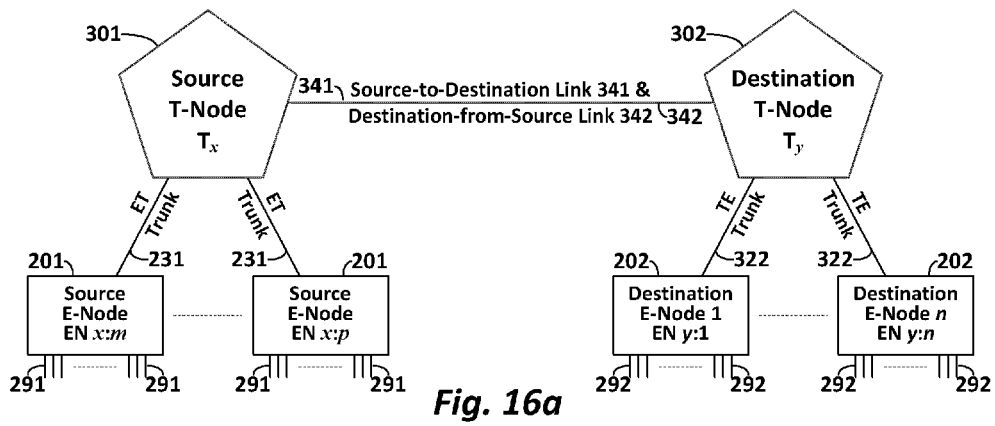
FIG. 16a, 16b, 16c shows various configurations of E-Nodes and their T-Node parents according to embodiments.
Figure 16B:
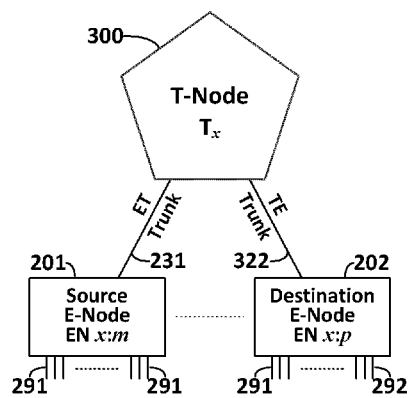

Two links are involved where a T-Node 300 acts as both a Source T-Node 301 and a Destination T-Node 302 as shown in FIG. 16b. FIG. 16a shows the overall configuration of a basic SAIN network with separate source and destination E-Nodes and T-Nodes. In particular, it shows a plurality of Source E-Nodes 201 connected to a plurality of Destination E-Nodes 202 through a Source T-Node 301 connected to a Destination T-Node 302. The figure shows the Source T-Node 301 labeled $T_x$ has connections to a Destination T-Nodes 302 labeled $T_y$. In a SAIN network, each T-Node can connect to every other T-Node in both a simplex and a duplex manner. Nominally, forwarding data from one T-Node to another is a simplex process. Concomitantly, duplex control messages travel between source and destination nodes using Control Vectors. In the model network, each T-Node forwards data to 19 another T-Node connected through a network as shown in FIG. 16a. A T-Node also connects internally from a child E-Node to all other E-Nodes attached to the same parent as shown in FIG. 16b.

Figure 24:
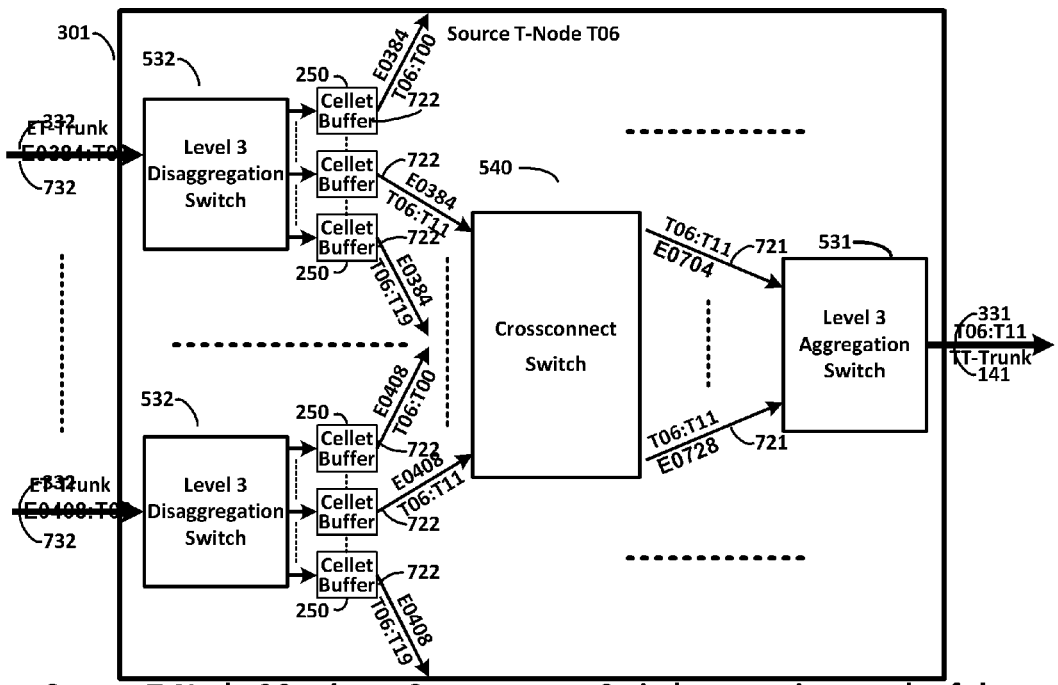
FIG. 24 shows a Level 3 Source T-Node example, which uses a Crossconnect Switch to initiate reorienting each of the 25 Level 2 aggregations of 499 paths from One-to-Many to Many-to-One.
Figure 25:
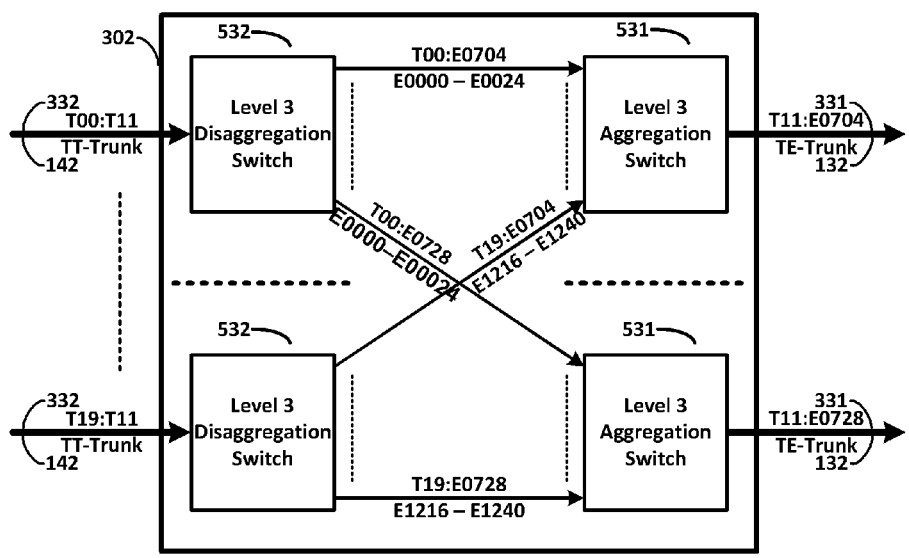
FIG. 25 shows a Destination T-Node 11 example using a Crossconnect Switch to finish the Many-to-One Mapping from 20 T-Nodes to the 25 E-Node children of T-Node 11.

The Source T-Node 301 to Destination T-Node 302 link may include a number of Transit Nodes as shown in FIG. 24 and FIG. 25 and described below. The Transit Nodes transparently forward data from a Source T-Node 301 to a Destination T-Node 302. A T-Node 300 can be a transit node in addition to its other functions. The SAIN multiplexing transform producing aggregated connections can use small size cellets. Both PoT-based data rates and data rates based on radices other than two can result in very small switch node latency.

FIG. 16b shows a T-Node 300 that acts as a backhaul Source T-Node 301 and Destination T-Node 302 connected to both Source E-Nodes 201 and Destination E-Nodes 202. Note that the Source E-Nodes 201 in FIG. 16a and FIG. 16b have User Source Data Port 291 attached to Source E-Nodes 201 and have User Destination Data Port 292 attached to Destination E-Nodes 202. In addition, a Source E-Node 201 attaches to its parent Source T-Node 301 using an E-Node-to-T-Node link labeled ET-Trunk 231. A Destination T-Node 302 attaches to its child Destination E-Nodes 202 using T-Node-to-E-Node links labeled TE-Trunks 322.

Diagrams Showing SAIN Node Logical Connectivity

Figure 17:
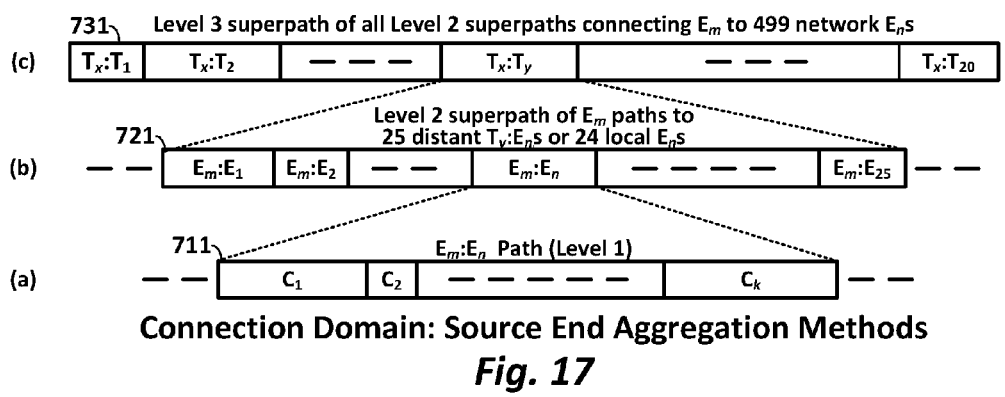
FIG. 17 shows source-end aggregation methods in the Connection Domain according to an embodiment.

FIG. 17 shows the logical links from an E-Nodes 200 and T-Nodes 300 can act both as Source E-Nodes 201 connected to Source T-Nodes 301 and as Destination T-Nodes 302 con-

TABLE 1

| Service | MEF Service Class | Satisfactory Latency Excluding Propagation | Comments |
| --- | --- | --- | --- |
| Constant Bit Rate (CBR) | A | 1.0 μsec-50 msec | When committed bandwidth is not in use, it is re-assignable as long as re-establishment of its committed value occurs within the time allotted. |
| Web Site Search | B | 250 msec Round Trip (RT) | Service appears after a mouse click on a link or depressing an "Enter" key after URL submission. |
| Audio/Video Broadcast or Streaming | B | 500 msec RT | Clicking or using a TV remote on an On-Demand or Broadcast Connection. |
| On-Demand Traffic | B | 1 msec to 2 hours | When available from source |
| E-Mail | C | 1.0-60 sec | Clicking on Send/Receive |
| Messaging | C | 2 sec RT | Pressing an "Enter" Key |
| VOIP | A | 200 msec RT | Stop Talking/ Start listening |
| Control Vectors | A | 1.0 μsec-5 msec | Latency determines bandwidth efficiency. |
| Control Packets | A | 1-10 msec | Latency determines bandwidth efficiency. |

Diagrams Showing SAIN Node Physical Connectivity

Figure 16C:
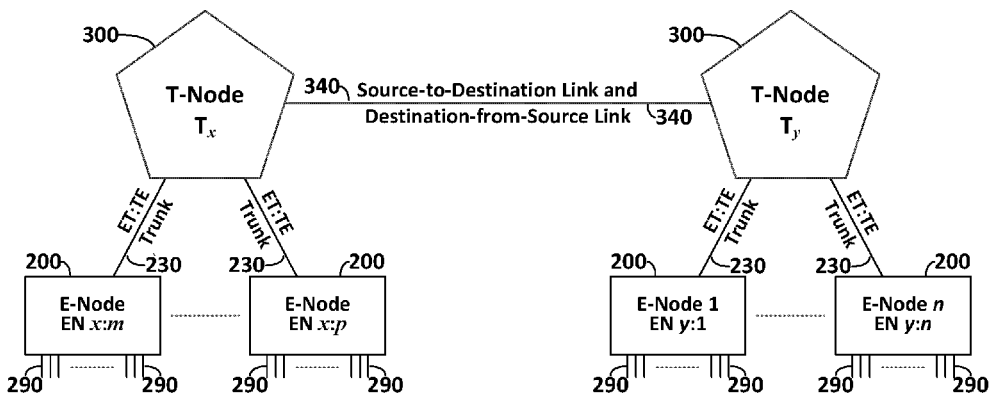

Referring to FIG. 16, a path from a Source E-Node 201 to a Destination E-Node 202 can use two or three tandem links.

nected to Destination E-Nodes 202. As disclosed in detail later in this application, the three levels of aggregation shown in the figure can occur within a Source E-Node 201. The aggregations obtain two objectives. One is to aggregate all user input data into aggregated paths and superpaths so it can be sent to a parent Source T-Node 301 of the Source E-Node 201 in a single aggregation. The second objective is to provide such an aggregation that the parent Source T-Node 301 can manipulate it in a manner that forwards the data to Destination T-Nodes 302 for distribution to their child Destination E-Nodes 202.

The first logical links can aggregate a plurality of user connections into a Source Path Aggregation 711 as shown in FIG. 17(a). The figure shows a Source Path Aggregation 711 that can be included in higher aggregations in the Connection domain as shown by FIGS. 17(b) and 17(c).

As shown in the example in FIG. 17(b), each of a plurality of Source Path Aggregations 711 becomes a Connection Domain segment in a Source L2 Aggregation 721 superpath of the Source Path Aggregation 711 generated within the Source E-Node 201. The Source L2 Aggregation 721 includes all Source Path Aggregations 711 forwarded to the Destination E-Nodes 202 whose parent is the Destination T-Node 302 of the Source L2 Aggregation 721. FIG. 17(b) details this approach. Each segment of the Source L2 Aggregation 721 contains the address of the Source E-Node 201, $E_m$ along with the address of a Destination E-Node 202, $E_m:E_1$, $E_m:E_2 \ldots E_m:E_n \ldots E_m:E_{25}$. The notation shows the source E-Node address $E_m$ followed by a colon followed by the destination E-Node address. This figure illustrates an embodiment with 25 Destination E-Nodes 202 for each parent Destination T-Node 302. Any number of Destination E-Nodes 202 for a parent Destination T-Node 302 is possible.

The Source L3 Aggregation 731 shown in FIG. 17(c) handles the Source L2 Aggregations 721 in a similar manner. In this case, the plurality of Source L2 Aggregations 721 contains all connections from the Source E-Node 201 to all Destination T-Nodes 302. Each segment Source L3 Aggregation 731 contains the address of the Source T-Node 301, $T_x$ along with the address of the model network's 20 Destination T-Nodes 302. In this embodiment, The addresses are $T_x:T_1$, $T_x:T_2 \ldots T_x; T_y \ldots T_x:T_{20}$.

Figure 18:
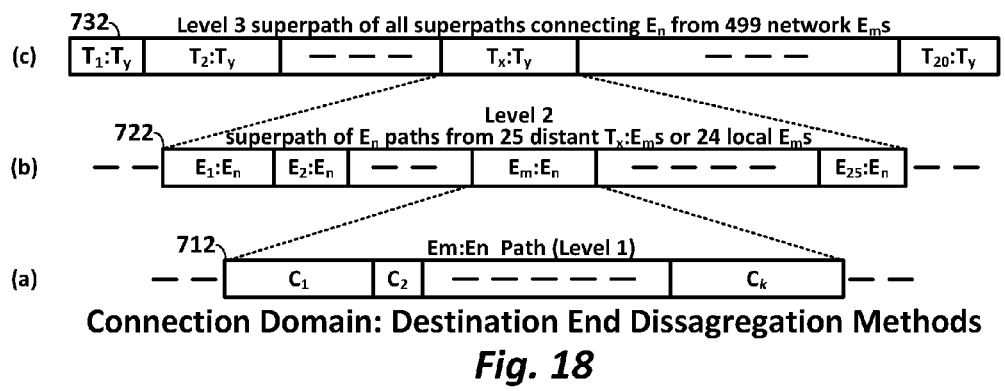
FIG. 18 shows destination-end disaggregation methods in the Connectiion Domain according to an embodiment.

Each Source T-Node 301 forwards each Source L2 Aggregation 721 received from its child Source E-Nodes 201. Each Source T-Node 301 modifies the Source L2 Aggregations 721 received from its child Source T-Nodes 301 to become Destination L2 Disaggregations 722. The modifications change the contents of the aggregations from one Source E-Node to many Destination E-Nodes into one Destination E-Node from many Source E-Nodes. Crossconnect switches as disclosed below can perform this modification. Each Source T-Node 301 sends modified Destination L2 Aggregations 721 to be treated as Destination L2 Disaggregations 722 by each of the Destination T-Nodes 302. These are the multiplexed aggregations sent over a Source-Destination TT-Link 341/ Destination-Source TT-Link 342 pairs shown in FIG. 16a. Each Destination T-Node 302 aggregates the modified Destination L2 Disaggregations 722 into Destination L3 Disaggregations 732, one for each child Destination E-Node 202. FIG. 18 shows the disaggregation processes that mirror these aggregation processes.

Embodiment of Path Aggregation and Disaggregation (Level 1) Switch Pairs

Figure 19:
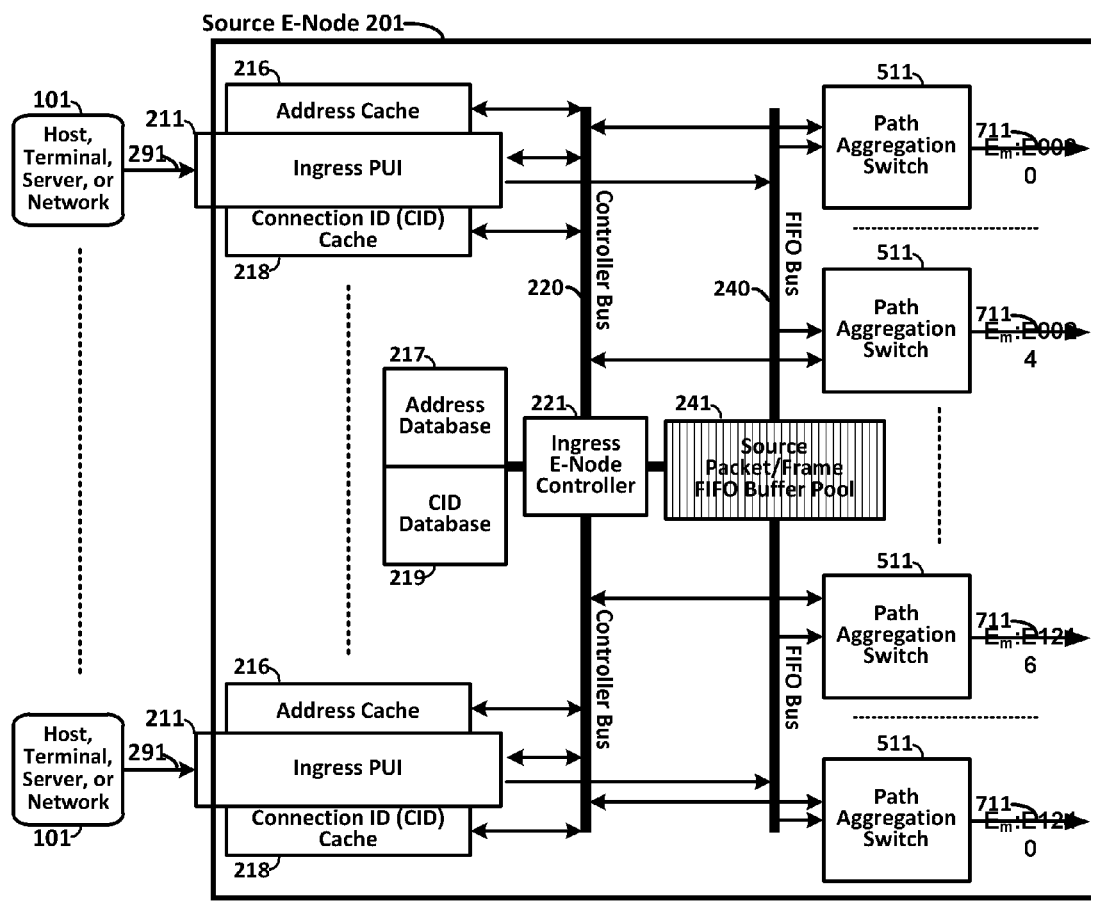
FIG. 19 shows an embodiment of source E-Node aggregation/disaggregation path switches.

Using the model network with a total of 500 E-Nodes 200 and 20 T-Nodes 300 as an example, FIG. 19 shows an E-Node 200 with a Source E-Node 201 and 499 Path Aggregation Switches 511. The Switches 511 connect to every Destination E-Node 202 in the network, except to the Destination E-Node 202 in the E-Node 200 itself. The 499 Path Aggregation Switches 511 connect to Level 2 Aggregation Switches 521 and then to a Level 3 Aggregation Switch 531. The Level 3 Aggregation Switch 531 connects to the parent Source T-Node 301 of the Source E-Node 201 as illustrated in FIG. 16.

Figure 20:
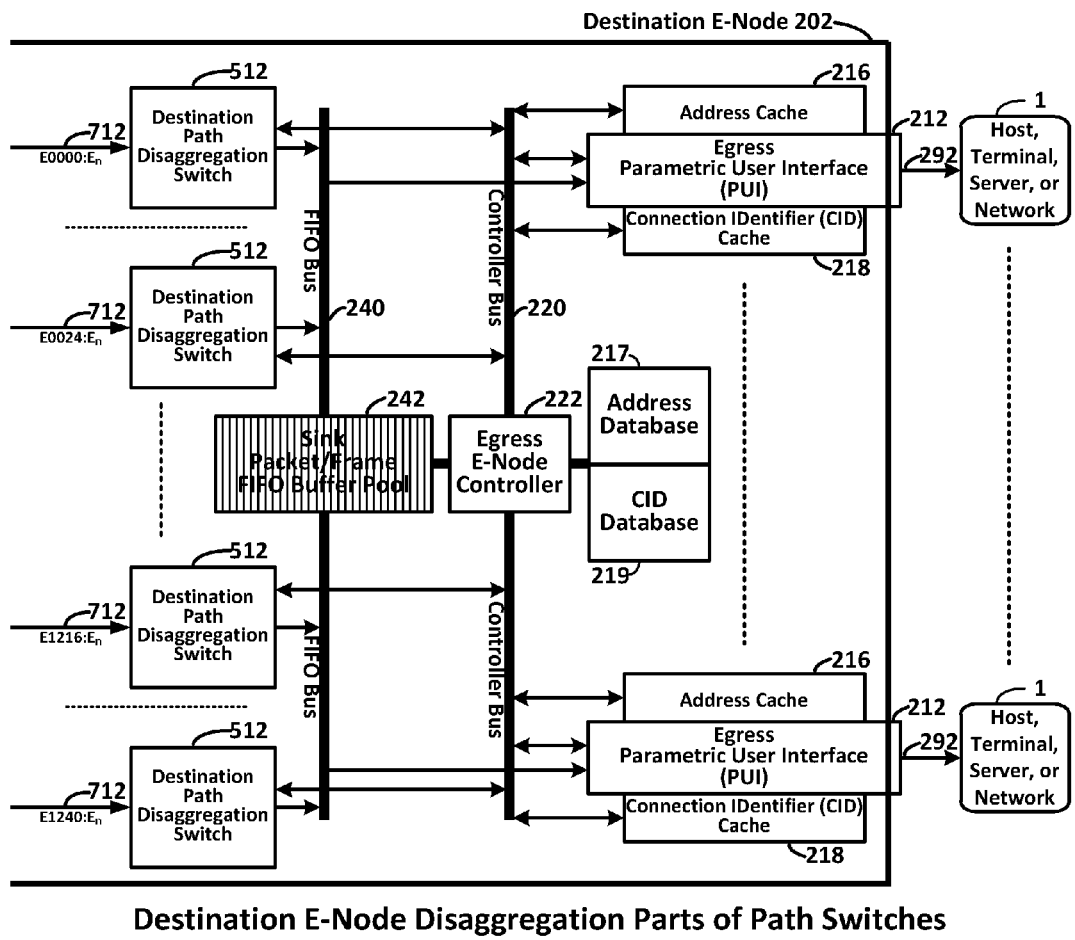
FIG. 20 shows an embodiment of destination E-Node aggregation/disaggregation path switches.

In FIG. 20 Destination E-Node 202 appears to be a mirror image of the Source E-Node 201. However, there is not a one-to-one correspondence between the Path Disaggregation Switches 512 in the Destination E-Node 202 and the Path Aggregation Switches 511 of Source E-Node 201. In this embodiment, there is only one Path Disaggregation Switch 512 in the Destination E-Node 202 connects to a Path Aggregation Switch 511 in the Source E-Node 201. All other Path Aggregation Switches 511 exist in other Source E-Nodes 201. This means that another way of connecting Source E-Nodes 201 to Destination E-Nodes 202 must occur. The other way is through a Crossconnect Switch 540 disclosed below.

Embodiment to Set Up and Maintain User Connections

At the time of SAIN network formation, it contains a plurality of E-Nodes 200. Each E-Node 200 can be capable of performing Source E-Node 201 and Destination E-Node 202 functionality. Each Source E-Node 201 within an E-Node 200 can connect to every Destination E-Node 202 in the network, except the Destination E-Node 202 within the E-Node 200. Likewise, each Destination E-Node 202 within an E-Node 200 is connectable from every Source E-Node 201 in the network, except the Source E-Node 201 within E-Node 200. The T-Node 301 configurations occur in accordance with the methods disclosed below.

When operational, as shown in FIG. 19, a Host, Terminal, Server, or Network 101 sends data through one of a plurality of User Source Data Port 291. The data port connects to an Ingress PUI within the plurality of Ingress PUI 211 shown in FIG. 19.

Using an Ingress Parameterized User Interface (PUI) 210 can produce the following inputs to an Ingress E-Node Controller 221:

1. Destination E-Node address(es),
2. Traffic type, such as
   a. Unicast, or
   b. Multicast, or
   c. Broadcast, and/or
   d. Ethernet (MAC Address), or
   e. Other defined address type
3. Port Number(s) of an E-Node or Ethernet Bridge
4. Latency Class or Assigned Class of Service The Ingress PUI 211a first searches its Address Cache 216 and Connection ID (CID) Cache 218 to determine if the incoming packet matches the one that existed within the (recent) past, matching the items listed above. If it does, the PUI sends the packet to the Source Assigned FIFO Buffer 243 selected previously, and sends an alert signal announcing that fact to the Ingress E-Node Controller 221. The Ingress E-Node Controller 221 then determines if the bandwidth assigned meets the class objectives of item 4 in the above list. If the amount of bandwidth available allows the system to meet the item 4 objective, the Ingress E-Node Controller 221 takes no action. If there is more bandwidth assigned than necessary, i.e., if it is more than enough to empty the buffer, the Ingress E-Node Controller 221 may reduce the bandwidth for the connection. Reducing the bandwidth can be performed by reducing the connection's number of cellet slots stored in the location in Switch Stack Selector 120.

For a new connection that does not exist in the Address Cache 216, the network uses conventional Ethernet, Domain Name System (DNS), and/or router methods to find a Destination E-Node 202 connection address. A table of MAC addresses and associated E-Node and port addresses within the system enables the methods used. Other methods are possible or may evolve including large databases matching Internet URLs or other standards to E-Node addresses. The Ingress PUI 211a sends its connection information with Destination E-Node 202 address(es) to the Ingress E-Node Controller 221 designates an Source Assigned FIFO Buffer 243 from the Source FIFO Buffer Pool 241 to the incoming connection. It concomitantly assigns the Source Assigned FIFO Buffer 243 to a location in the CBR Stack 553 within a selected Path Aggregation Switch 511. The Source Assigned FIFO Buffer 243 is the data source for CBR Stack 553 in the Switch 511. The FIFO Bus 240 transfers the cellets from the Source Assigned FIFO Buffer 243 to the Switch 511, which aggregates the cellets into a Source Path Aggregation 711 multiplexed data stream.

Aggregation User Path Connections

The Path Aggregation Switches 511 within an E-Node 200 aggregates user data connections into Source Path Aggregations 711. Each path originates in a Source E-Node 201 Path Aggregation Switch 511 and terminates in a Destination E-Node 202 Path Disaggregation Switch 512. FIG. 17(a) shows such a Source Path Aggregation 711 emanating from a Source E-Node 201. The path terminates as a Destination Path Disaggregation 712 within the Destination E-Node 202 as shown in FIG. 18(a). As long as the network is forwarding the path toward its Destination E-Node 202 within a higher layer of aggregation, it is a Source Path Aggregation 711. When it passes through a lower disaggregation level, it becomes a Destination Path Disaggregation 712. In other words, there is a one-to-one connection between each of the Path Aggregation Switches 511 in a Source E-Node 201 and a Path Disaggregation Switch 512 in a Destination E-Node 202. The Destination E-Node 202 may be in the same E-Node 200 as the Source E-Node 201, in which case no connection may be necessary.

FIG. 20 shows the inverse operations at one Destination E-Node 202. The inputs are Destination Paths 712 each of which originates from a Path Aggregation Switch 511 located in a different E-Node 200. Each Destination Path Disaggregation 712 connects to a Path Disaggregation Switch 512 that changes the multiplexed data stream Destination Path Disaggregation 712 in cellets to be stored in a Destination FIFO Buffer Pool 242. From the Sink FIFO Buffer Pool 62, the stored cellets transfer to an appropriate Egress PUI 212 and on to a port connected to a Host, Terminal, Server, or Network 101. These operations can be performed by an Egress E-Node Controller 222.

A Parameterized User Interface (PUI) 210 performs two functions: 1) acting as an Ingress PUI 211 and 2) acting as an Egress PUI 212. Associated with both functions are an Address Cache 216 and a Connection Identifier Cache 218. The Address Cache 216 stores the current address information about both source and destination PUI 210 connections. When a new address information appears within an Ingress PUI 211, it is stored within the Source E-Node 201 housing the Ingress PUI 211. The information is then available beyond the PUI 210 involved in the connections. Sharing the information with Destination E-Nodes 202 is often appropriate. It is also appropriate to store the information within a database available to the entire Metro Network and beyond.

The Connection Identifier Cache 218 can store packet header information that appears in successive packets without modification. Associated with the information is a Connection IDentifier (CID), a small number of bits that represents the information. When a packet enters an Ingress PUI 211 that requires a new CID, the Ingress E-Node Controller 221 or other processor in the system can provide a CID. The Ingress E-Node Controller 221 sends the new CID with relevant information to one or more E-Node Controllers as necessary. The operation is similar to the IETF RObust Header Compression (ROHC) RTFs that are available as standards for its detailed design.

CIDs can also become part of a network-wide database where appropriate. Such caches reduce sending header information with data packets. Control Vectors contain implicitly addressed message segments, which can replace traditional control packets as used in other networks. This approach provides deterministic control, message latency, and saves bandwidth between source and destination E-Nodes 200 and T-Nodes 210.

Figure 21:
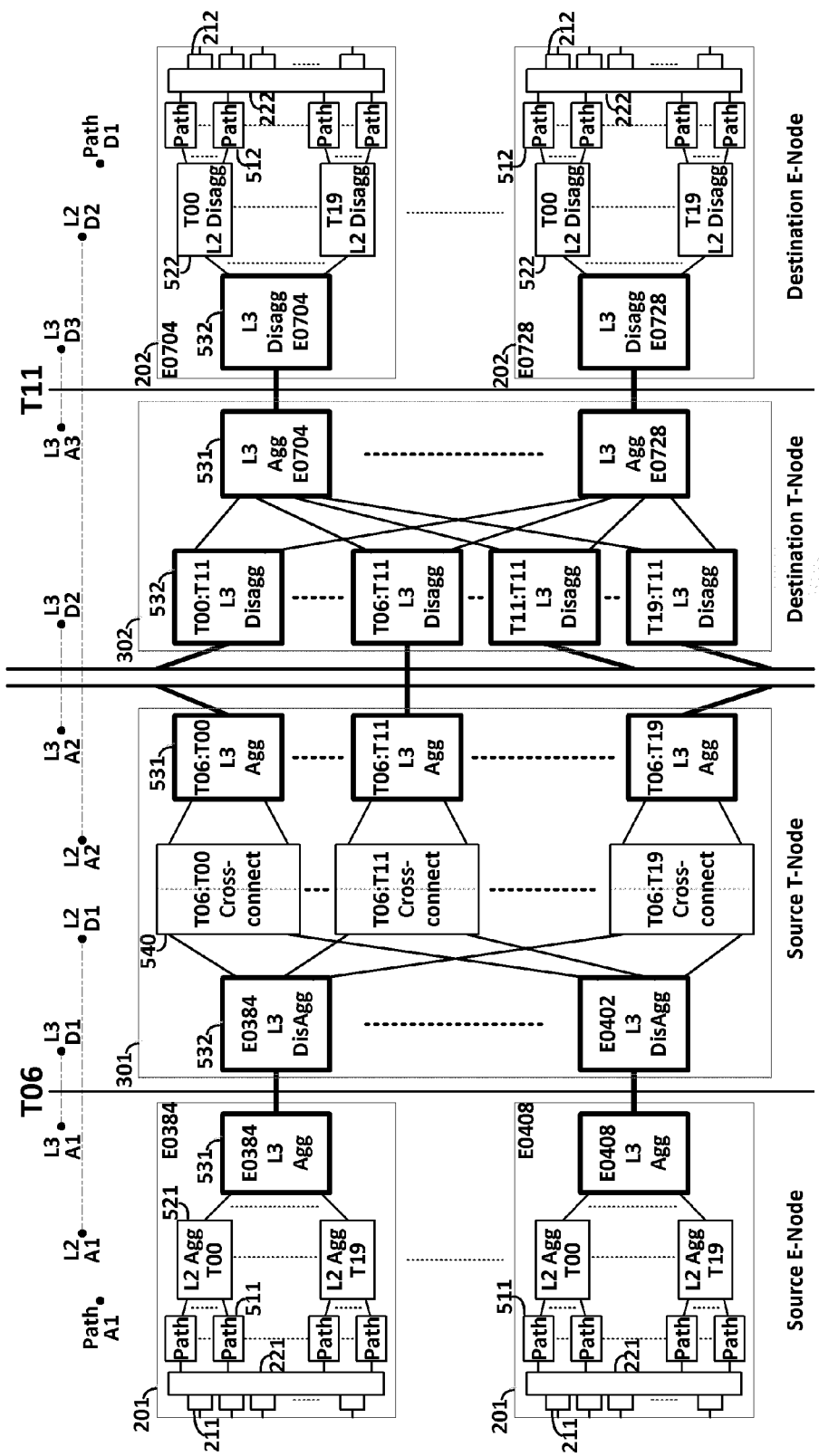
FIGS. 21 and 21A-D show a system diagram with 1 Path Level Switch Pair, 2 Level 2 Pairs, and 3 Level 3 Pairs that connect Source E-Nodes to Destination E-Nodes according to an embodiment.
Figure 21A:
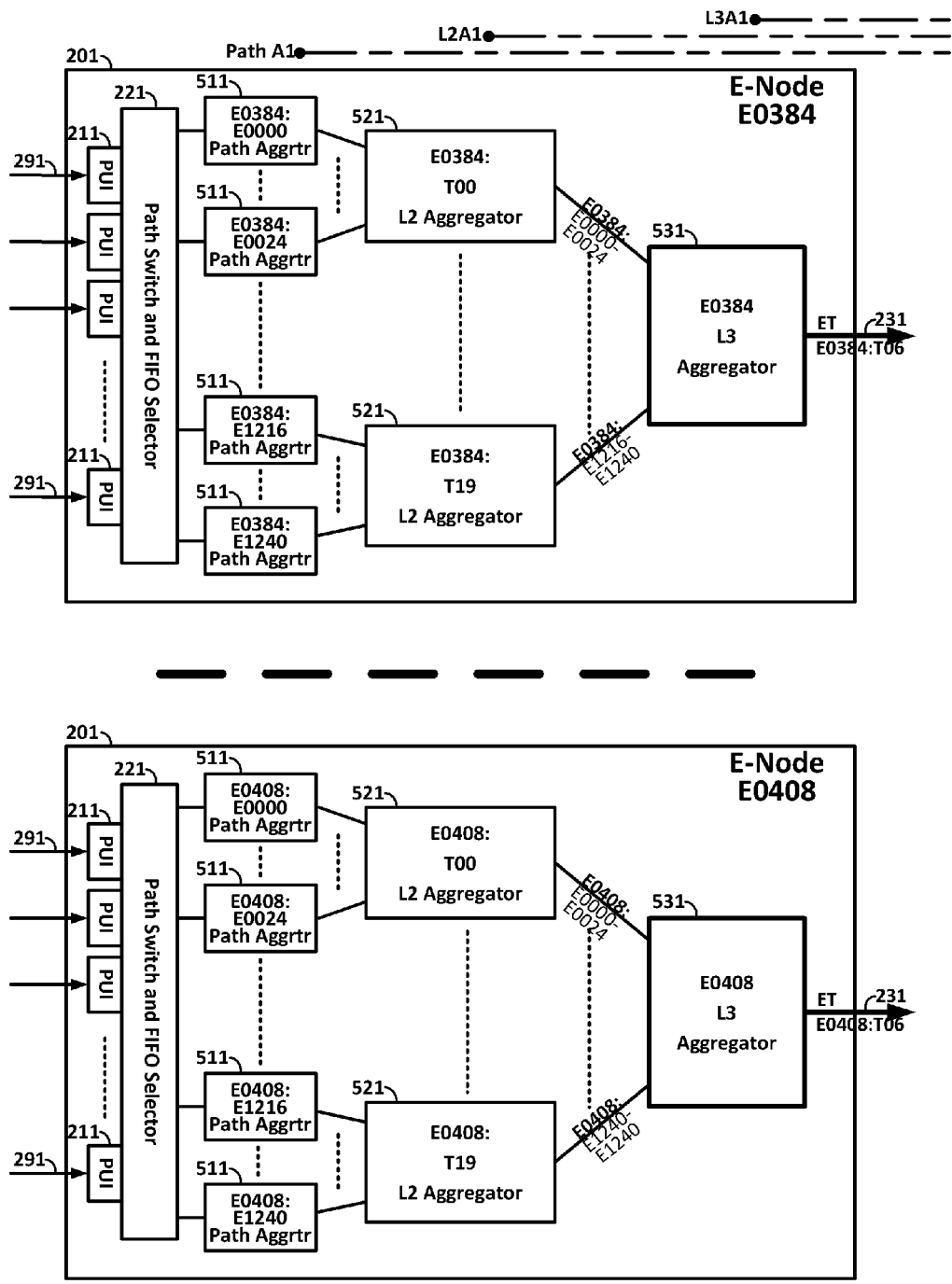
Figure 21B:
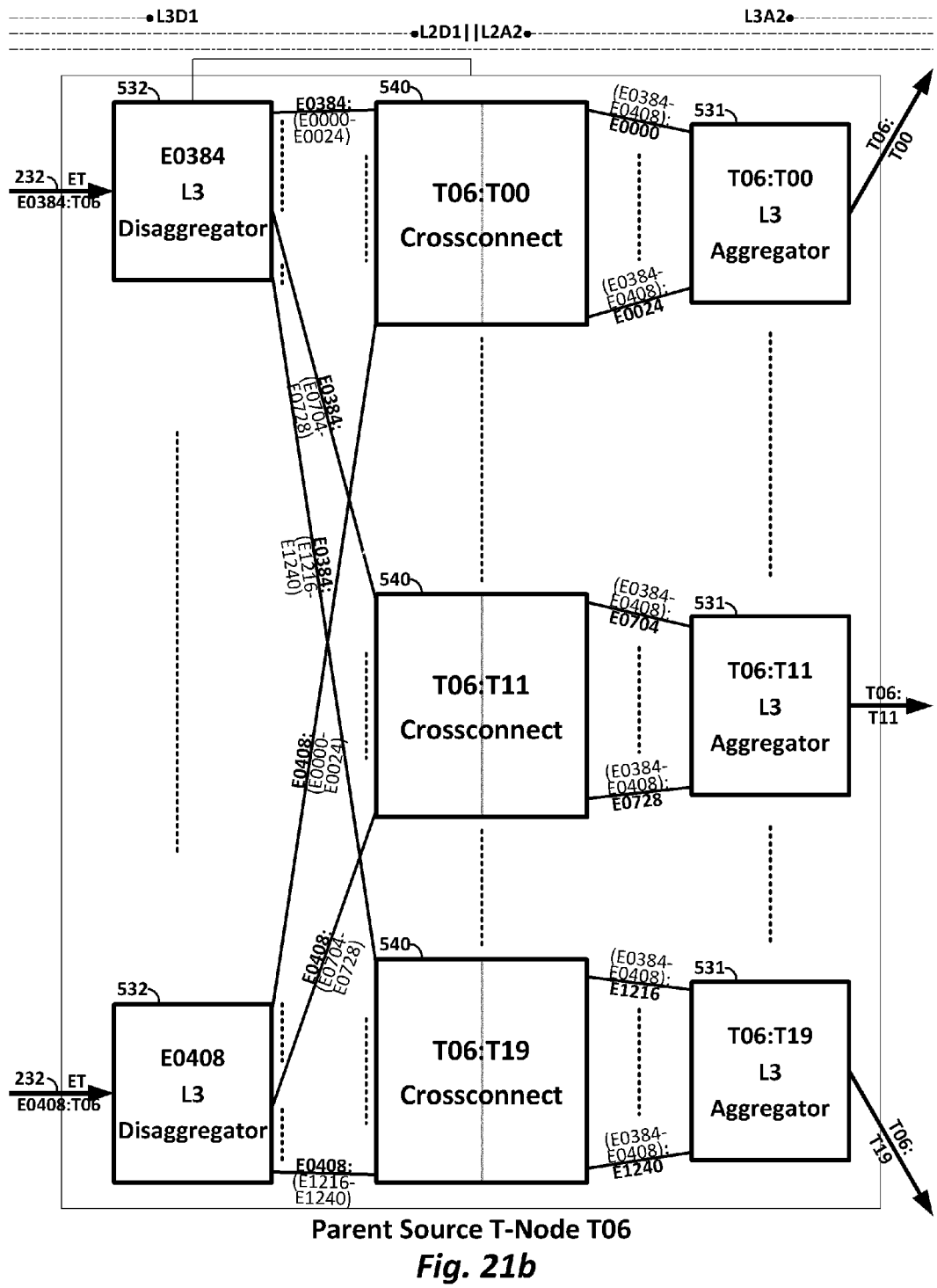
Figure 21C:
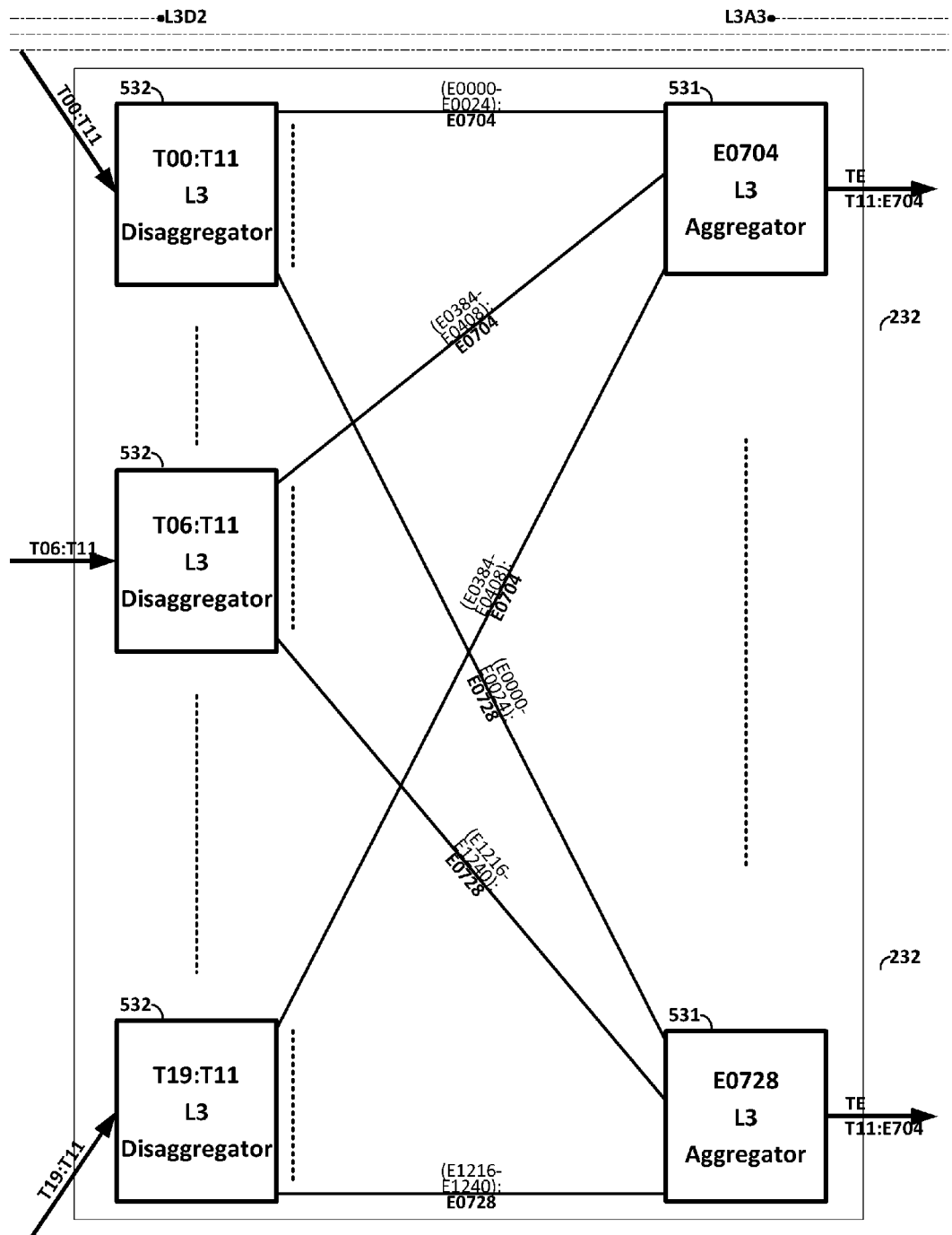
Figure 21D:
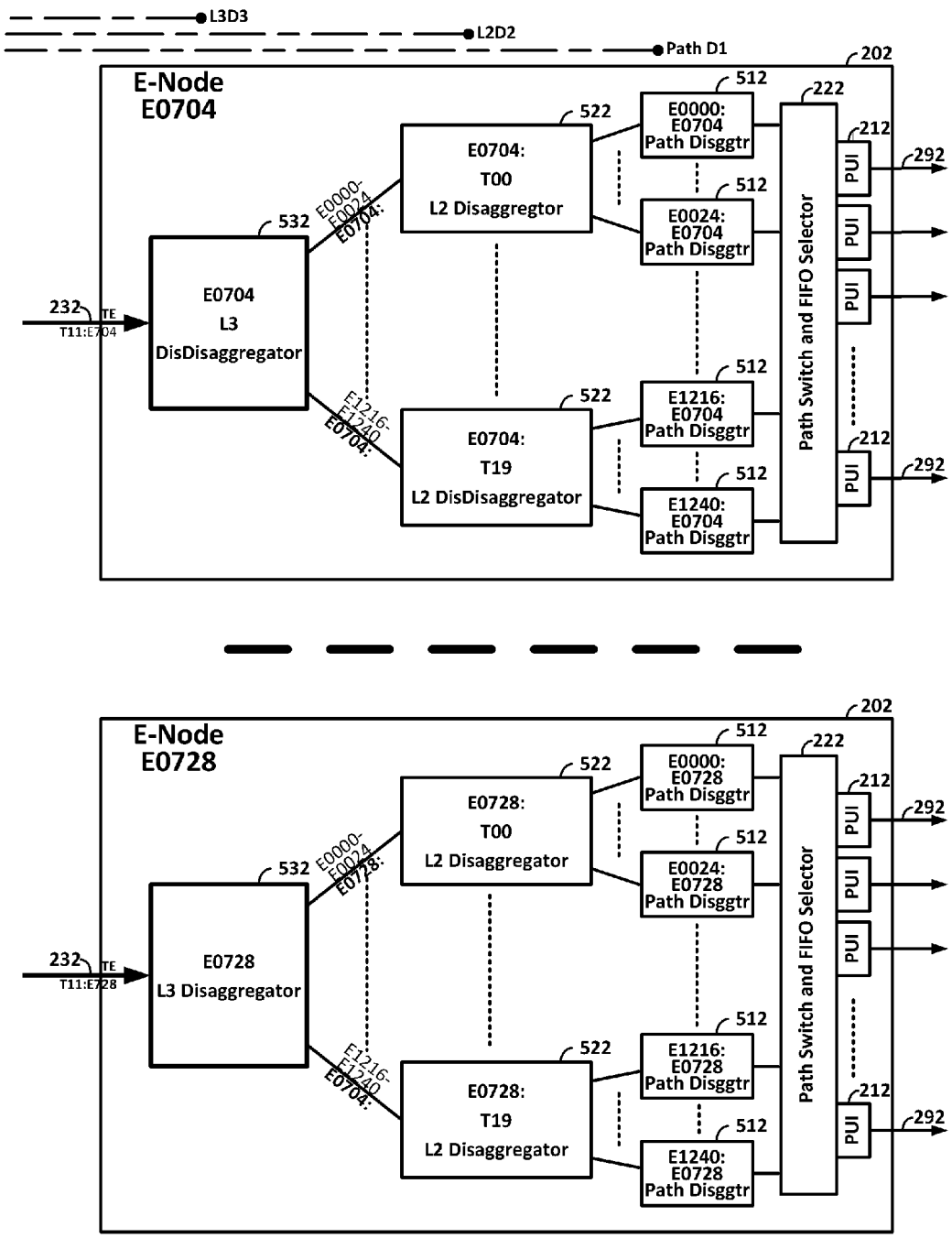

FIG. 21 has two purposes. One is to articulate connectivity that is required to enable all paths from a Source E-Node 201 to terminate on Destination E-Nodes 202 in different E-Nodes 200. An additional purpose is to articulate connectivity that is required to enable all paths from all Source E-Nodes 201 in different E-Nodes 200 to terminate in a single Destination E-Node 202.

For purposes of this section, an addressing notation is introduced as described below for E-Nodes 200 and T-Nodes 210. This addressing information is used for reference. For this addressing notation, assume that each T-Node 301 has a 6-bit address assigned (T00, T01 . . . T63). Further, assume that each E-Node 200 has a 6-bit number assigned within its parent T-Node 301 domain. Assuming that each T-Node 301 can support up to 64 E-Nodes 200, a unique 12-bit E-Node 200 address is 64×(T-Node address)+(E-Node address). A network that starts small can scale to contain 64 T-Nodes 210 each of which can scale to 64 E-Nodes 200 for 4,096 E-Nodes 200. With this approach, the parent T-Node address for an E-Node is $$=INT(E\text{-Node address}/64). \qquad (4)$$

The 6-bit E-Node address within a T-Node domain is $$=(E\text{-Node address})MOD\ 64. \qquad (5)$$

FIG. 21 and other figures in this application use this numbering scheme where the T-Node and E-Node addresses are useful. Note that using 6-bit numbers are for illustration purposes only in this application. Other addressing standards are possible in further implementations.

FIGS. 21 and 21A-D show Source E-Nodes 201 connected to their parent Source T-Node 301 labeled T06. FIG. 21 depicts a full system overview. FIGS. 21A-21D illustrate close up views of each portion of FIG. 21 with further detail. FIGS. 21, and 21A-D will be referred to collectively as FIG. 21, unless otherwise specified. It also shows all paths that terminate on all Destination E-Nodes 202 whose parent is a Destination T-Node 302, labeled T11. For the model network as an embodiment, there are 25 Source E-Nodes 201 in the T06 subnetwork and 25 Destination E-Nodes 202 in the T11 subnetwork. The figure illustrates the interconnection of 625 (25×25) of the model network's 12,475 (25×499) paths per Source T-Node 301. For a model network with 20 T-nodes, there are therefore 249,500 (20×12,475) possible paths. Each Source E-Node 201 connects to its Source T-Node 301 parent through an ET-Trunk 231. In this embodiment, each Source E-Node 201 has a label within the range E0384 through E0408.

The connecting Destination T-Node 302 labeled T11 has attached Destination E-Nodes 202 labeled E0704 through E0728. The TT-Link between the Source T-Node 301 T06 connects to the Destination T-Node 302 T11 called a Source-to-Destination TT-Link 341 or a Destination-from-Source TT-Link 342 depending on the location of a Crossconnect Switch 540 shown in FIG. 25. If the Crossconnect Switches 540 is within the Source T-Node 301, the link is a Source-to-Destination TT-Link 341; it is a Destination-from-Source TT-Link 342 if it is located within the Destination T-Node 302.

The three aggregation levels shown in FIG. 21 have the following properties:
1. The Path 310 level (Level 1) connects a Path Aggregation Switch 511 to a Path Disaggregation Switch 512 with localized complexity of handling user data. None of this complexity is intermingled with the transport of underlayer bits between the two end switches.
2. The Level 2 Superpath 320 level has three purposes.
   a. One is to interconnect the plurality of Path 310 level, i.e., child level connections between T-Node 300 pairs.
   b. Another purpose is to deliver the plurality of child E-Node 200 connections to a Crossconnect Switch 540 to reorient connectivity of a single Source E-Node 201 to all other Destination E-Nodes 202) into many Source E-Nodes 201 to a single Destination E-Node 202.
   c. Yet another purpose is to provide a means of adjusting Path Aggregation 710 bandwidth in each of two simplex connections.
3. The Level 3 Superpath 330 level has a plurality of purposes based on their positions within a SAIN network. In general, they aggregate functionally different pluralities of L2 Aggregations 720. In particular, some of their other purposes can be as shown in FIG. 21:
   a. Aggregate all Source L2 Aggregations 721 from a Source E-Node 201 to a parent Source T-Node 301, labeled L3A1→L3D1 in the figure;
   b. Aggregate Destination L2 Disaggregations 722 to a Destination E-Node 202, labeled L3A3→L3D3 in the figure;
   c. Aggregate all Source L2 Aggregations 721 from one Source T-Node 301 to Destination T-Node 302, labeled L3A2→L3D2 in the figure.

The role of an L3A2→L3D2 connection in 3c above can be either a direct link between two T-Nodes 300, or, more likely (in a network with more than a small number of nodes) is to pass a the connection through tandem transit nodes. In this case, there is a plurality of L3D2→L3A2 transfers. In other words, each transit node contains an ingress L3 Disaggregation Switch 532 connected to an egress L3 Aggregation Switch 531.

Figure 23:
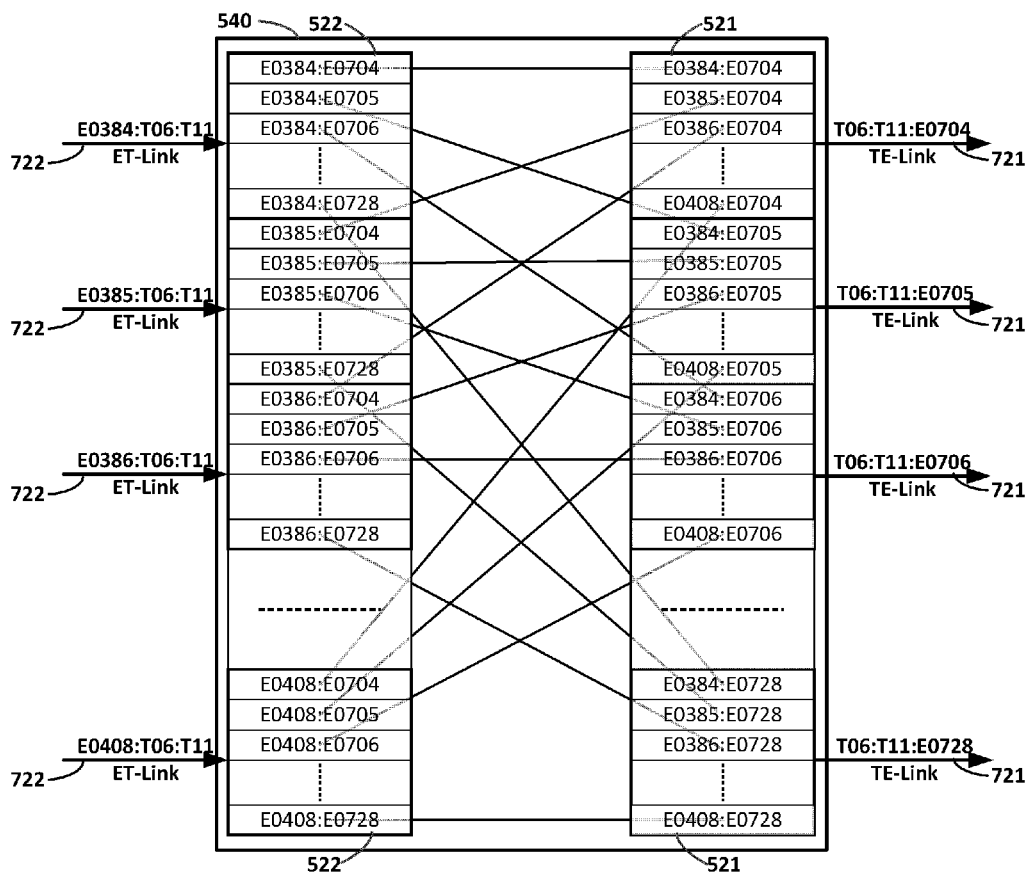
FIG. 23 shows an embodiment of Crossconnect Switches that result in each E-Node child of one parent T-Node (T06) connecting to all E-Node children of a second T-Node (T11).

In FIG. 23, note that each Source E-Node 201 contains a path from the Source E-Node 201 to a different Destination E-Node 202. In addition, each Destination E-Node 202 contains a path from a different Source E-Node 201.

When bandwidth is available for a new connection, it is the responsibility of the Aggregation Switch Node Controller 560 in a Generic Aggregation Switch 501 to apply the bandwidth in a deterministic fashion. For a new user connection, the Aggregation Switch Node Controller 560 uses information gathered from the Parameterized User Interface (PUI) 210 concerning the connection type for path level aggregation. In addition, at the path level, there can be a plurality of service classes in a network. FIG. 15b illustrates methods for such an embodiment.

Path Frame Synchronization

Frame synchronization that affect user connections take place in just two places in a SAIN network—at a Path Aggregation Switch 511 and a Path Disaggregation Switch 512. Several methods are available. One is to send a frame preamble similar to the type used in packet-based systems such as Ethernet. This approach requires considerable overhead processing.

Another embodiment requires that the child Source E-Nodes 201 of a Source T-Node 301 synchronize their clocks to the Source T-Node 301. The goal is to assure that frame start time of each Path Aggregation Switch 511 in the Source E-Nodes 201 arrives to be assigned cellet spaces in a master frame between the Source T-Node 301 and its Destination T-Node 302 partner. In this manner, the responsibility for frame synchronization can belong to an L3A/D Pair 533 among other methods.

Embodiment of Level 2 Aggregation and Disaggregation Switch Pairs

For the model network, each Source E-Node 201 contains 20 Level 2 Aggregation Switches 521, one for each Destination T-Node 302. Each Level 2 Aggregation Switch 521 aggregates all paths that originate at the Source E-Node 201 and terminate on one of the Destination T-Nodes 212. In the model network, 19 of the Level 2 Aggregation Switches 521 aggregate 25 paths to Destination E-Node3 202; for the 20th Level 2 Aggregation Switch 521 that backhauls to the 24 Destination E-Nodes 202 whose parent is also the parent of the Source E-Node 201.

FIG. 17(b) shows the context for a Level 2 Source Superpath 721 within the data aggregations. FIG. 18(b) shows a Level 2 Destination Superpath 722 context within the data aggregations.

Figure 22A:
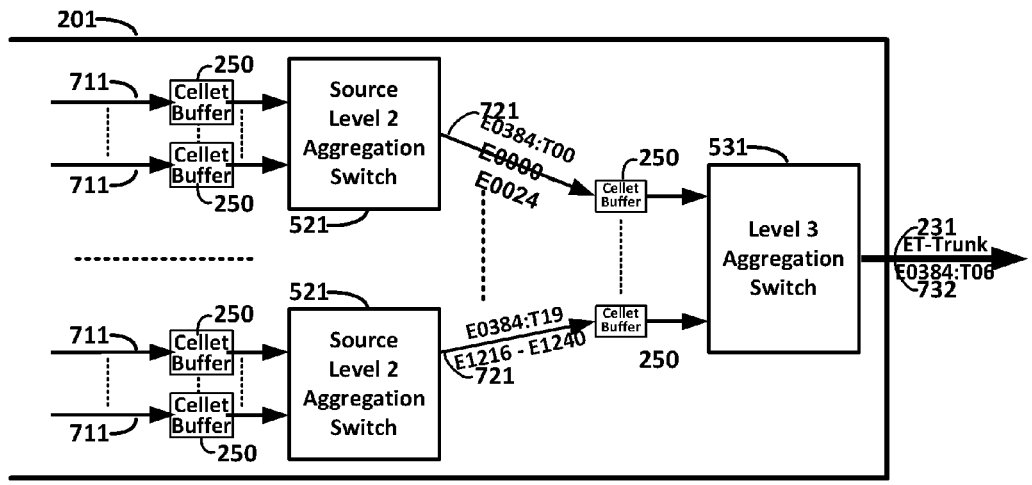
FIG. 22a shows source E-Node aggregation switches that aggregate all paths connected to destination E-Nodes according to an embodiment.

FIG. 22a shows an embodiment of the aggregation process. In the Level 2 Aggregation Switch 521 at the top of the figure, the plurality of Source Path Aggregation 711 terminates at Destination E-Nodes 202, whose parent is Destination T-Node 302 T00. Outputs from each Path Aggregation Switch 511 terminate on an Interconnect Cellet Buffer 250. This could be either a FIFO buffer with a small number of stages or a single stage buffer. Nominally, it is a single stage buffer as long as Path Frame Segments exist for Source Path Aggregation 711. The Level 2 Source Superpath 721 generated by the Level 2 Aggregation Switch 521 connects to a Level 3 Aggregation Switch 531 through an Interconnect Cellet Buffer 250. If L2 Frame Segments exist for Level 2 Source Superpath 721, a single stage buffer is normally adequate.

Figure 22B:
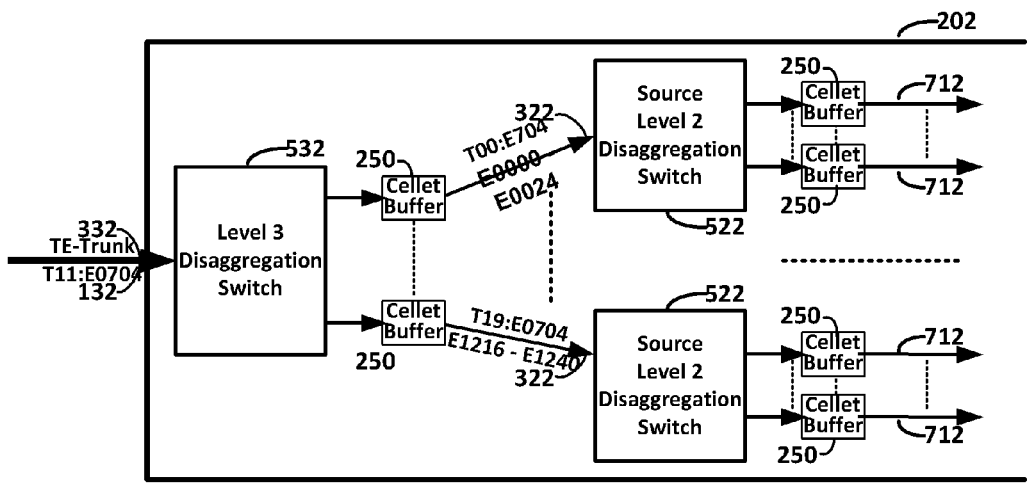
FIG. 22b shows destination E-Node disaggregation switches that disaggregate all paths connected to source E-Ndoes according to an embodiment.

Each of the plurality of Source Path Aggregation 711 can become a Destination Path Disaggregation 712 at a Destination E-Node 202, as shown in FIG. 22a and FIG. 22b. FIG. 22b shows the disaggregation by a Level 3 Disaggregation Switch 532 and Level 2 Disaggregation Switch 522 to recover the Destination Path Aggregation 712 (from the source node's perspective, Source Path Aggregation 711). As such, the Source Path Aggregation 711 connects to a Path Disaggregation Switch 512 in Destination E-Node 202. Each Path Disaggregation Switch 512 delivers the cellets contained in the Destination Path Disaggregation 712 to User Destination Data Ports 292 in the Destination E-Node 202 in a reversed manner to the aggregation performed at network entry by the Path Aggregation Switch 511 as described above.

Embodiment of Level 3 Aggregation and Disaggregation Switch Pairs

Each Source E-Node 201 aggregates its Level 2 Source Superpath 721 traffic into a Level 3 Source Superpath 731. A Source Superpath 731 contains all paths originating from the Source E-Node 201 to all Destination E-Nodes 202 in the network as shown in FIG. 17(c). In the model network embodiment, a Level 3 Level 3 Source Superpath 731 aggregates 20 Level 2 Source Superpaths 521 from 20 Level 2 Aggregation Switch 521. As discussed below, its Level 3 Destination Superpath 732 companion appears within the Source T-Node 301 parent of the Source E-Node 201. It transforms into a single Destination E-Node 202-centric form as shown in FIG. 18(c).

In the model network embodiment, The Level 3 Source Superpath 731 contains all 499 Source Paths 711 from each Source E-Node 201 and sends it to its parent Source T-Node 301 in an ET-Trunk 231 as shown in FIG. 22a. In addition to user traffic, the ET-Trunk 231 can also carry control signals.
Embodiment of a Crossconnect Switch in a Source T-Node.

Within each Source T-Node 301, there can be one Crossconnect Switch 540 for each T-Node 300 in a network. Each Crossconnect Switch 540 is dedicated to forwarding traffic to one of the Destination T-Nodes 302 in the network with the traffic converted, in the model network, from one-to-many to many-to-one. That is, traffic received from each Source E-Node 201 by the Source T-Node 301 is directed to many Destination E-Nodes 202 children of Destination T-Nodes 302. The Crossconnect Switch 540 converts the traffic such that many Source E-Node 201 are aggregated together according to a single Destination E-Node 202 FIG. 24 shows one such Crossconnect Switch 540 embedded in a Source T-Node 301.

A Source T-Node 301 contains, among other objects, a plurality of Level 3 Disaggregation Switches 532 shown in FIG. 24. In the model network, there are 25 Level 3 Disaggregation Switches 532, one for each Source E-Node 201 connected to the parent Source T-Node 301. Each Level 3 Disaggregation Switch 532 pairs with a Level 3 Aggregation Switch 531 in one of the Source E-Nodes 201. ET-Trunk 231 connects each pair from its Source E-Node 201 (that contains the Level 3 Aggregation Switch 531) to its parent Source T-Node 301 (that contains the Level 3 Disaggregation Switch 532).

Each paired Destination L3 Disaggregation 732 disaggregates the 25 Level 2 Destination L2 Disaggregation 722 of the model network. Each Level 2 Destination Superpath 722 contains path traffic destined to Destination E-Nodes 202 connected to one of the Destination T-Nodes 212. The parent Source T-Node 301 connects each Level 2 Destination Superpath 722 to the Crossconnect Switch 540 in the parent Source T-Node 301 that forwards traffic to the proper Destination T-Node 302.

The Path Aggregation Switches 511 in a Source E-Node 201 encapsulates all of the node's paths to every other Destination E-Node 202 in the network. However, the Generic Disaggregation Switch 502 in each of the Destination E-Nodes 202 receives paths from every other Source E-Node 201 in the network. The Crossconnect Switch 540 can be used to reorganize the path traffic to accomplish this goal.

FIG. 24 shows a representation for the model network of each of the 25 Level 3 Disaggregation Switches 532 with their 20 Level 2 Destination L2 Disaggregation 722. Each of the Level 2 Destination L2 Disaggregation 722 connects to an Interconnect Cellet Buffer 250 that, in turn, connects to one of the Crossconnect Switches 540 in the parent Source T-Node 301.

FIG. 24 shows the Crossconnect Switch 540 for the parent Source T-Node 301 T06 and the Destination T-Node 302 T11. The Crossconnect Switch 540 contains 25 Level 2 Disaggregation Switches 522, one for each Source E-Node 201 in the model network. The input for each switch is an output from the 25 Level 3 Disaggregation Switches 532 shown in FIG. 24.

The outputs from the Level 2 Disaggregation Switches 522 connect to the input side of a set of Level 2 Aggregation Switches 521 inside the Crossconnect Switch 540. The multiplexed output of Level 2 Aggregation Switches 521 connects to a Level 3 L3 Aggregation Switch 531 as shown in FIG. 24. These processes all occur within each Source T-Node 301.

FIG. 25 shows a different type of cross connection between SAIN switches. In this case, the cross connections exist only at Level 2. For the model network, each of the 20 L3 Disaggregation Switches 532 in a Destination T-Node 302 pairs with an L3 Aggregation Switch 531 that exists in each of the 20 Source T-Nodes 301. Since there are assumed to be 25 Level 2 connections from each of 20 Source T-Nodes 301, there are a total of 500 Source L2 Aggregation 721 signals that connect from the 20 L3 Disaggregation Switches 532 to the 25 L3 Aggregation Switches 531 each of which connects to 25 Destination E-Nodes 202.
Embodiments for Connecting Tandem Nodes FIG. 13 shows the basis arrangement of a Generic A/D Switch Pair 503. Interconnecting Elements 599 can separate low-level switch pairs such as Path A/D Pairs 513. All large networks must aggregate data in some manner to interconnect relatively low-level ingress and egress nodes. In other words, unlike conventional packet networks, data aggregation using such protocols as Multiprotocol Label Switching (MPLS), provides data aggregation by attaching labels to packets that are forwarded by tandem node routers. These routers must be very high speed and are expensive. In a SAIN network, data aggregation switching in tandem nodes occur at a circuit level where one very inexpensive circuit switched connection can handle a single aggregation of thousands of user packet-based connections.

An important aspect of FIG. 13 implies that a paired connection of switches at a low level such as a Generic A/D Switch Pair 503 pair does not require replication of packets within Interconnecting Elements 599. What is required in Interconnecting Elements 599 is tandem connections of one or more switch pairs at higher aggregation levels. Each such aggregation does not require forwarding packets explicitly. Each aggregation requires only a simple circuit switch.

In a tandem node, a Generic Disaggregation Switch 502 connection is set to receive a data aggregation from an incoming connection. In other words, a tandem node provides a Generic Disaggregation Switch 502 that pairs with an upstream Generic Aggregation Switch 501. Such switch pairing can be a T-Node-to-T-Node L3 Aggregation Switch 531 connection from an upstream node. The Tandem Node contains one or more L3 Aggregation Switches 531 that forward the data aggregation from the L3 Disaggregation Switch 532 to one or more downlink nodes.

Forwarding to more than one downlink node occurs in multicasting connectivity. The mechanism for controlling such processes can use Control Vectors managed by other T-Nodes where each such T-Node has Control Vector connectivity to the T-Nodes involved therein.
Embodiments for Building Low Latency High Capacity Networks Classical Time Division Switching networks pass one frame of information on to subsequent nodes where the frame pattern persists in the same manner from one network link to another. This is the case within the Public Switched Telephone Network, for example. In a SAIN network, there is no need to replicate frame patterns within each tandem link. This opens the way to minimize switch latency at transit nodes and other advantages such as dividing high-speed data among multiple optical trunks.

FIG. 26a, FIG. 26b, FIG. 26c, and FIG. 26d show four examples that demonstrate methods for minimizing latency in a SAIN network. Each example shows parameters for each of the three aggregation levels defined for a model network assumed in this application. Though three aggregation levels are described in this application and with reference to FIGS. 26a-d, other aggregation levels are possible using the disclosed methods. As such, the number of aggregation levels does not need to be three in all SAIN network embodiments. Shown in FIGS. 26a-26d are independent and dependent parameters for switch pair connections.

The first parameter is the System Clock Rate and its inverse, the Clock Period. As shown in FIG. 26a and FIG. 26b, the clock rate may be the same for each of the three aggregation levels. FIG. 26b and FIG. 26c may have different Clock Rates at each aggregation level.

At the Path Aggregation Switch 511 at the bottom of each example are three parameters: the Frame Rate for the switch, the Cellet Size, and the number of Frame Segments. The other parameters shown derive from these three plus either a System Clock Rate or a aggregation level clock rate.

FIG. 26a and FIG. 26b both use Frame Rates of 125,000 frames per second (i.e., 125 Kfps) resulting in Frame Period of 8,000 nsec (i.e., 8 μsec). The Cellet Size is 1 bit. Including the other parameters, the result is a Quantum Data Rate (QDR) of 125 Kbps. The Number of Clock Periods (Nbr Clock Periods) that make up a frame, shown in the right hand column next to the Min. Aggregate Bandwidth=Frame Period×System Clock Rate. In other words, the number of Clock Pulses=$8\times10^{-6}\times1.5625\times10^{9}$=12,500. The Frame Segments can be an integer divisor of the Number of Clock Periods that defines the Min Aggregate Bandwidth. There are many integer divisors of 12,500. For this example, the number of Frame Segments per Frame chosen is 50.

The 50 subframes per frame each have 250 Clock Pulses and the subframe period is 160 nsec. In addition, if each subframe is filled with a single cellet, the total bandwidth if equal to 50×125,000=6,250,000 bps, i.e. 6.25 Mbps. This now becomes the minimum aggregate bandwidth for a Path A/D Pair 513. It does nothing to the QDR, where a connection can be any integer multiple of 125 Kbps. It only affects the bandwidth increments for additional capacity, i.e., any integer multiple of 6.25 Mbps. The maximum aggregate data rate for this set of parameters is 1.5625 Gbps, the System Clock Rate for a one-bit cellet.

At an L2 Aggregation Switch 521, its frame period is now the subframe period from the Path Aggregation Level. In the example, it is 160 nsec nsec At Level 2, the L2 Frame Rate is the same as the Min Aggregate Bandwidth at the Path Level. The result at layer to is:

The L2 Cellet Size chosen is 16 resulting in an L2 QDR=16×6.25=100 Mbps.

The L2 Min Aggregate Bandwidth=Frame Segments× QDR=50×100=5 Gbps.

The Max Aggregate Bandwidth=L2 Cellet Size×L2 Clock Rate=16×1.5625 25 Gbps.

The L2 Subframe Period=L2 Frame Period/L2 Frame Segments=160/50=3.2 nsec.

The Frame Period at Level L3 is 3.2 nsec imported from Level 2. The chosen cellet size is 64 bits and the number of L3 Frame Segments is 1. With this value, the L3 Subframe Period is still 3.2 nsec, the same as that of the L2 Subframe Period and a Max Aggregate rate of 100 Gbps. The FIG. 26a shows the other Level 3 results. FIG. 26b shows results for a 1.28 Gbps System Clock Rate and a 125 Kbps Frame Rate. The results are similar to FIG. 26a.

These results for the two figures appear interesting and can be useful, but they do not take full advantage of the power-of-two properties of the SAIN algorithm, which can result in uniformly spaced cellets within frames. FIG. 26c and FIG. 26d show results that do make use of the algorithm to its full advantage.

FIG. 26c and FIG. 26d show a Path Aggregation Level Switch with a 1-bit cellet and a 64 Kbps data rate. The size of the Frame Segments in both of the figures is set to 128, resulting in an outgoing Subframe Period of 122.070 nsec at the output of the Path Level Switch and a L2 Frame Period of 0.954 nsec at the output of the L2 Switch. In the L3 switch, the Frame Segments are both set to 1 resulting so that the L3 Frame Segment is the same as that of L2. In other words, all of the input parameters are the same in both examples except for one, which is the L3 Cellet Size. In FIG. 26c, the L3 Cellet Size is 8 bits; in FIG. 26d, it is 32 bits. This shows that the parameters can result in a wide variety of outcomes. In fact, the next section Embodiments Using Power of Two Length Subframes to Minimize Latency shows methods that, with a simple strategy, it is unnecessary to use only power-of-two parameters such as those shown for Frame Segments in FIG. 26c and FIG. 26d.

The only dependent parameters that change with the L3 Cellet Size change are the L3 Min Aggregate Bandwidth and the L3 Max Aggregate Bandwidth. As shown in FIG. 26c, the Min and Max Aggregate Bandwidths are 8.389 Gbps and 33.554 Gbps, respectively. In FIG. 26d, they are 33.554 Gbps and 134.218 Gbps. In both examples, the ratios of available Max to Min Aggregation Bandwidths are 4. In other words, all of the dependent parameters remain the same when the number of bits per cellet changes except the Min and Max Aggregate Bandwidths.

A skilled artisan can implement the SAIN switches disclosed herein by building switch elements that change either 1) by automation as traffic loads change or 2) by an operator making changes from a management control station. For example, the size of cellets sent from a source or to a sink can be set to one of a table of alternatives.

The methods and apparatus disclosed have an important side effect in being able to implement switches that can scale to extremely high data rates. Since the system can use power-of-two-related cellet sizes to advantage. For example, the switch can send each bit of a 32-bit cellet over 32 25 Gbps optical fiber wavelengths using the state of the art synchronization methods referenced herein. The total data rate of the combination is 800 Gbps. Increasing the cellet size to 64 bits and 64 fiber wavelengths, the result is a 1.6 terabit per second (Tbps) trunk. In this embodiment, there is no need for dealing with the splitting and recombining packets. As always in a SAIN network, packets exist only at ingress and egress ports. With coherent optical trunks emerging, the number that will result in hundreds of gigabits per second using a single wavelength, the amount of data within a single fiber increases significantly.

Even though much of the disclosures herein have assumed that at the Path and Level 2 aggregation levels the cellet size can be one bit, other cellet sizes are possible. With ever-higher clock rates emerging for semiconductors, this will be an important way to take advantage of the SAIN multiplexing algorithm for serial data sources and sinks. However, many sources and sinks begin as multi-bit words, particularly those that are 8, 16, 32, and 64 bits wide. Serializing these words is a common method of operation in many contexts, and a SAIN network can be one of them. The upside of this approach is easy to understand in terms of simplicity within a stochastic network. However, there is a downside to this process.

Even though the epochs are small, there is still a disassembly and reassembly time associated with this process. In these cases, the SAIN methods of this application can result in an ultimate minimization of end-to-end latency within networks. In applications such as semiconductors where distances are very small and optical transport is the ultimate in reducing power required, the methods can find application. In longer distance applications, applying the SAIN methods can result in measuring end-to-end latency in picoseconds. This can result in the ability to triangulate physical locations to compete effectively without relying on GPS and other satellite-based methods that have built-in reliability and survivability issues. The only issues affecting accuracy can be due to temperature and earth spatial variations with time, but this has been a well-researched area dating back many decades.

Upon network (or a subnetwork) instantiation, node switches can be set up with initial Minimum Aggregate Bandwidth settings similar to those shown in FIG. 26a. Doing so results in each Path Aggregation Switch 511, Level 2 Aggregation Switch 521, and Level 3 Aggregation Switch 531 within the network (or subnetwork) provisioning enough spare bandwidth to assure smooth startup operations.

Embodiments for Connecting Paired Switches

There are two different circumstances in connecting one SAIN switch to a downlink switch. In one instance, one switch is a Generic Aggregation Switch 501 that connects to a paired Generic Disaggregation Switch 502. In another circumstance, a switch may be either a Generic Aggregation Switch 501 or a Generic Disaggregation Switch 502 where its downlink switch is a transit (tandem) switch described in the last section.

The Basics of the SAIN Transform Algorithm at paragraph [91] detail memory maps in FIG. 4, FIG. 5, and FIG. 6 for paired Generic A/D Switch Pair 503. Results described in the section are especially important for Path A/D Pairs 513.

The memory maps can match each other in paired switches. In addition, the system can synchronize the start time of the Path Disaggregation Switch 512 frame to begin shortly after receiving the Path Aggregation Switch 511 start time. In other words, the synchronization process compensates for all network propagation delays between the source send time and destination E-Node's arrival time. The only restriction is that the cellet boundaries of each received cellet from a Path Aggregation Switch 511 occur so that receiving data in the arriving cellet occurs in time to place it in the concomitant outgoing cellet position.

As described below, the information described in The Basics of the SAIN Transform Algorithm can enable a skilled artisan to assure timing of this embodiment occurs. That is, if a connection requires a number of cellets that are not a multiple of a PoT, there is no problem as long as the connection starts at the same Connection Domain cellet position in two relevant switch stacks.

1. Switching can make use of the PoT boundaries by treating the cellets within the boundaries as a unit of switching. Each PoT segment treats the PoT boundaries as subframe boundaries in a switch downstream from a Generic Aggregation Switch 501 and returning to the original boundary at a Generic Disaggregation Switch 502.

2. Such switching adds no latency beyond a single cellet buffer as long as the number of cellets per PoT segment p is the same. In other words, as long as the data rate being switched is an integer multiple of the base data rate, defined to be one cellet per PoT segment.

3. If the number of cellets per PoT segment is not the same, a two-PoT-segment FIFO buffer requires p+1 cellets to ensure that each outgoing cellet slot has an incoming cellet.

4. The result is that the end-to-end latency remains constant as long as the base data rate remains unchanged even when the integer multiple changes.

Figure 27:
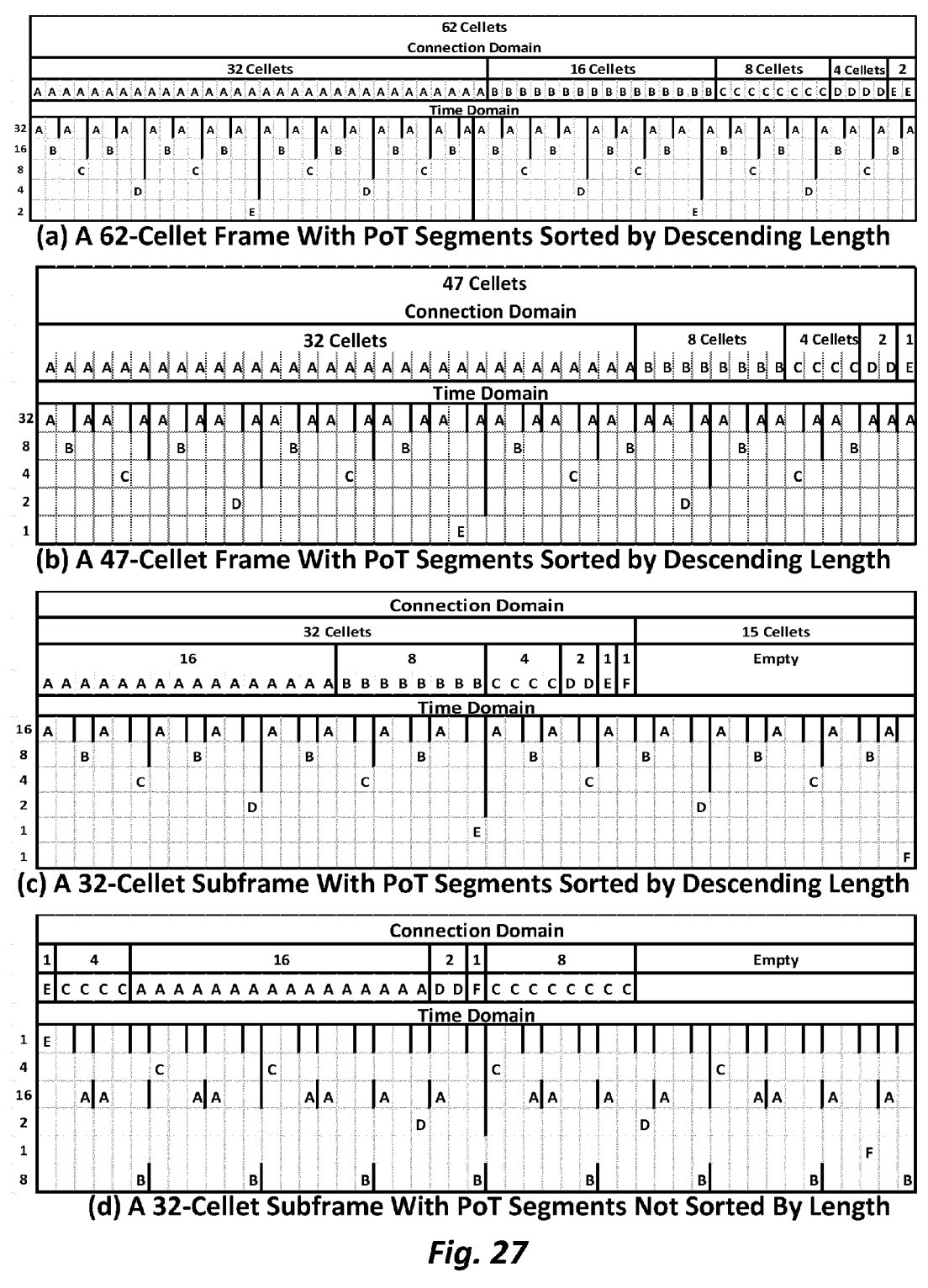

FIG. 27 shows four connections within a Connection Domain that involve a frame that is not a power-of-two in length (where the length is 29 cellets). There are three non-power-of-two length connections; two connections contain 5 cellets each, labeled "A" and "B"; and "D" that has 3 cellets. In addition, one connection is a power-of-two in length; connection "C" that has 4 cellets. These four connections illustrate methods that a SAIN network can use to result in low, deterministic latency for its transported data in the concomitant Time Domain. The following results obtain from the assumptions made:

1. An even number of cellets in a frame (or subframe) results in one-half of the (sub)frame's cellets existing in each of two halves of the (sub)frame
   a. Proof: Numbering the cellets starting at zero to the length of the frame minus one, one-half of the cellets have even numbers while the other half have odd numbers. Reversing the order of a binary representation of the cellet number results in one-half of the cellets starting with a "0" and the other half starting with "1".
2. An odd number of cellets in a (sub)frame results in one-half of a (sub)frame containing one additional cellet than does the other half.

FIG. 27 shows the amount of lead-time required for uniformly spaced input signals for each of the four connections. Only one of the four shows an input signal "C" can occur just before the start of a SAIN time division frame. This is so since the "C" signal is operating at the base data rate. In the general case where the input signal is an integer multiple of the base data rate, it can still occur just before the start of the time division frame, but only if the integer multiplier is a power-of-two. In other words, a FIFO buffer is required if the integer multiple is not a power-of-two. The size of the buffer is determined by the largest power-of-two smaller than the integer multiple. All cellets that arrive in a period interval determined by this power-of-two multiple are buffered. For example, suppose that the base data rate is four cellets per frame and the incoming data rate is 24 cellets per frame. The largest power-of-two smaller than 24 is 8. Therefore, the FIFO buffer must hold 3 cellets in order to assure that no underflow exists.

Embodiments Using Power of Two Length Subframes to Minimize Latency

This section pertains to all paired switches in a SAIN network, but is especially important in paired in tandem node switches. Using Power of Two subframes in the proper manner can minimize latency beyond merely relying on the small length of the subframes.

FIG. 27 shows four examples of SAIN Connection Domain/Time Domain frames to illustrate alternative uses of the SAIN algorithm. A major purpose of these examples is to disclose methods and apparatus that results to minimize end-to-end latency in a SAIN network.

FIG. 27(*a*) shows a 62-cellet frame that supports five different PoT segment lengths, 32, 16, 8, 4, and 2 cellets. The PoT segments lengths are in decreasing order in the figure. The result is a set of connections in the time domain where the cellets are equally spaced with almost no jitter. [Since the number 62 is not a power of two, there will be a one-cellet shift from being equally space for two of the cellets.] The example is not typical in the real world, since link data rates for a SAIN network are generally high within Metro and other core networks. As shown in FIG. 27*b* and FIG. 27*c*, the maximum number of available cellets in a frame for a Path A/D Pair 513 from a Level 2 Aggregation Switch 521 is, by coincidence, 10,240 cellets per frame for both 125 and 128 frame per second cases.

A major advantage of equally spaced cellets is that a transit node switch does not need to wait an entire PoT segment to be certain that all cellets that were supposed to arrive did so.

Equal spacing of cellets for a connection depends on two parameters. These are:
1. The number of cellets per PoT segment are a power of two; and
2. The number of PoT segments per frame is a divisor of the start position of the connection in the virtual frame length of the Connection Domain.

To illustrate further, assume that a PoT segment into smaller PoT segments for assignment of low speed traffic. FIG. 27(*b*), FIG. 27(*c*), and FIG. 27(*d*) illustrate the major issues.

The results are:
1. Jitter can be is at most one link data rate position (plus one link clock period), and
2. Any fixed latency, though small, is deterministic and predictable; network controllers can account for it in end-to-end latency measurements.
3. Position of an E-Node port can be measurable in centimeters and decimeters where high-speed links exist; the accuracy of the measurement can exceed that of GPS.

FIG. 27(*b*) is for a frame size of 47 cellets. Connection "A" has 32-cellet PoT segment along with 8-cellet, 4-cellet, 2-cellet, and 1-cellet PoT segments. Being in descending order of length, each segment provides near-equal spacing of cellets. The reason for this is that the start positions of each subframe begin on a boundary requirement disclosed in list point 2 of paragraph [262] above.

FIG. 27 (*c*) shows a further division of the 32-cellet PoT segment into smaller PoT segments of 16, 8, 4, and 2 cellets each plus two 1-cellet segments. These are again in descending order of PoT segment size so that equal spacing again results. It further shows significant disorder of FIG. 27(*d*) shows what can happen when the PoT segments are on in descending order of length. Appreciable jitter exists. For example, connection "A" that was always at the left-most position of each of the 16 PoT segments in FIG. 27(*c*) now exhibits jitter from the left to the right of its PoT segments.

Clearly, not all connections are going to be a power of two in length in the real world. This is not a big issue insofar as Path A/D Pair 513 pairs are concerned. Requiring FIFO buffers to match incoming packet to a Source E-Node 201 with outgoing connection is a one-time occurrence. For transport links with data rates exceeding a gigabit per second have very large maximum base data rates that are large powers of two. Their subdivision to lower powers of two can assure low-latency transit node operation disclosed herein.

What is claimed is:

1. A method of network data routing at an entry node, comprising:
receiving networking communications from an external device, the networking communications designating an exit node,
establishing a paired connection with the exit node by passing control vectors to the exit node, the connection including a bandwidth, wherein the entry node and the exit node are synchronized to a common clock source;
maintaining the paired connection with the exit node, the maintenance including using control vectors to adjust the bandwidth according to the received networking communications,
creating an aggregated data stream based at least in part on the received networking communications; and
implicitly addressing, without using data headers for addressing, by a computing system comprising computer hardware, the aggregated data stream to form one or more implicitly addressed frames;
wherein the control vectors passed to the exit node include data indicative of disaggregating the implicitly addressed frames, such that disaggregation of the aggregated data stream is performed by the paired connection at the exit node.

2. The method of claim 1, wherein the paired connection can have a bandwidth of zero.

3. The method of claim 1, wherein the received networking communications comprise packets, each packet including an addressing header, and wherein the implicitly addressing step comprises stripping the addressing header from the received networking communications; and wherein the control vectors include information to reconstitute the addressing header at the exit node.

4. The method of claim 1, wherein the aggregated data stream is one of a plurality of aggregated data streams, each aggregated data stream associated with an exit node and further comprising the steps of:
aggregating the plurality of data streams into an intermediate data stream, the intermediate data stream associated with an intermediate data node, wherein the intermediate data node is a parent node of the exit nodes associated with the plurality of data streams,
establishing and maintaining a paired connection with the intermediate data node, the paired connection with the intermediate data node including information indicative of disaggregating the intermediate data stream.

5. A system comprising:
one or more processors;
tangible, non-transitory computer storage that stores a program that when executed by the one or more processors is configured to perform operations, comprising:
receiving networking communications, the networking communications designating a node,
establishing a paired connection with the node by passing control vectors to the node, the connection including a bandwidth, wherein the node and the program are synchronized to a common clock source;
maintaining the paired connection with the node, the maintenance including using control vectors to adjust the bandwidth according to the received networking communications,
creating an aggregated data stream based at least in part on the received networking communications; and
implicitly addressing, without using data headers for addressing, the aggregated data stream to form one or more implicitly addressed frames;
wherein the control vectors passed to the node include data indicative of disaggregating the implicitly addressed frames, such that disaggregation of the aggregated data stream is performed by the paired connection at the node.

6. The system of claim 5, wherein the paired connection can have a bandwidth of zero.

7. The system of claim 5, wherein the received networking communications comprise packets, each packet including an addressing header, and wherein the implicitly addressing step comprises stripping the addressing header from the received networking communications; and wherein the control vectors include information to reconstitute the addressing header at the exit node.

8. The method of claim 1, wherein the aggregated data stream is one of a plurality of aggregated data streams, each aggregated data stream associated with a node and further comprising the steps of:

aggregating the plurality of data streams into an intermediate data stream, the intermediate data stream associated with an intermediate node, wherein the intermediate node is a parent node of the nodes associated with the plurality of data streams, establishing and maintaining a paired connection with the intermediate node, the paired connection with the intermediate node including information indicative of disaggregating the intermediate data stream.

* * * * *

UNITED STATES PATENT AND TRADEMARK OFFICE
CERTIFICATE OF CORRECTION

| | | |
|---|---|---|
| PATENT NO. | : 8,635,347 B2 | |
| APPLICATION NO. | : 13/013717 | |
| DATED | : January 21, 2014 | |
| INVENTOR(S) | : Sanders | |

It is certified that error appears in the above-identified patent and that said Letters Patent is hereby corrected as shown below:

In the Drawings

Sheet 11 of 24 (Fig. 18) at line 8 (approx.), Change "Dissagregation" to --Disaggregation--.

Sheet 18 of 24 (Fig. 21d) at line 1 (above Fig. 21d), Change "Destiatnion" to --Destination--.

In the Specifications

In column 5 at line 41, Change "compriss" to --comprises--.

In column 6 at line 27, Change "that" to --than--.

In column 7 at line 7, Change "Connectiion" to --Connection--.

In column 7 at line 21, Change "E-Ndoes" to --E-Nodes--.

In column 9 at line 36, Change "Coconnection" to --Connection--.

In column 10 at line 39, Change "bandwidth" to --bandwidth.--.

In column 11 at line 2, Change "If" to --if--.

In column 11 at line 28, Change "that that" to --that--.

In column 12 at line 43, Change "Coconnection" to --Connection--.

In column 19 at line 39, Change "N=2n,where" to --N=2n, where--.

In column 35 at line 52, Change "a the" to --a--.

In column 36 at line 32, Change "E-Node3" to --E-Nodes--.

In the Claims

In columns 43-44 at lines 66-67 (Col. 43, 1-23 Col. 44), Change "1. A method of network data routing at an entry node, comprising:

receiving networking communications from an external device, the networking communications designating an exit node, Signed and Sealed this
Sixth Day of May, 2014

Michelle K. Lee
*Deputy Director of the United States Patent and Trademark Office* establishing a paired connection with the exit node by passing control vectors to the exit node, the connection including a bandwidth, wherein the entry node and the exit node are synchronized to a commonclock source;

maintaining the paired connection with the exit node, the maintenance including using control vectors to adjust the bandwidth according to the received networking communications, creating an aggregated data stream based at least in part on the received networking communications; and implicitly addressing, without using data headers for addressing, by a computing system comprising computer hardware, the aggregated data stream to form one or more implicitly addressed frames;

wherein the control vectors passed to the exit node include data indicative of disaggregating the implicitly addressed frames, such that disaggregation of the aggregated data stream is performed by the pairedconnection at the exit node."

to --1. A method of network data routing at an entry node, the method executed by a computing device, comprising:

receiving networking communications from an external device, the networking communications designating an exit node, identifying a previously-established paired connection with the exit node is in a virtual state, wherein the virtual state comprises maintaining the connection within a connection bandwidth register but having zero bandwidth assigned to the connection;

responsive to identifying the previously-established paired connection is in a virtual state, transmitting a control vector of one byte or less to the exit node indicating a change in state of the previously-established paired connection from the virtual state to a real state; wherein a real state comprises maintaining a connection with an assigned bandwidth and control vectors;

establishing a paired connection with the exit node by switching the previously-established connection from a virtual state to a real state, the paired connection including a bandwidth, wherein the entry node and the exit node are synchronized to a common clock source; wherein the paired connection is within an aggregated data stream, the data stream aggregating a plurality of connections comprising cellets; wherein a cellet is a data fragment;

maintaining the paired connection with the exit node, the maintenance including using control vectors to adjust the bandwidth according to the received networking communications; wherein adjusting the bandwidth comprises changing the number of cellets in a time division frame, implicitly addressing, without using data headers for addressing, one or more cellets; wherein each cellet is a data fragment smaller than the time division frame of the aggregated data stream and wherein the number of cellets in the time division frame are based on an assigned bandwidth;

inserting the implicitly addressed cellets into the aggregated data stream; wherein the control vectors passed to the exit node include data indicative of disaggregating the implicitly addressed cellets, such that disaggregation of the aggregated data stream is performed at the exit node using the control vector data.--.

In column 44 at lines 24-25, Change "2. The method of claim 1, wherein the paired connection can have a bandwidth of zero."

to --2. The method of Claim 1, further comprising switching the paired connection from a real state to a virtual state.--.

In columns 44-45 at lines 46-47 (Col. 44, 1-3 Col. 45), Change "5. A system comprising:

one or more processors;

tangible, non-transitory computer storage that stores a program that when executed by the one or more processors is configured to perform operations, comprising:

receiving networking communications, the networking communications designating a node, establishing a paired connection with the node by passing control vectors to the node, the connection including a bandwidth, wherein the node and the program are synchronized to a common clock source;

maintaining the paired connection with the node, the maintenance including using control vectors to adjust the bandwidth according to the received networking communications, creating an aggregated data stream based at least in part on the received networking communications; and implicitly addressing, without using data headers for addressing, the aggregated data stream to form one or more implicitly addressed frames;

wherein the control vectors passed to the node include data indicative of disaggregating the implicitly addressed frames, such that disaggregation of the aggregated data stream is performed by the paired connection at the node."

to --5. A system comprising:

one or more processors;

tangible, non-transitory computer storage that stores a program that when executed by the one or more processors is configured to perform operations, comprising:

receiving networking communications, the networking communications designating an exit node, identifying a previously-established paired connection with the exit node is in a virtual state, wherein the virtual state comprises maintaining the connection within a connection bandwidth register but having zero bandwidth assigned to the connection;

responsive to identifying the previously-established paired connection is in a virtual state,

CERTIFICATE OF CORRECTION (continued)
U.S. Pat. No. 8,635,347 B2 transmitting a control vector of one byte or less to the exit node indicating a change in state of the previously-established paired connection from the virtual state to a real state; wherein a real state comprises maintaining a connection with an assigned bandwidth and control vectors;

establishing a paired connection with the node by switching the previously-established connection from a virtual state to a real state, the paired connection including a bandwidth, wherein the node and the program are synchronized to a common clock source; wherein the paired connection is within an aggregated data stream, the data stream aggregating a plurality of connections comprising cellets; wherein a cellet is a data fragment;

maintaining the paired connection with the node, the maintenance including using control vectors to adjust the bandwidth according to the received networking communications; wherein adjusting the bandwidth comprises changing the number of cellets in a time division frame, implicitly addressing, without using data headers for addressing, one or more cellets; wherein each cellet is a data fragment smaller than the time division frame of the aggregated data stream and wherein the number of cellets in a time division frame is based on an assigned bandwidth;

inserting the implicitly addressed cellets into the aggregated data stream;

wherein the control vectors passed to the node include data indicative of disaggregating the implicitly addressed cellets, such that disaggregation of the aggregated data stream is performed at the exit node using the control vector data.--.

In column 45 at lines 4-5, Change "6. The system of claim 5, wherein the paired connection can have a bandwidth of zero."

to --6. The system of Claim 5, wherein the operations further comprise switching the paired connection from a real state to a virtual state.--.

In column 45 at lines 13-25, Change "8. The method of claim 1, wherein the aggregated data stream is one of a plurality of aggregated data streams, each aggregated data stream associated with a node and further comprising the steps of:

aggregating the plurality of data streams into an intermediate data stream, the intermediate data stream associated with an intermediate node, wherein the intermediate node is a parent node of the nodes associated with the plurality of data streams, establishing and maintaining a paired connection with the intermediate node, the paired connection with the intermediate node including information indicative of disaggregating the intermediate data stream."

to --8. The system of Claim 5, wherein the aggregated data stream is one of a plurality of aggregated data streams, each aggregated data stream associated with a node and wherein the operations further comprise:

aggregating the plurality of data streams into an intermediate data stream, the intermediate data stream associated with an intermediate node, wherein the intermediate node is a parent node of the nodes associated with the plurality of data streams, establishing and maintaining a paired connection with the intermediate node, the paired connection with the intermediate node including information indicative of disaggregating the intermediate data stream.--.

UNITED STATES PATENT AND TRADEMARK OFFICE
CERTIFICATE OF CORRECTION

PATENT NO.        : 8,635,347 B2
APPLICATION NO.   : 13/013717
DATED             : January 21, 2014
INVENTOR(S)       : Ray W. Sanders It is certified that error appears in the above-identified patent and that said Letters Patent is hereby corrected as shown below:

In the claims

In column 45 at line 12, In Claim 7, change "the exit node" to --the node--.

Signed and Sealed this
Ninth Day of August, 2016

Michelle K. Lee
*Director of the United States Patent and Trademark Office*